(12) United States Patent
Abe et al.

(10) Patent No.: US 9,240,614 B2
(45) Date of Patent: Jan. 19, 2016

(54) NONAQUEOUS ELECTROLYTE SOLUTION AND ELECTROCHEMICAL ELEMENT USING SAME

(75) Inventors: Koji Abe, Yamaguchi (JP); Kazuhiro Miyoshi, Yamaguchi (JP); Shoji Shikita, Yamaguchi (JP); Kei Shimamoto, Yamaguchi (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 469 days.

(21) Appl. No.: 13/701,193

(22) PCT Filed: Jun. 3, 2011

(86) PCT No.: PCT/JP2011/062841
§ 371 (c)(1),
(2), (4) Date: Nov. 30, 2012

(87) PCT Pub. No.: WO2011/152534
PCT Pub. Date: Dec. 8, 2011

(65) Prior Publication Data
US 2013/0071733 A1    Mar. 21, 2013

(30) Foreign Application Priority Data

| Jun. 4, 2010 | (JP) | 2010-129361 |
| Jul. 22, 2010 | (JP) | 2010-165374 |
| Jul. 23, 2010 | (JP) | 2010-166444 |
| Oct. 4, 2010 | (JP) | 2010-224710 |
| Dec. 7, 2010 | (JP) | 2010-272966 |
| Feb. 24, 2011 | (JP) | 2011-037751 |
| Feb. 24, 2011 | (JP) | 2011-037759 |

(51) Int. Cl.
*H01M 10/0567* (2010.01)
*H01G 11/58* (2013.01)
*H01M 10/0569* (2010.01)
*H01M 10/052* (2010.01)
*H01M 10/0566* (2010.01)

(52) U.S. Cl.
CPC ........... *H01M 10/0567* (2013.01); *H01G 11/58* (2013.01); *H01M 10/0569* (2013.01); *H01M 10/052* (2013.01); *H01M 10/0566* (2013.01); *H01M 2300/0025* (2013.01); *Y02E 60/122* (2013.01); *Y02E 60/13* (2013.01); *Y02T 10/7011* (2013.01); *Y02T 10/7022* (2013.01)

(58) Field of Classification Search
CPC ................ H01M 10/0567; H01M 10/0569; H01M 10/052; H01M 2300/0025; Y02E 60/122
See application file for complete search history.

(56) References Cited

U.S. PATENT DOCUMENTS

| 2003/0054259 A1 | 3/2003 | Murai et al. |
| 2008/0138715 A1 | 6/2008 | Ihara et al. |
| 2009/0130566 A1 | 5/2009 | Iwanaga et al. |
| 2009/0253045 A1 | 10/2009 | Kotato et al. |
| 2009/0253049 A1 | 10/2009 | Ishikawa et al. |

FOREIGN PATENT DOCUMENTS

| JP | 2001-313071 A | 11/2001 |
| JP | 2005-340080 | * 12/2005 |
| JP | 2007 80620 | 3/2007 |
| JP | 2007-95380 A | 4/2007 |
| JP | 2008 146929 | 6/2008 |
| JP | 2008 218425 | 9/2008 |
| JP | 2009 140919 | 6/2009 |

OTHER PUBLICATIONS

Extended European Search Report issued Dec. 3, 2013 in Patent Application No. 11789935.1.
U.S. Appl. No. 13/992,106, filed Jun. 6, 2013, Miyoshi, et al.
Culshaw, P. et al., "Sulphonate Esters as Sources of Sulphonyl Radicals; Ring-closure Reactions of Alk -4- and -5-enesulphonyl Radicals." Journal of the Chemical Society, Perkin Transactions 2, No. 8, pp. 1201 to 1208, (1991).
Mattson, A. et al., "Resolution of Diols with C2-Symmetry by Lipase Catalysed Transesterification," Tetrahedron Asymmetry, vol. 4, No. 5, pp. 925 to 930, (1993).
International Search Report Issued Aug. 23, 2011 in PCT/JP11/62841 Filed Jun. 3, 2011.

* cited by examiner

*Primary Examiner* — Laura Weiner
(74) *Attorney, Agent, or Firm* — Oblon, McClelland, Maier & Neustadt, L.L.P

(57) ABSTRACT

The present invention provides a nonaqueous electrolytic solution which can improve the electrochemical characteristics in a broad temperature range, an electrochemical element produced by using the same and a sulfonic ester compound having a branched structure which is used for the same.

The present invention relates to a nonaqueous electrolytic solution prepared by dissolving an electrolyte salt in a nonaqueous solvent, which comprises a sulfonic ester compound represented by the following Formula (I) in an amount of 0.001 to 5% by mass of the nonaqueous electrolytic solution:

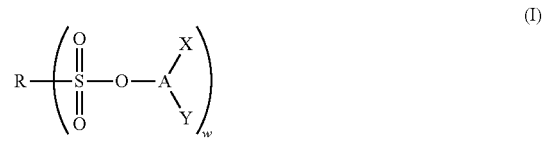

(wherein R represents an alkyl group or an aryl group; A represents a >CH group or a >SiZ group (Z represents an alkyl group or an aryl group); X represents an alkyl group, a cycloalkyl group or an aryl group; Y represents a cycloalkyl group, a -$L^1$CHR$^a$OSO$_2$R$^b$ group or a —Si(R$^c$)(R$^d$)OSO$_2$R$^b$ group; W represents 1 or 2; R$^a$ represents an alkyl group; R$^b$, R$^c$ and R$^d$ represent an alkyl group or an aryl group; L$^1$ represents an alkylene group in which at least one hydrogen atom may be substituted with —OSO$_2$R$^e$ (R$^e$ has the same meaning as that of R), a divalent linkage group containing at least one ether bond or a single bond).

17 Claims, No Drawings

NONAQUEOUS ELECTROLYTE SOLUTION AND ELECTROCHEMICAL ELEMENT USING SAME

TECHNICAL FIELD

The present invention relates to a nonaqueous electrolytic solution which can improve the electrochemical characteristics in a broad temperature range and an electrochemical element prepared by using the same.

BACKGROUND ART

In recent years, an electrochemical element, particularly a lithium secondary battery is widely used for power sources and electric power storage of small-sized electronic devices, such as cellular phones, notebook-size personal computers and the like and electric vehicles. There is a possibility that the above electronic devices and electric vehicles are used in a broad temperature range, such as high temperature in the middle of summer and low temperature in a severe cold season, and therefore they are requested to be improved in electrochemical characteristics at a good balance in a broad temperature range.

In particular, it is urgently required to reduce a discharge of $CO_2$ in order to prevent global warming, and hybrid electric vehicles (HEV), plug-in hybrid electric vehicles (PHEV) and battery electric vehicles (BEV) among environmental response vehicles loaded with electrical storage devices comprising electrochemical elements, such as lithium secondary batteries, capacitors and the like are required to spread in early stages. However, vehicles move at a long distance, and therefore they are likely to be used in regions of a broad temperature range from very hot regions in tropical zones to regions in a severe cold zones. Accordingly, the above electrochemical elements for vehicles are required not to be deteriorated in electrochemical characteristics even when they are used in a broad temperature range from high temperature to low temperature.

Lithium secondary batteries are constituted principally from a positive electrode and a negative electrode containing a material which can absorb and release lithium and a non-aqueous electrolytic solution containing a lithium salt and a nonaqueous solvent, and carbonates, such as ethylene carbonate (EC), propylene carbonate (PC) and the like are used as the nonaqueous solvent.

Also, metal lithium, metal compounds which can absorb and release lithium (metal simple substances, oxides, alloys with lithium, etc.) and carbon materials are known as the negative electrode. In particular, lithium secondary batteries produced by using carbon materials, such as cokes, artificial graphites, natural graphites and the like which can absorb and release lithium are widely put into practical use.

In the present specification, the term of a lithium secondary battery is used as a concept including as well a so-called lithium ion secondary battery.

In lithium secondary batteries produced by using, for example, highly crystallized carbon materials, such as artificial graphites, natural graphites and the like as negative electrode materials, it is known that decomposed products and gases generated from a solvent in a nonaqueous electrolytic solution which is reduced and decomposed on a surface of a negative electrode in charging the batteries detract from a desired electrochemical reaction of the batteries, so that a cycle property thereof is worsened. Also, when the decomposed products of the nonaqueous solvent are deposited, lithium can not smoothly be absorbed onto and released from a negative electrode, and the electrochemical characteristics thereof are liable to be worsened in a broad temperature range.

Further, in lithium secondary batteries produced by using lithium metal and alloys thereof, metal simple substances, such as tin, silicon and the like and oxides thereof as negative electrode materials, it is known that an initial battery capacity thereof is high but a nonaqueous solvent is acceleratingly reduced and decomposed as compared with a negative electrode of a carbon material since a micronized powdering of the material is promoted during cycles and that battery performances, such as a battery capacity and a cycle property are worsened to a large extent. Also, in a case the micronized powdering of the negative electrode material and the deposition of the decomposed products of the nonaqueous solvent are deposited, lithium can not smoothly be absorbed onto and released from the negative electrode, and the electrochemical characteristics thereof are liable to be worsened in a broad temperature range.

On the other hand, in lithium secondary batteries produced by using, for example, $LiCoO_2$, $LiMn_2O_4$, $LiNiO_2$, $LiFePO_4$ and the like as a positive electrode, it is known that decomposed products and gases generated from a solvent in a non-aqueous electrolytic solution which is partially oxidized and decomposed in a local part in an interface between the positive electrode material and the nonaqueous electrolytic solution in a charging state detract from a desired electrochemical reaction of the batteries, so that the electrochemical characteristics thereof are worsened as well in a broad temperature range.

As shown above, decomposed products and gases generated when a nonaqueous electrolytic solution is decomposed on a positive electrode or a negative electrode may interfere with a migration of lithium ions or may swell the battery, and the battery performance is thereby worsened. In spite of the above situations, electronic equipments in which lithium secondary batteries are mounted are advanced more and more in multi-functionalization and tend to be increased in an electric power consumption. As a result thereof, lithium secondary batteries are advanced more and more in an elevation of a capacity, and a nonaqueous electrolytic solution is reduced in a volume thereof occupied in the battery, wherein the electrode is increased in a density, and a useless space volume in the battery is reduced. Accordingly, observed is a situation in which the electrochemical characteristics thereof in a broad temperature range are liable to be worsened by decomposition of only a small amount of the nonaqueous electrolytic solution.

It is shown in a patent document 1 that the cycle property at room temperature is excellent when sulfonic ester represented by iso-propyl methanesulfonate is added to a nonaqueous electrolytic solution.

It is shown in a patent document 2 that the cycle property at room temperature is excellent when sulfonic ester represented by methyl methanesulfonate is added to a nonaqueous electrolytic solution.

It is shown in a patent document 3 that the cycle property at 20° C. is excellent when a disulfonic ester compound represented by propylene glycol dimethanesulfonate which has two sulfonate groups and has certainly a side chain on a principal chain is added to a nonaqueous electrolytic solution.

It is shown in a patent document 4 that the cycle property in charging the battery so that an open circuit voltage in completely charging the battery is higher than 4.2 V is excellent when a disulfonic ester compound represented by 1,4-butanediol dimethanesulfonate which has two sulfonate groups and in which a principal chain is a linear alkylene chain is added to a nonaqueous electrolytic solution.

A nonaqueous electrolytic solution containing a silicon compound, such as 1,2-bis(3,5-difluorophenyl)-1,1,2,2-tetramethyldisilane and the like is proposed in a patent document 5, and it is suggested that the cycle property at 60° C. and the low-temperature properties are improved.

Also, a nonaqueous electrolytic solution containing a silicon compound having an alkyl sulfonate group, such as trimethylsilyl methanesulfonate and the like is proposed in a patent document 6, and it is suggested that the cycle property at 25° C. and the trickle charging property are improved.

CITATION LIST

Patent Documents

Patent document 1: JP-A 2007-95380
Patent document 2: JP-A 9-245834
Patent document 3: JP-A 2001-313071
Patent document 4: JP-A 2007-095380
Patent document 5: JP-A 2007-12595
Patent document 6: JP-A 2004-134232

SUMMARY OF THE INVENTION

Problems that the Invention is to Solve

An object of the present invention is to provide a nonaqueous electrolytic solution which can improve the electrochemical characteristics in a broad temperature range and an electrochemical element produced by using the same.

Means for Solving the Problems

The present inventors have investigated in detail the performances of the nonaqueous electrolytic solutions in the conventional techniques described above. As a result thereof, the existing situation is that though an effect is exerted on a cycle property at room temperature in the nonaqueous electrolytic solutions of the patent documents described above, a subject of improving the electrochemical characteristics in a broad temperature range can not necessarily be sufficiently satisfied.

Accordingly, the present inventors have repeated intensive researches in order to solve the problems described above and found that the electrochemical characteristics in a broad temperature range can be improved by adding a sulfonic ester compound having a specific structure to a nonaqueous electrolytic solution prepared by dissolving an electrolyte salt in a nonaqueous solvent.

To be more specific, the present inventors have found that the electrochemical characteristics in a broad temperature range can be improved by adding at least one selected from:
(I) a sulfonic ester compound having a methine proton (RSO$_3$—CHR'R') on carbon atom to which a sulfonyloxy group is bonded,
(II) a sulfonic ester compound having a methine proton (RSO$_3$—CHR'R'—) on carbon atom of a cycloalkyl group to which a sulfonyloxy group is bonded,
(III) a sulfonic ester compound having a methine proton (RSO$_3$—CHR'—) on carbon atom to which two sulfonyloxy groups are bonded respectively and
(IV) a sulfonate compound having a specific silicon atom, and thus they have completed the present invention.

That is, the present invention provides the following items (1) and (2).
(1) A nonaqueous electrolytic solution prepared by dissolving an electrolyte salt in a nonaqueous solvent, which comprises a sulfonic ester compound represented by the following Formula (I) in an amount of 0.001 to 5% by mass of the nonaqueous electrolytic solution:

[Formula 1]

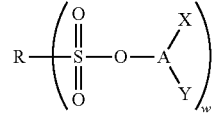
(I)

(wherein R represents an alkyl group having 1 to 6 carbon atoms or an aryl group having 6 to 12 carbon atoms; A represents a >CH group or a >SiZ group (Z represents an alkyl group having 1 to 6 carbon atoms or an aryl group having 6 to 12 carbon atoms); X represents an alkyl group having 1 to 6 carbon atoms, a cycloalkyl group having 3 to 8 carbon atoms or an aryl group having 6 to 12 carbon atoms; Y represents a cycloalkyl group having 3 to 8 carbon atoms, a -L$^1$CHR$^a$OSO$_2$R$^b$ group or a —Si(R$^c$)(R$^d$)OSO$_2$R$^b$ group; W represents 1 or 2;
R$^a$ represents an alkyl group having 1 to 6 carbon atoms; R$^b$, R$^c$ and R$^d$ represent an alkyl group having 1 to 6 carbon atoms or an aryl group having 6 to 12 carbon atoms; L$^1$ represents an alkylene group having 1 to 6 carbon atoms in which at least one hydrogen atom may be substituted with —OSO$_2$R$^e$ (R$^e$ has the same meaning as that of R), a divalent linkage group having 2 to 6 carbon atoms and containing at least one ether bond or a single bond; provided that X and Y bond to each other to form a ring and that when W is 2, R represents an alkylene group having 1 to 6 carbon atoms; and at least one hydrogen atom on the carbon atom of the alkyl group having 1 to 6 carbon atoms, the aryl group having 6 to 12 carbon atoms and the alkylene group having 1 to 6 carbon atoms each described above may be substituted with a halogen atom).
(2) An electrochemical element comprising a positive electrode, a negative electrode and a nonaqueous electrolytic solution prepared by dissolving an electrolyte salt in a nonaqueous solvent, wherein the above nonaqueous electrolytic solution is the nonaqueous electrolytic solution according to the item (1) described above.

To be more specific, the present invention provides the following items (I-1) to (V).
(I-1) The nonaqueous electrolytic solution (hereinafter referred to as the "invention I-1") according to the item (1) described above, wherein the sulfonic ester compound is represented by the following Formula (II):

[Formula 2]

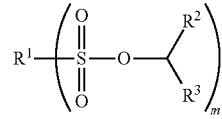
(II)

(wherein m represents an integer of 1 or 2; when m is 1, R$^1$ represents an alkyl group having 1 to 6 carbon atoms or an aryl group having 6 to 12 carbon atoms; R$^2$ represents an alkyl group having 2 to 6 carbon atoms or a cycloalkyl group having 3 to 8 carbon atoms; R$^3$ represents an alkyl group having 1 to 6 carbon atoms or a cycloalkyl group having 3 to 8 carbon atoms; when m is 2, $R^1$ represents an alkylene group having 1 to 6 carbon atoms, and $R^2$ and $R^3$ have the same meanings as in a case in which m is 1; provided that at least one hydrogen atom on the carbon atom of the alkyl group having 1 to 6 carbon atoms, the aryl group having 6 to 12 carbon atoms and the alkylene group having 1 to 6 carbon atoms each described above may be substituted with a halogen atom).

(1-2) A nonaqueous electrolytic solution (hereinafter referred to as the "invention I-2") prepared by dissolving an electrolyte salt in a nonaqueous solvent, which comprises a benzene compound in which a hydrocarbon group having 1 to 6 carbon atoms is bonded to a benzene ring via a tertiary carbon atom or a quaternary carbon atom and/or an S=O group-containing compound having a cyclic structure or an unsaturated group in an amount of 0.001 to 5% by mass of the nonaqueous electrolytic solution, and further comprises a sulfonic ester compound having a branched structure represented by the following Formula (III) in an amount of 0.001 to 5% by mass therein:

[Formula 3]

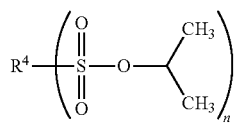

(III)

(wherein n represents an integer of 1 or 2; when n is 1, $R^4$ represents an alkyl group having 1 to 6 carbon atoms or an aryl group having 6 to 12 carbon atoms; when n is 2, $R^4$ represents an alkylene group having 1 to 6 carbon atoms; provided that at least one hydrogen atom on the carbon atom of the alkyl group having 1 to 6 carbon atoms, the aryl group having 6 to 12 carbon atoms and the alkylene group having 1 to 6 carbon atoms each described above may be substituted with a halogen atom).

Hereinafter, the invention I-1 and the invention I-2 each described above shall be referred in all to as "the invention I".

(II) The nonaqueous electrolytic solution (hereinafter referred to as the "invention II") according to the item (1) described above, wherein the sulfonic ester compound is a sulfonic ester compound represented by the following Formula (IV) and having a cycloalkane skeleton:

[Formula 4]

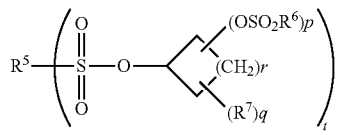

(IV)

(wherein t represents an integer of 1 or 2; when t is 1, $R^5$ and $R^6$ represent an alkyl group having 1 to 6 carbon atoms or an aryl group having 6 to 12 carbon atoms; $R^7$ represents an alkyl group having 1 to 6 carbon atoms, and $R^7$ may bond with a carbon atom on a cyclo ring to form a ring; r represents an integer of 0 to 10, and p and q each represent independently an integer of 0 to 3; when t is 2, $R^5$ represents an alkylene group having 1 to 6 carbon atoms, and $R^6$, $R^7$, r, p and q have the same meanings as in a case in which t is 1; provided that at least one hydrogen atom on the carbon atom of the alkyl group having 1 to 6 carbon atoms and the aryl group having 6 to 12 carbon atoms each described above may be substituted with a halogen atom).

(III-1) The nonaqueous electrolytic solution (hereinafter referred to as the "invention III-1") according to the item (1) described above, wherein the sulfonic ester compound is a sulfonic ester compound represented by the following Formula (V):

[Formula 5]

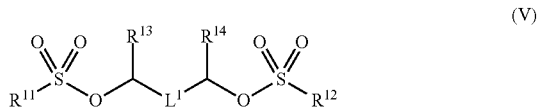

(V)

(wherein $R^{11}$ and $R^{12}$ each represent independently an alkyl group having 1 to 6 carbon atoms or an aryl group having 6 to 12 carbon atoms; $R^{13}$ and $R^{14}$ each represent independently an alkyl group having 1 to 6 carbon atoms; $L^1$ represents an alkylene group having 1 to 6 carbon atoms in which at least one hydrogen atom may be substituted with —$OSO_2R^{15}$ ($R^{15}$ has the same meaning as that of $R^{11}$ or $R^{12}$), a divalent linkage group having 2 to 6 carbon atoms and containing at least one ether bond or a single bond; and at least one hydrogen atom on the carbon atom of the alkyl group having 1 to 6 carbon atoms and the aryl group having 6 to 12 carbon atoms each described above may be substituted with a halogen atom).

(III-2) The nonaqueous electrolytic solution (hereinafter referred to as the "invention III-2") according to the item (III-1) described above, which further comprises a sulfonic ester compound represented by the following Formula (VI) in an amount of 0.001 to 5% by mass of the nonaqueous electrolytic solution:

[Formula 6]

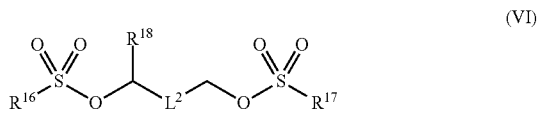

(VI)

(wherein $R^{16}$ and $R^{17}$ each represent independently an alkyl group having 1 to 6 carbon atoms or an aryl group having 6 to 12 carbon atoms; $R^{18}$ represents a hydrogen atom or an alkyl group having 1 to 6 carbon atoms; $L^2$ represents an alkylene group having 1 to 6 carbon atoms in which at least one hydrogen atom may be substituted with —$OSO_2R^{19}$ ($R^{19}$ has the same meaning as that of $R^{16}$ or $R^{17}$), a divalent linkage group having 2 to 6 carbon atoms and containing at least one ether bond or a single bond; and at least one hydrogen atom on the carbon atom of the alkyl group having 1 to 6 carbon atoms and the aryl group having 6 to 12 carbon atoms each described above may be substituted with a halogen atom).

Hereinafter, the invention III-1 and the invention III-2 each described above shall be referred in all to as "the invention III".

(IV) The nonaqueous electrolytic solution (hereinafter referred to as the "invention IV") according to the item (1) described above, wherein the sulfonic ester compound is a compound represented by the following Formula (VII):

[Formula 7]

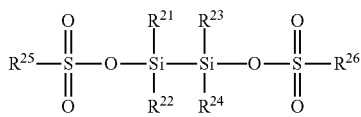
(VII)

(wherein $R^{21}$ to $R^{26}$ may be the same or different and represent an alkyl group having 1 to 6 carbon atoms or an aryl group having 6 to 12 carbon atoms; and at least one hydrogen atom on the carbon atom of the alkyl group having 1 to 6 carbon atoms and the aryl group having 6 to 12 carbon atoms each described above may be substituted with a halogen atom).

(V) An electrochemical element comprising a positive electrode, a negative electrode and a nonaqueous electrolytic solution prepared by dissolving an electrolyte salt in a nonaqueous solvent, wherein the above nonaqueous electrolytic solution is the nonaqueous electrolytic solution according to any of the I invention to the IV invention.

Advantage of the Invention

According to the present invention, capable of being provided are a nonaqueous electrolytic solution which can improve the electrochemical characteristics in a broad temperature range, particularly the low-temperature properties after stored at high temperature and an electrochemical element, such as a lithium battery and the like produced by using the same.

MODE FOR CARRYING OUT THE INVENTION

The present invention relates to a nonaqueous electrolytic solution and an electrochemical element produced by using the same.
Nonaqueous Electrolytic Solution:
The nonaqueous electrolytic solution of the present invention is prepared by dissolving an electrolyte salt in a nonaqueous solvent, which comprises a sulfonic ester compound represented by the following Formula (I) in an amount of 0.001 to 5% by mass of the nonaqueous electrolytic solution:

[Formula 8]

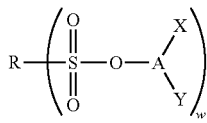
(I)

(wherein R represents an alkyl group having 1 to 6 carbon atoms or an aryl group having 6 to 12 carbon atoms; A represents a >CH group or a >SiZ group (Z represents an alkyl group having 1 to 6 carbon atoms or an aryl group having 6 to 12 carbon atoms); X represents an alkyl group having 1 to 6 carbon atoms, a cycloalkyl group having 3 to 8 carbon atoms or an aryl group having 6 to 12 carbon atoms; Y represents a cycloalkyl group having 3 to 8 carbon atoms, a $-L^1CHR^aOSO_2R^b$ group or a $-Si(R^c)(R^d)OSO_2R^b$ group; W represents 1 or 2; $R^a$ represents an alkyl group having 1 to 6 carbon atoms; $R^b$, $R^c$ and $R^d$ represent an alkyl group having 1 to 6 carbon atoms or an aryl group having 6 to 12 carbon atoms; $L^1$ represents an alkylene group having 1 to 6 carbon atoms in which at least one hydrogen atom may be substituted with $-OSO_2R^e$ ($R^e$ has the same meaning as that of R), a divalent linkage group having 2 to 6 carbon atoms and containing at least one ether bond or a single bond; provided that X and Y may bond to each other to form a ring and that when W is 2, R represents an alkylene group having 1 to 6 carbon atoms; and at least one hydrogen atom on the carbon atom of the alkyl group having 1 to 6 carbon atoms, the aryl group having 6 to 12 carbon atoms and the alkylene group having 1 to 6 carbon atoms each described above may be substituted with a halogen atom).

The present invention is explained, to be more specific, in the forms of the following invention I to invention IV.
<Invention I>
The nonaqueous electrolytic solution of the invention I-1 in the present invention is prepared by dissolving an electrolyte salt in a nonaqueous solvent, which comprises the sulfonic ester compound represented by the following Formula (II) in an amount of 0.001 to 5% by mass of the nonaqueous electrolytic solution:

[Formula 9]

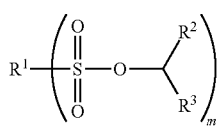
(II)

(wherein m represents an integer of 1 or 2; when m is 1, $R^1$ represents an alkyl group having 1 to 6 carbon atoms or an aryl group having 6 to 12 carbon atoms; $R^2$ represents an alkyl group having 2 to 6 carbon atoms or a cycloalkyl group having 3 to 8 carbon atoms; $R^3$ represents an alkyl group having 1 to 6 carbon atoms or a cycloalkyl group having 3 to 8 carbon atoms; when m is 2, $R^1$ represents an alkylene group having 1 to 6 carbon atoms, and $R^2$ and $R^3$ have the same meanings as in a case in which m is 1; provided that at least one hydrogen atom on the carbon atom of the alkyl group having 1 to 6 carbon atoms, the aryl group having 6 to 12 carbon atoms and the alkylene group having 1 to 6 carbon atoms each described above may be substituted with a halogen atom).

The nonaqueous electrolytic solution of the invention I-2 in the present invention which comprises a benzene compound in which a hydrocarbon group having 1 to 6 carbon atoms is bonded to a benzene ring via a tertiary carbon atom or a quaternary carbon atom and/or an S=O group-containing compound having a cyclic structure or an unsaturated group in an amount of 0.001 to 5% by mass of the nonaqueous electrolytic solution, and further comprises a sulfonic ester compound having a branched structure represented by the following Formula (III) in an amount of 0.001 to 5% by mass therein:

[Formula 10]

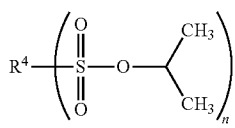
(III)

(wherein n represents an integer of 1 or 2; when n is 1, $R^4$ represents an alkyl group having 1 to 6 carbon atoms or an aryl group having 6 to 12 carbon atoms; when n is 2, $R^4$ represents an alkylene group having 1 to 6 carbon atoms; provided that at least one hydrogen atom on the carbon atom of the alkyl group having 1 to 6 carbon atoms, the aryl group having 6 to 12 carbon atoms and the alkylene group having 1 to 6 carbon atoms each described above may be substituted with a halogen atom).

A reason why the nonaqueous electrolytic solution of the invention I can improve the electrochemical characteristics in a broad temperature range to a large extent is not necessarily clear, but it is estimated as follows.

The sulfonic ester compound represented by Formula (II) which is contained in the nonaqueous electrolytic solution of the invention I has a methine group ($RSO_3$—CHR'R') to which a sulfonyloxy group is bonded. An acidity of a methine proton on carbon to which an electron-withdrawing sulfonyloxy group is bonded is considered to be lower than that of a methylene proton ($RSO_3$—$CH_2$—R') due to an electron-donating effect of R'. The above effect is larger if at least one of two R' has two or more carbon atoms. Accordingly, it is considered that in the sulfonic ester compound represented by Formula (II), a methine group is slowly reacted on the negative electrode in initial charging and that a good protective coating film is formed without depositing too much minutely on a surface of the active material. It has been found that because of the above reason, a specific effect of notably improving the electrochemical characteristics in a broad temperature range from low temperature to high temperature is brought about.

The effect described above is weak when the compound represented by Formula (III) described above in which both of two R' in Formula (II) are a methyl group (one carbon atom) is contained, but it has been found that even when the compound represented by Formula (III) is contained, a specific effect of notably improving the electrochemical characteristics in a broad temperature range from low temperature to high temperature is brought about, as is the case with what has been described above, by further containing the benzene compound in which a hydrocarbon group having 1 to 6 carbon atoms is bonded to a benzene ring via a tertiary carbon atom or a quaternary carbon atom and/or the S=O group-containing compound having a cyclic structure or an unsaturated group. Also in the above case, the effect is considered to be brought about due to that the benzene compound in which a hydrocarbon group having 1 to 6 carbon atoms is bonded to a benzene ring via a tertiary carbon atom or a quaternary carbon atom and/or the S=O group-containing compound having a cyclic structure or an unsaturated group prevent a protective coating film derived from the compound represented by Formula (III) from being too much minutely deposited.

In Formula (II), m is an integer of 1 or 2 and is preferably 2.

When m in Formula (II) is 1, $R^1$ is a linear or branched alkyl group having 1 to 6 carbon atoms in which at least one hydrogen atom may be substituted with a halogen atom or an aryl group having 6 to 12 carbon atoms in which at least one hydrogen atom may be substituted with a halogen atom, preferably a linear or branched alkyl group having 1 to 6 carbon atoms or an aryl group having 6 to 12 carbon atoms in which at least one hydrogen atom may be substituted with a halogen atom, more preferably a linear or branched alkyl group having 1 to 3 carbon atoms or an aryl group having 6 to 10 carbon atoms in which at least one hydrogen atom may be substituted with a halogen atom and particularly preferably a linear alkyl group having 1 or 2 carbon atoms or an aryl group having 6 to 8 carbon atoms.

The suitable examples of $R^1$ in Formula (II) include a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group, a phenyl group, a 2-methylphenyl group, a 3-methylphenyl group, a 4-methylphenyl group, a 4-tert-butylphenyl group, a 2,4,6-trimethylphenyl group, a 4-fluorophenyl group, a 4-chlorophenyl group, a 4-trifluoromethylphenyl group and the like. A methyl group, an ethyl group, a phenyl group and a 4-methylphenyl group are more preferred, and a methyl group and a 4-methylphenyl group are further preferred.

When m in Formula (II) is 2, $R^1$ is a linear or branched alkylene group having 1 to 6 carbon atoms in which at least one hydrogen atom may be substituted with a halogen atom, preferably a linear or branched alkylene group having 1 to 4 carbon atoms in which at least one hydrogen atom may be substituted with a halogen atom, more preferably a linear or branched alkylene group having 1 to 3 carbon atoms in which at least one hydrogen atom may be substituted with a halogen atom and particularly preferably a linear alkylene group having 1 or 2 carbon atoms.

The suitable examples of $R^1$ which is an alkylene group include a methylene group, an ethane-1,2-diyl group, a propane-1,3-diyl group, a butane-1,4-diyl group, a pentane-1,5-diyl group, a hexane-1,6-diyl, an ethane-1,1-diyl group, a propane-1,2-diyl group, a 2,2-dimethylpropane-1,3-diyl group, a fluoromethylene group, a difluoromethylene group and the like. A methylene group, an ethane-1,2-diyl group and a propane-1,3-diyl group are more preferred, and a methylene group and an ethane-1,2-diyl group are further preferred.

$R^2$ in Formula (II) is a linear or branched alkyl group having 2 to 6 carbon atoms in which at least one hydrogen atom may be substituted with a halogen atom or a cycloalkyl group having 3 to 8 carbon atoms, more preferably a linear or branched alkyl group having 2 to 5 carbon atoms or a cycloalkyl group having 3 to 6 carbon atoms and further preferably a branched alkyl group having 3 to 5 carbon atoms or a cycloalkyl group having 3 to 5 carbon atoms.

The suitable examples of $R^2$ described above include an ethyl group, a n-propyl group, a n-butyl group, a n-pentyl group, a n-hexyl group, a 2,2,2-trifluoroethyl, an iso-propyl group, a sec-butyl group, an iso-butyl group, a tert-butyl group, a tert-amyl group, a cyclopropyl group, a cyclobutyl group, a cyclopentyl group, a cyclohexyl group, a cycloheptyl group and the like. An ethyl group, a n-propyl group, a n-butyl group, an iso-propyl group, a sec-butyl group, a tert-butyl group, a tert-amyl group, a cyclopropyl group, a cyclobutyl group, a cyclopentyl group and a cyclohexyl group are more preferred, and an iso-propyl group, a sec-butyl group, a tert-butyl group, a tert-amyl group, a cyclopropyl group, a cyclobutyl group and a cyclopentyl group are further preferred.

$R^3$ in Formula (II) is a linear or branched alkyl group having 1 to 6 carbon atoms in which at least one hydrogen atom may be substituted with a halogen atom or a cycloalkyl group having 3 to 8 carbon atoms, more preferably a linear or branched alkyl group having 2 to 5 carbon atoms or a cycloalkyl group having 3 to 6 carbon atoms and further preferably a branched alkyl group having 3 to 5 carbon atoms or a cycloalkyl group having 3 to 5 carbon atoms.

The suitable examples of $R^3$ described above include a methyl group, an ethyl group, a n-propyl group, a n-butyl group, a n-pentyl group, a n-hexyl group, a 2,2,2-trifluoroethyl group, an iso-propyl group, a sec-butyl group, an iso-butyl group, a tert-butyl group, a tert-amyl group, a cyclopropyl group, a cyclobutyl group, a cyclopentyl group, a cyclohexyl group, a cycloheptyl group and the like. An ethyl group, a n-propyl group, a n-butyl group, an iso-propyl group, a sec-butyl group, a tert-butyl group, a tert-amyl group, a cyclopropyl group, a cyclobutyl group, a cyclopentyl group and a cyclohexyl group are more preferred, and an iso-propyl group, a sec-butyl group, a tert-butyl group, a tert-amyl group, a cyclopropyl group, a cyclobutyl group and a cyclopentyl group are further preferred.

When the substituents fall in the ranges described above, the electrochemical characteristics in a broad temperature range can be improved to a large extent, and therefore they are preferred.

The specific examples of the sulfonic ester compound represented by Formula (II) suitably include butane-2-yl methanesulfonate, butane-2-yl ethanesulfonate, butane-2-yl benzenesulfonate, butane-2-yl 4-methylbenzenesulfonate, bis(butane-2-yl)methanedisulfonate, bis(butane-2-yl)ethane-1,2-disulfonate, pentane-2-yl methanesulfonate, pentane-2-yl ethanesulfonate, pentane-2-yl benzenesulfonate, pentane-2-yl 4-methylbenzenesulfonate, bis(pentane-2-yl)methanedisulfonate, bis(pentane-2-yl)ethane-1,2-disulfonate, pentane-3-yl methanesulfonate, pentane-3-yl ethanesulfonate, pentane-3-yl benzenesulfonate, pentane-3-yl 4-methylbenzenesulfonate, bis(pentane-3-yl)methanedisulfonate, bis(pentane-3-yl)ethane-1,2-disulfonate, hexane-2-yl methanesulfonate, hexane-2-yl ethanesulfonate, hexane-2-yl benzenesulfonate, hexane-2-yl 4-methylbenzenesulfonate, bis(hexane-2-yl)methanedisulfonate, bis(hexane-2-yl)ethane-1,2-disulfonate, hexane-3-yl methanesulfonate, hexane-3-yl ethanesulfonate, hexane-3-yl benzenesulfonate, hexane-3-yl 4-methylbenzenesulfonate, bis(hexane-3-yl)methanedisulfonate, bis(hexane-3-yl)ethane-1,2-disulfonate, heptane-2-yl methanesulfonate, heptane-2-yl ethanesulfonate, heptane-2-yl benzenesulfonate, heptane-2-yl 4-methylbenzenesulfonate, bis(heptane-2-yl)methanedisulfonate, bis(heptane-2-yl)ethane-1,2-disulfonate, heptane-3-yl methanesulfonate, heptane-3-yl ethanesulfonate, heptane-3-yl benzenesulfonate, heptane-3-yl 4-methylbenzenesulfonate, bis(heptane-3-yl)methanedisulfonate, bis(heptane-3-yl)ethane-1,2-disulfonate, heptane-4-yl methanesulfonate, heptane-4-yl ethanesulfonate, heptane-4-yl benzenesulfonate, heptane-4-yl 4-methylbenzenesulfonate, bis(heptane-4-yl)methanedisulfonate, bis(heptane-4-yl)ethane-1,2-disulfonate, octane-2-yl methanesulfonate, octane-2-yl ethanesulfonate, octane-2-yl benzenesulfonate, octane-2-yl 4-methylbenzenesulfonate, bis(octane-2-yl)methanedisulfonate, bis(octane-2-yl)ethane-1,2-disulfonate, nonane-3-yl methanesulfonate, nonane-3-yl ethanesulfonate, nonane-3-yl benzenesulfonate, nonane-3-yl 4-methylbenzenesulfonate, bis(nonane-3-yl)methanedisulfonate, bis(nonane-3-yl)ethane-1,2-disulfonate, 3-methylbutane-2-yl methanesulfonate, 3-methylbutane-2-yl ethanesulfonate, 3-methylbutane-2-yl propane-1-sulfonate, 3-methylbutane-2-yl butane-1-sulfonate, 3-methylbutane-2-yl pentane-1-sulfonate, 3-methylbutane-2-yl hexane-1-sulfonate, 3-methylbutane-2-yl trifluoromethanesulfonate, 3-methylbutane-2-yl 2,2,2-trifluoroethanesulfonate, 3-methylbutane-2-yl propane-2-sulfonate, 3-methylbutane-2-yl butane-2-sulfonate, 3-methylbutane-2-yl 2-methylpropane-2-sulfonate, 3-methylbutane-2-yl 2-methylbutane-2-sulfonate, 3-methylbutane-2-yl benzenesulfonate, 3-methylbutane-2-yl 2-methylbenzenesulfonate, 3-methylbutane-2-yl 3-methylbenzenesulfonate, 3-methylbutane-2-yl 4-methylbenzenesulfonate, 3-methylbutane-2-yl 4-tert-butylbenzenesulfonate, 3-methylbutane-2-yl 2,4,6-trimethylbenzenesulfonate, 3-methylbutane-2-yl 4-fluorobenzenesulfonate, 3-methylbutane-2-yl 4-chlorobenzenesulfonate, 3-methylbutane-2-yl 4-trifluoromethylbenzenesulfonate, bis(3-methylbutane-2-yl)methanedisulfonate, bis(3-methylbutane-2-yl)ethane-1,2-disulfonate, bis(3-methylbutane-2-yl)propane-1,3-disulfonate, 3,3-dimethyl-butane-2-yl methanesulfonate, 3,3-dimethyl-butane-2-yl ethanesulfonate, 3,3-dimethyl-butane-2-yl benzenesulfonate, 3,3-dimethyl-butane-2-yl 4-methylbenzenesulfonate, bis(3,3-dimethylbutane-2-yl)methanedisulfonate, bis(3,3-dimethylbutane-2-yl)ethane-1,2-disulfonate, 4-methylpentane-2-yl methanesulfonate, 4-methylpentane-2-yl ethanesulfonate, 4-methylpentane-2-yl benzenesulfonate, 4-methylpentane-2-yl 4-methylbenzenesulfonate, bis(4-methylpentane-2-yl)methanedisulfonate, bis(4-methylpentane-2-yl)ethane-1,2-disulfonate, 2-methylpentane-3-yl methanesulfonate, 2-methylpentane-3-yl ethanesulfonate, 2-methylpentane-3-yl benzenesulfonate, 2-methylpentane-2-yl 4-methylbenzenesulfonate, bis(2-methylpentane-3-yl)methanedisulfonate, bis(2-methylpentane-3-yl)ethane-1,2-disulfonate, 2,4-dimethylpentane-3-yl methanesulfonate, 2,4-dimethylpentane-3-yl ethanesulfonate, 2,4-dimethylpentane-3-yl benzenesulfonate, 2,4-dimethylpentane-3-yl 4-methylbenzenesulfonate, bis(2,4-dimethylpentane-3-yl)methanedisulfonate, bis(2,4-dimethylpentane-3-yl)ethane-1,2-disulfonate, 2,2-dimethylpentane-3-yl methanesulfonate, 2,2-dimethylpentane-3-yl ethanesulfonate, 2,2-dimethylpentane-3-yl benzenesulfonate, 2,2-dimethylpentane-3-yl 4-methylbenzenesulfonate, bis(2,2-dimethylpentane-3-yl)methanedisulfonate, bis(2,2-dimethylpentane-3-yl)ethane-1,2-disulfonate, 2,2,4-trimethylpentane-3-yl methanesulfonate, 2,2,4-trimethylpentane-3-yl ethanesulfonate, 2,2,4-trimethylpentane-3-yl benzenesulfonate, 2,2,4-trimethylpentane-3-yl 4-methylbenzenesulfonate, bis(2,2,4-trimethylpentane-3-yl)methanedisulfonate, bis(2,2,4-trimethylpentane-3-yl)ethane-1,2-disulfonate, 2,2,4,4-tetramethylpentane-3-yl methanesulfonate, 2,2,4,4-tetramethylpentane-3-yl ethanesulfonate, 2,2,4,4-tetramethylpentane-3-yl benzenesulfonate, 2,2,4,4-tetramethylpentane-3-yl 4-methylbenzenesulfonate, bis(2,2,4,4-tetramethylpentane-3-yl)methanedisulfonate, bis(2,2,4,4-tetramethylpentane-3-yl)ethane-1,2-disulfonate, 2-methylhexane-3-yl methanesulfonate, 2-methylhexane-3-yl ethanesulfonate, 2-methylhexane-3-yl benzenesulfonate, 2-methylhexane-3-yl 4-methylbenzenesulfonate, bis(2-methylhexane-3-yl)methanedisulfonate, bis(2-methylhexane-3-yl)ethane-1,2-disulfonate, 2,2-dimethylhexane-3-yl methanesulfonate, 2,2-dimethylhexane-3-yl ethanesulfonate, 2,2-dimethylhexane-3-yl benzenesulfonate, 2,2-dimethylhexane-3-yl 4-methylbenzenesulfonate, bis(2,2-dimethylhexane-3-yl)methanedisulfonate, bis(2,2-dimethylhexane-3-yl)ethane-1,2-disulfonate, 1-cyclopropylethyl methanesulfonate, 1-cyclopropylethyl ethanesulfonate, 1-cyclopropylethyl benzenesulfonate, 1-cyclopropylethyl 4-methylbenzenesulfonate, bis(1-cyclopropylethyl)methanedisulfonate, bis(1-cyclopropylethyl)ethane-1,2-disulfonate, 1-cyclobutylethyl methanesulfonate, 1-cyclobutylethyl ethanesulfonate, 1-cyclobutylethyl benzenesulfonate, 1-cyclobutylethyl 4-methylbenzenesulfonate, bis(1-cyclobutylethyl)methanedisulfonate, bis(1-cyclobutylethyl)ethane-1,2-disulfonate, 1-cyclopentylethyl methanesulfonate, 1-cyclopentylethyl ethanesulfonate, 1-cyclopentylethyl benzenesulfonate, 1-cyclopentylethyl 4-methylbenzenesulfonate, bis(1-cyclopentylethyl)methanedisulfonate, bis(1-cyclopentylethyl)ethane-1,2-disulfonate, 1-cyclohexylethyl methanesulfonate, 1-cyclohexylethyl ethanesulfonate, 1-cyclohexylethyl benzenesulfonate, 1-cyclohexylethyl 4-methylbenzenesulfonate, bis(1-cyclohexylethyl)methanedisulfonate, bis(1-cyclohexylethyl)ethane-1,2-disulfonate and the like.

Among them, the more preferred examples of the sulfonic ester compound represented by Formula (II) are butane-2-yl methanesulfonate, butane-2-yl ethanesulfonate, butane-2-yl benzenesulfonate, butane-2-yl 4-methylbenzenesulfonate, bis(butane-2-yl)methanedisulfonate, bis(butane-2-yl)ethane-1,2-disulfonate, pentane-2-yl methanesulfonate, pentane-2-yl ethanesulfonate, pentane-2-yl benzenesulfonate, pentane-2-yl 4-methylbenzenesulfonate, bis(pentane-2-yl)methanedisulfonate, bis(pentane-2-yl)ethane-1,2-disulfonate, pentane-3-yl methanesulfonate, pentane-3-yl ethanesulfonate, pentane-3-yl benzenesulfonate, pentane-3-yl 4-methylbenzenesulfonate, bis(pentane-3-yl)methanedisulfonate, bis(pentane-3-yl) ethane-1,2-disulfonate, 3-methylbutane-2-yl methanesulfonate, 3-methylbutane-2-yl ethanesulfonate, 3-methylbutane-2-yl benzenesulfonate, 3-methylbutane-2-yl 4-methylbenzenesulfonate, bis(3-methylbutane-2-yl)methanedisulfonate, bis(3-methylbutane-2-yl)ethane-1,2-disulfonate, 3,3-dimethylbutane-2-yl methanesulfonate, 3,3-dimethylbutane-2-yl ethanesulfonate, 3,3-dimethylbutane-2-yl benzenesulfonate, 3,3-dimethylbutane-2-yl 4-methylbenzenesulfonate, bis(3,3-dimethylbutane-2-yl)methanedisulfonate, bis(3,3-dimethylbutane-2-yl)ethane-1,2-disulfonate, 4-methylpentane-2-yl methanesulfonate, 4-methylpentane-2-yl ethanesulfonate, 4-methylpentane-2-yl benzenesulfonate, 4-methylpentane-2-yl 4-methylbenzenesulfonate, bis(4-methylpentane-2-yl)methanedisulfonate, bis(4-methylpentane-2-yl)ethane-1,2-disulfonate, 2-methylpentane-3-yl methanesulfonate, 2-methylpentane-3-yl ethanesulfonate, 2-methylpentane-3-yl benzenesulfonate, 2-methylpentane-3-yl 4-methylbenzenesulfonate, bis(2-methylpentane-3-yl)methanedisulfonate, bis(2-methylpentane-3-yl)ethane-1,2-disulfonate, 2,4-dimethylpentane-3-yl methanesulfonate, 2,4-dimethylpentane-3-yl ethanesulfonate, 2,4-dimethylpentane-3-yl benzenesulfonate, 2,4-dimethylpentane-3-yl 4-methylbenzenesulfonate, bis(2,4-dimethylpentane-3-yl)methanedisulfonate, bis(2,4-dimethylpentane-3-yl)ethane-1,2-disulfonate, 1-cyclopropylethyl methanesulfonate, 1-cyclopropylethyl ethanesulfonate, 1-cyclopropylethyl benzenesulfonate, 1-cyclopropylethyl 4-methylbenzenesulfonate, bis(1-cyclopropylethyl)methanedisulfonate, bis(1-cyclopropylethyl)ethane-1,2-disulfonate, 1-cyclobutylethyl methanesulfonate, 1-cyclobutylethyl ethanesulfonate, 1-cyclobutylethyl benzenesulfonate, 1-cyclobutylethyl 4-methylbenzenesulfonate, bis(1-cyclobutylethyl)methanedisulfonate, bis(1-cyclobutylethyl)ethane-1,2-disulfonate, 1-cyclopentylethyl methanesulfonate, 1-cyclopentylethyl ethanesulfonate, 1-cyclopentylethyl benzenesulfonate, 1-cyclopentylethyl 4-methylbenzenesulfonate, bis(1-cyclopentylethyl)methanedisulfonate, bis(1-cyclopentylethyl)ethane-1,2-disulfonate, 1-cyclohexylethyl methanesulfonate, 1-cyclohexylethyl ethanesulfonate, 1-cyclohexylethyl benzenesulfonate, 1-cyclohexylethyl 4-methylbenzenesulfonate, bis(1-cyclohexylethyl)methanedisulfonate and bis(1-cyclohexylethyl)ethane-1,2-disulfonate.

Among them, the further preferred examples of the sulfonic ester compound represented by Formula (II) are 3-methylbutane-2-yl methanesulfonate, 3-methylbutane-2-yl 4-methylbenzenesulfonate, bis(3-methylbutane-2-yl)methanedisulfonate, bis(3-methylbutane-2-yl)ethane-1,2-disulfonate, 3,3-dimethylbutane-2-yl methanesulfonate, 3,3-dimethylbutane-2-yl 4-methylbenzenesulfonate, bis(3,3-dimethylbutane-2-yl)methanedisulfonate, bis(3,3-dimethylbutane-2-yl)ethane-1,2-disulfonate, 2-methylpentane-3-yl methanesulfonate, 2-methylpentane-3-yl 4-methylbenzenesulfonate, bis(2-methylpentane-3-yl)methanedisulfonate, bis(2-methylpentane-3-yl)ethane-1,2-disulfonate, 1-cyclopropylethyl methanesulfonate, 1-cyclopropylethyl 4-methylbenzenesulfonate, bis(1-cyclopropylethyl)methanedisulfonate, bis(1-cyclopropylethyl)ethane-1,2-disulfonate, 1-cyclobutylethyl methanesulfonate, 1-cyclobutylethyl 4-methylbenzenesulfonate, bis(1-cyclobutylethyl)methanedisulfonate, bis(1-cyclobutylethyl)ethane-1,2-disulfonate, 1-cyclopentylethyl methanesulfonate, 1-cyclopentylethyl 4-methylbenzenesulfonate, bis(1-cyclopentylethyl)methanedisulfonate and bis(1-cyclopentylethyl)ethane-1,2-disulfonate.

The sulfonic ester compound represented by Formula (II) has optical isomers in a certain case. An R form and an S form can be present as the optical isomers, and both of them provide the effects of the present invention in the invention I-1. Also, the optical isomers described above can be used as well in a mixture of an optional ratio, and the effects of the present invention are provided in both of a case in which one of the optical isomers is present in excess (optically active material) and a case in which the optical isomers are present in the same amount (racemic form). Further, when diastereomers can be present, the diastereomers are not necessarily identical in chemical or electrochemical properties thereof, and therefore the degrees of the effects of the present invention are different in a certain case depending on an abundance ratio of the diastereomers, but when any of the optical isomers is used alone or in a mixture of a plurality thereof, the effects of the present invention are provided as well.

[Formula 11]

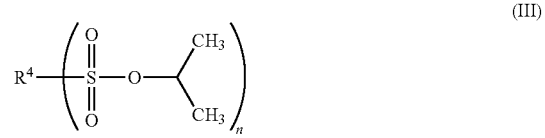

(III)

(wherein n represents an integer of 1 or 2; when n is 1, $R^4$ represents an alkyl group having 1 to 6 carbon atoms or an aryl group having 6 to 12 carbon atoms; when n is 2, $R^4$ represents an alkylene group having 1 to 6 carbon atoms; provided that at least one hydrogen atom on the carbon atom of the alkyl group having 1 to 6 carbon atoms, the aryl group having 6 to 12 carbon atoms and the alkylene group having 1 to 6 carbon atoms each described above may be substituted with a halogen atom).

The term n in Formula (III) is an integer of 1 or 2, and it is preferably 2.

When n in Formula (III) is 1, $R^4$ is a linear or branched alkyl group having 1 to 6 carbon atoms, a linear or branched halogenated alkyl group having 1 to 6 carbon atoms in which at least one hydrogen atom is substituted with a halogen atom or an aryl group having 6 to 12 carbon atoms in which a hydrogen atom may be substituted with a halogen atom, preferably a linear or branched alkyl group having 1 to 6 carbon atoms or an aryl group having 6 to 12 carbon atoms in which a hydrogen atom may be substituted with a halogen atom, more preferably a linear or branched alkyl group having 1 to 3 carbon atoms or an aryl group having 6 to 10 carbon atoms in which a hydrogen atom may be substituted with a halogen atom and particularly preferably a linear alkyl group having 1 or 2 carbon atoms or an aryl group having 6 to 8 carbon atoms.

The suitable examples of $R^4$ in Formula (III) include a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group, a phenyl group, a 2-methylphenyl group, a 3-methylphenyl group, a 4-methylphenyl group, a 4-tert-butylphenyl group, a 2,4,6-trimethylphenyl group, a 4-fluorophenyl group, a 4-chlorophenyl group, a 4-trifluoromethylphenyl group and the like. A methyl group, an ethyl group, a phenyl group and a 4-methylphenyl group are more preferred, and a methyl group and a 4-methylphenyl group are further preferred.

When n in Formula (III) is 2, $R^4$ is a linear or branched alkylene group having 1 to 6 carbon atoms in which a hydrogen atom may be substituted with a halogen atom, preferably a linear or branched alkylene group having 1 to 4 carbon atoms in which a hydrogen atom may be substituted with a halogen atom, more preferably a linear or branched alkylene group having 1 to 3 carbon atoms in which a hydrogen atom may be substituted with a halogen atom and particularly preferably a linear alkylene group having 1 or 2 carbon atoms.

The suitable examples of $R^4$ which is an alkylene group include a methylene group, an ethane-1,2-diyl group, a propane-1,3-diyl group, a butane-1,4-diyl group, a pentane-1,5-diyl group, a hexane-1,6-diyl group, an ethane-1,1-diyl group, a propane-1,2-diyl group, a 2,2-dimethylpropane-1,3-diyl group, a fluoromethylene group, a difluoromethylene group and the like. A methylene group, an ethane-1,2-diyl group and a propane-1,3-diyl group are more preferred, and a methylene group and an ethane-1,2-diyl group are further preferred.

The specific examples of the sulfonic ester compound represented by Formula (III) suitably include propane-2-yl methanesulfonate, propane-2-yl ethanesulfonate, propane-2-yl benzenesulfonate, propane-2-yl 4-methylbenzenesulfonate, bis(propane-2-yl)methanedisulfonate, bis(propane-2-yl) ethane-1,2-disulfonate and bis(propane-2-yl) propane-1,3-disulfonate. Among them, propane-2-yl methanesulfonate, propane-2-yl 4-methylbenzenesulfonate, bis(propane-2-yl)methanedisulfonate and bis(propane-2-yl) ethane-1,2-disulfonate are more preferred.

In the nonaqueous electrolytic solution of the invention I, a content of the sulfonic ester compound represented by Formula (II) or (III) which is contained in the nonaqueous electrolytic solution is preferably 0.001 to 5% by mass in the nonaqueous electrolytic solution. If the above content is 5% by mass or less, the coating film is less likely to be formed in excess on the electrode and worsened in low-temperature properties. On the other hand, if it is 0.001% by mass or more, the coating film is formed sufficiently well and enhanced in an effect of improving a high-temperature storage property. The above content is preferably 0.01% by mass or more, more preferably 0.05% by mass or more and further preferably 0.1% by mass or more in the nonaqueous electrolytic solution, and an upper limit thereof is preferably 5% by mass or less, more preferably 3% by mass or less and further preferably 1% by mass or less.

In the nonaqueous electrolytic solution of the invention I, the electrochemical characteristics in a broad temperature range are improved by adding the sulfonic ester compound represented by Formula (II) or the sulfonic ester compound represented by Formula (III) in combination with the benzene compound in which a hydrocarbon group having 1 to 6 carbon atoms is bonded to a benzene ring via a tertiary carbon atom or a quaternary carbon atom and/or the S=O group-containing compound having a cyclic structure or an unsaturated group. A specific effect of synergistically improving the electrochemical characteristics in a broad temperature range is exerted by combining a nonaqueous solvent, an electrolyte salt and other additives which are described below. A reason therefor is not clear, but it is considered to be due to that a mixed coating film of a high ionic conductivity containing the constitutional elements of the above nonaqueous solvent, electrolyte salt and other additives is formed.

<Invention II>

The nonaqueous electrolytic solution of the invention II in the present invention is prepared by dissolving an electrolyte salt in a nonaqueous solvent, which comprises the sulfonic ester compound represented by the following Formula (IV) and having a cycloalkane skeleton in an amount of 0.001 to 5% by mass of the nonaqueous electrolytic solution:

[Formula 12]

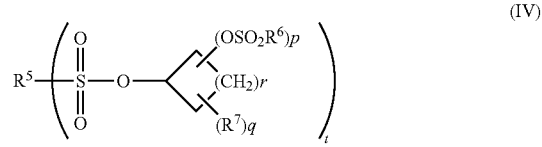

(wherein t represents an integer of 1 or 2; when t is 1, $R^5$ and $R^6$ represent an alkyl group having 1 to 6 carbon atoms or an aryl group having 6 to 12 carbon atoms; $R^7$ represents an alkyl group having 1 to 6 carbon atoms, and $R^7$ may bond with a carbon atom on a cyclo ring to form a ring; r represents an integer of 0 to 10, and p and q each represent independently an integer of 0 to 3; when t is 2, $R^5$ represents an alkylene group having 1 to 6 carbon atoms; $R^6$, $R^7$, r, p and q have the same meanings as in a case in which t is 1; provided that at least one hydrogen atom on the carbon atom of the alkyl group having 1 to 6 carbon atoms and the aryl group having 6 to 12 carbon atoms each described above may be substituted with a halogen atom).

A reason why the nonaqueous electrolytic solution of the invention II can improve the electrochemical characteristics in a broad temperature range to a large extent is not necessarily clear, but it is estimated as follows.

The sulfonic ester compound represented by Formula (IV) which is contained in the nonaqueous electrolytic solution of the invention II has a methine group ($RSO_3$—CHR'R') to which a sulfonyloxy group is bonded. It is considered that an acidity of a methine proton on carbon to which an electron-withdrawing sulfonyloxy group is bonded is considered to be lower than that of a methylene proton ($RSO_3$—$CH_2$—) due to an electron-donating effect of R', and in addition thereto, a cycloalkyl group has a suitable bulkiness. Accordingly, it is considered that in the sulfonic ester compound represented by Formula (IV), the methine group is slowly reacted on the negative electrode in initial charging and that a good protective coating film is formed without depositing too much minutely on a surface of the active material due to a suitable bulkiness of the cycloalkyl group. It has been found that because of the above reasons, a specific effect of notably improving the electrochemical characteristics in a broad temperature range from low temperature to high temperature is brought about.

The term t in Formula (IV) is an integer of 1 or 2, and it is preferably 2.

When t in Formula (IV) is 1, $R^5$ is a linear or branched alkyl group having 1 to 6 carbon atoms in which at least one hydrogen atom may be substituted with a halogen atom or an aryl group having 6 to 12 carbon atoms in which at least one hydrogen atom may be substituted with a halogen atom, preferably a linear or branched alkyl group having 1 to 6 carbon atoms or an aryl group having 6 to 12 carbon atoms in which at least one hydrogen atom may be substituted with a halogen atom, more preferably a linear or branched alkyl group having 1 to 3 carbon atoms or an aryl group having 6 to 10 carbon atoms in which at least one hydrogen atom may be substituted with a halogen atom and particularly preferably a linear alkyl group having 1 or 2 carbon atoms or an aryl group having 6 to 8 carbon atoms.

The suitable examples of $R^5$ in Formula (IV) include a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group, a phenyl group, a 2-methylphenyl group, a 3-methylphenyl group, a 4-methylphenyl group, a 4-tert-butylphenyl group, a 2,4,6-trimethylphenyl group, a 4-fluorophenyl group, a 4-chlorophenyl group, a 4-trifluoromethylphenyl group and the like. A methyl group, an ethyl group, a phenyl group and a 4-methylphenyl group are more preferred, and a methyl group and a 4-methylphenyl group are further preferred.

When t in Formula (IV) described above is 2, $R^5$ is a linear or branched alkylene group having 1 to 6 carbon atoms in which at least one hydrogen atom may be substituted with a halogen atom, preferably a linear or branched alkylene group having 1 to 4 carbon atoms in which at least one hydrogen atom may be substituted with a halogen atom, more preferably a linear or branched alkylene group having 1 to 3 carbon atoms in which at least one hydrogen atom may be substituted with a halogen atom and particularly preferably a linear alkylene group having 1 or 2 carbon atoms.

The suitable examples of $R^5$ which is an alkylene group include a methylene group, an ethane-1,2-diyl group, a propane-1,3-diyl group, a butane-1,4-diyl group, a pentane-1,5-diyl group, a hexane-1,6-diyl group, an ethane-1,1-diyl group, a propane-1,2-diyl group, a 2,2-dimethylpropane-1,3-diyl group, a fluoromethylene group, a difluoromethylene group and the like. Among them, a methylene group, an ethane-1,2-diyl group and a propane-1,3-diyl group are more preferred, and a methylene group and an ethane-1,2-diyl group are further preferred.

$R^6$ in Formula (IV) is a linear or branched alkyl group having 1 to 6 carbon atoms in which at least one hydrogen atom may be substituted with a halogen atom or an aryl group having 6 to 12 carbon atoms in which at least one hydrogen atom may be substituted with a halogen atom, preferably a linear or branched alkyl group having 1 to 6 carbon atoms or an aryl group having 6 to 12 carbon atoms in which at least one hydrogen atom may be substituted with a halogen atom, more preferably a linear or branched alkyl group having 1 to 3 carbon atoms or an aryl group having 6 to 10 carbon atoms in which at least one hydrogen atom may be substituted with a halogen atom and particularly preferably a linear alkyl group having 1 or 2 carbon atoms or an aryl group having 6 to 8 carbon atoms.

The suitable examples of $R^6$ described above include a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group, a phenyl group, a 2-methylphenyl group, a 3-methylphenyl group, a 4-methylphenyl group, a 4-tert-butylphenyl group, a 2,4,6-trimethylphenyl group, a 4-fluorophenyl group, a 4-chlorophenyl group, a 4-trifluoromethylphenyl group and the like. A methyl group, an ethyl group, a phenyl group and a 4-methylphenyl group are more preferred, and a methyl group and a 4-methylphenyl group are further preferred.

$R^7$ in Formula (IV) is a linear or branched alkyl group having 1 to 6 carbon atoms in which at least one hydrogen atom may be substituted with a halogen atom, more preferably a linear or branched alkyl group having 1 to 3 carbon atoms and further preferably a linear alkyl group having 1 or 2 carbon atoms.

The suitable examples of $R^7$ described above include a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group and the like. A methyl group, an ethyl group, a n-propyl group, a n-butyl group and an iso-propyl group are more preferred, and a methyl group and an ethyl group are further preferred.

The term r in Formula (IV) is an integer of 0 to 10, preferably 0 to 6, more preferably an integer of 0 to 5, further preferably an integer of 1 to 4 and most preferably 2 or 3.

The terms p and q in Formula (IV) each are independently an integer of 0 to 3, preferably 0 or 1. When the substituents fall in the ranges described above, the electrochemical characteristics in a broad temperature range can be improved to a large extent, and therefore they are preferred.

The specific examples of the sulfonic ester compound represented by Formula (IV) suitably include:

(i) cyclopropyl methanesulfonate, cyclopropyl ethanesulfonate, cyclopropyl benzenesulfonate, cyclopropyl 4-methylbenzenesulfonate, dicyclopropyl methanedisulfonate, dicyclopropyl ethane-1,2-disulfonate; cyclobutyl methanesulfonate, cyclobutyl ethanesulfonate, cyclobutyl benzenesulfonate, cyclobutyl 4-methylbenzenesulfonate, dicyclobutyl methanedisulfonate, dicyclobutyl ethane-1,2-disulfonate; cyclopentyl methanesulfonate, cyclopentyl ethanesulfonate, cyclopentyl propane-1-sulfonate, cyclopentyl butane-1-sulfonate, cyclopentyl pentane-1-sulfonate, cyclopentyl hexane-1-sulfonate, cyclopentyl trifluoromethanesulfonate, cyclopentyl 2,2,2-trifluoroethanesulfonate, cyclopentyl propane-2-sulfonate, cyclopentyl butane-2-sulfonate, cyclopentyl 2-methylpropane-2-sulfonate, cyclopentyl 2-methylbutane-2-sulfonate, cyclopentyl benzenesulfonate, cyclopentyl 2-methylbenzenesulfonate, cyclopentyl 3-methylbenzenesulfonate, cyclopentyl 4-methylbenzenesulfonate, cyclopentyl 4-tert-butylbenzenesulfonate, cyclopentyl 2,4,6-trimethylbenzenesulfonate, cyclopentyl 4-fluorobenzenesulfonate, cyclopentyl 4-chlorobenzenesulfonate, cyclopentyl 4-trifluoromethylbenzenesulfonate, dicyclopentyl methanedisulfonate, dicyclopentyl ethane-1,2-disulfonate, dicyclopentyl propane-1,3-disulfonate, (ii) 2-methylcyclopentyl methanesulfonate, 2-methylcyclopentyl ethanesulfonate, 2-methylcyclopentyl benzenesulfonate, 2-methylcyclopentyl 4-methylbenzenesulfonate, bis(2-methylcyclopentyl)methanedisulfonate, bis(2-methylcyclopentyl)ethane-1,2-disulfonate, (iii) cyclohexyl methanesulfonate, cyclohexyl ethanesulfonate, cyclohexyl propane-1-sulfonate, cyclohexyl butane-1-sulfonate, cyclohexyl pentane-1-sulfonate, cyclohexyl hexane-1-sulfonate, cyclohexyl trifluoromethanesulfonate, cyclohexyl 2,2,2-trifluoroethanesulfonate, cyclohexyl propane-2-sulfonate, cyclohexyl butane-2-sulfonate, cyclohexyl 2-methylpropane-2-sulfonate, cyclohexyl 2-methylbutane-2-sulfonate, cyclohexyl benzenesulfonate, cyclohexyl 2-methylbenzenesulfonate, cyclohexyl 3-methylbenzenesulfonate, cyclohexyl 4-methylbenzenesulfonate, cyclohexyl 4-tert-butylbenzenesulfonate, cyclohexyl 2,4,6-trimethylbenzenesulfonate, cyclohexyl 4-fluorobenzenesulfonate, cyclohexyl 4-chlorobenzenesulfonate, cyclohexyl 4-trifluoromethylbenzenesulfonate, dicyclohexyl methanedisulfonate, dicyclohexyl ethane-1,2-disulfonate, dicyclohexyl propane-1,3-disulfonate, (iv) 2-methylcyclohexyl methanesulfonate, 2-methylcyclohexyl ethanesulfonate, 2-methylcyclohexyl benzenesulfonate, 2-methylcyclohexyl 4-methylbenzenesulfonate, bis(2-methylcyclohexyl)methanedisulfonate, bis(2-methylcyclohexyl)ethane-1,2-disulfonate; 2-ethylcyclohexyl methanesulfonate, 2-ethylcyclohexyl ethanesulfonate, 2-ethylcyclohexyl benzenesulfonate, 2-ethylcyclohexyl 4-methylbenzenesulfonate, bis(2-ethylcyclohexyl)methanedisulfonate, bis(2-ethylcyclohexyl)ethane-1,2-disulfonate; 2,6-dimethylcyclohexyl methanesulfonate, 2,6-dimethylcyclohexyl ethanesulfonate, 2,6-dimethylcyclohexyl benzenesulfonate, 2,6-dimethylcyclohexyl 4-methylbenzenesulfonate, bis(2,6-dimethylcyclohexyl)methanedisulfonate, (v) cycloheptyl methanesulfonate, cycloheptyl ethanesulfonate, cycloheptyl benzenesulfonate, cycloheptyl 4-methylbenzenesulfonate, dicycloheptyl methanedisulfonate, dicycloheptyl ethane-1,2-disulfonate; cyclooctyl methanesulfonate, cyclooctyl ethanesulfonate, cyclooctyl benzenesulfonate, cyclooctyl 4-methylbenzenesulfonate, dicyclooctyl methanedisulfonate; cyclononyl methanesulfonate, cyclononyl ethanesulfonate, cyclononyl benzenesulfonate, cyclononyl 4-methylbenzenesulfonate, dicyclononyl methanedisulfonate; cyclodecyl methanesulfonate, cyclodecyl ethanesulfonate, cyclodecyl benzenesulfonate, cyclodecyl 4-methylbenzenesulfonate, dicyclodecyl methanedisulfonate; cycloundecyl methanesulfonate, cycloundecyl ethanesulfonate, cycloundecyl benzenesulfonate, cycloundecyl 4-methylbenzenesulfonate, dicycloundecyl methanedisulfonate; cyclododecyl methanesulfonate, cyclododecyl ethanesulfonate, cyclododecyl benzenesulfonate, cyclododecyl 4-methylbenzenesulfonate, dicyclododecyl methanedisulfonate, (vi) decahydranaphthalene-1-yl methanesulfonate, decahydranaphthalene-1-yl ethanesulfonate, decahydranaphthalene-1-yl benzenesulfonate, decahydranaphthalene-1-yl 4-methylbenzenesulfonate, bis(decahydranaphthalene-1-yl)methanedisulfonate, decahydranaphthalene-2-yl methanesulfonate, decahydranaphthalene-2-yl ethanesulfonate, decahydranaphthalene-2-yl benzenesulfonate, decahydranaphthalene-2-yl 4-methylbenzenesulfonate, bis(decahydranaphthalene-2-yl)methanedisulfonate, (vii) bicyclo[2,2,1]heptane-2-yl methanesulfonate, bicyclo[2,2,1]heptane-2-yl ethanesulfonate, bicyclo[2,2,1]heptane-2-yl benzenesulfonate, bicyclo[2,2,1]heptane-2-yl 4-methylbenzenesulfonate, bis(bicyclo[2,2,1]heptane-2-yl)methanedisulfonate, bis(bicyclo[2,2,1]heptane-2-yl)ethane-1,2-disulfonate, (Viii) cyclobutane-1,2-diyl dimethanesulfonate, cyclobutane-1,2-diyl diethanesulfonate, cyclobutane-1,2-diyl dibenzenesulfonate, cyclobutane-1,2-diyl bis(4-methylbenzenesulfonate); cyclobutane-1,3-diyl dimethanesulfonate, cyclobutane-1,3-diyl diethanesulfonate, cyclobutane-1,3-diyl dibenzenesulfonate, cyclobutane-1,3-diyl bis(4-methylbenzenesulfonate); cyclopentane-1,2-diyl dimethanesulfonate, cyclopentane-1,2-diyl diethanesulfonate, cyclopentane-1,2-diyl dibenzenesulfonate, cyclopentane-1,2-diyl bis(4-methylbenzenesulfonate); cyclopentane-1,3-diyl dimethanesulfonate, cyclopentane-1,3-diyl diethanesulfonate, cyclopentane-1,3-diyl dibenzenesulfonate, cyclopentane-1,3-diyl bis(4-methylbenzenesulfonate); cyclopentane-1,2,4-triyl trimethanesulfonate, cyclopentane-1,2,4-triyl triethanesulfonate, cyclopentane-1,2,4-triyl tribenzenesulfonate, cyclopentane-1,2,4-triyl tris(4-methylbenzenesulfonate); cyclohexane-1,2-diyl dimethanesulfonate, cyclohexane-1,2-diyl diethanesulfonate, cyclohexane-1,2-diyl dibenzenesulfonate, cyclohexane-1,2-diyl bis(4-methylbenzenesulfonate); cyclohexane-1,3-diyl dimethanesulfonate, cyclohexane-1,3-diyl diethanesulfonate, cyclohexane-1,3-diyl dibenzenesulfonate, cyclohexane-1,3-diyl bis(4-methylbenzenesulfonate); cyclohexane-1,4-diyl dimethanesulfonate, cyclohexane-1,4-diyl diethanesulfonate, cyclohexane-1,4-diyl dibenzenesulfonate, cyclohexane-1,4-diyl bis(4-methylbenzenesulfonate); cyclohexane-1,3,5-triyl trimethanesulfonate, cyclohexane-1,3,5-triyl triethanesulfonate, cyclohexane-1,3,5-triyl tribenzenesulfonate and cyclohexane-1,3,5-triyl tris(4-methylbenzenesulfonate).

Among them, more preferred are:

(i) cyclobutyl methanesulfonate, cyclobutyl ethanesulfonate, cyclobutyl benzenesulfonate, cyclobutyl 4-methylbenzenesulfonate, dicyclobutyl methanedisulfonate, dicyclobutyl ethane-1,2-disulfonate, cyclopentyl methanesulfonate, cyclopentyl ethanesulfonate, cyclopentyl benzenesulfonate, cyclopentyl 4-methylbenzenesulfonate, dicyclopentyl methanedisulfonate, dicyclopentyl ethane-1,2-disulfonate, (ii) 2-methylcyclopentyl methanesulfonate, 2-methylcyclopentyl ethanesulfonate, 2-methylcyclopentyl benzenesulfonate, 2-methylcyclopentyl 4-methylbenzenesulfonate, bis(2-methylcyclopentyl)methanedisulfonate, bis(2-methylcyclopentyl)ethane-1,2-disulfonate, (iii) cyclohexyl methanesulfonate, cyclohexyl ethanesulfonate, cyclohexyl benzenesulfonate, cyclohexyl 4-methylbenzenesulfonate, dicyclohexyl methanedisulfonate, dicyclohexyl ethane-1,2-disulfonate, (iv) 2-methylcyclohexyl methanesulfonate, 2-methylcyclohexyl ethanesulfonate, 2-methylcyclohexyl benzenesulfonate, 2-methylcyclohexyl 4-methylbenzenesulfonate, bis(2-methylcyclohexyl)methanedisulfonate, bis(2-methylcyclohexyl)ethane-1,2-disulfonate, 2-ethylcyclohexyl methanesulfonate, 2-ethylcyclohexyl ethanesulfonate, 2-ethylcyclohexyl benzenesulfonate, 2-ethylcyclohexyl 4-methylbenzenesulfonate, bis(2-ethylcyclohexyl)methanedisulfonate, bis(2-ethylcyclohexyl)ethane-1,2-disulfonate, (v) cycloheptyl methanesulfonate, cycloheptyl ethanesulfonate, cycloheptyl benzenesulfonate, cycloheptyl 4-methylbenzenesulfonate, dicycloheptyl methanedisulfonate, dicycloheptyl ethane-1,2-disulfonate, (vii) bicyclo[2,2,1]heptane-2-yl methanesulfonate, bicyclo[2,2,1]heptane-2-yl ethanesulfonate, bicyclo[2,2,1]heptane-2-yl benzenesulfonate, bicyclo[2,2,1]heptane-2-yl 4-methylbenzenesulfonate, bis(bicyclo[2,2,1]heptane-2-yl)methanedisulfonate, bis(bicyclo[2,2,1]heptane-2-yl)ethane-1,2-disulfonate, (Viii) cyclopentane-1,2-diyl dimethanesulfonate, cyclopentane-1,2-diyl diethanesulfonate, cyclopentane-1,2-diyl dibenzenesulfonate, cyclopentane-1,2-diyl bis(4-methylbenzenesulfonate), cyclohexane-1,2-diyl dimethanesulfonate, cyclohexane-1,2-diyl diethanesulfonate, cyclohexane-1,2-diyl dibenzenesulfonate and cyclohexane-1,2-diyl bis(4-methylbenzenesulfonate).

Also, further preferred are:

(i) cyclopentyl methanesulfonate, cyclopentyl benzenesulfonate, cyclopentyl 4-methylbenzenesulfonate, dicyclopentyl methanedisulfonate, dicyclopentyl ethane-1,2-disulfonate, (iii) cyclohexyl methanesulfonate, cyclohexyl benzenesulfonate, cyclohexyl 4-methylbenzenesulfonate, dicyclohexyl methanedisulfonate, dicyclohexyl ethane-1,2-disulfonate, (vii) bicyclo[2,2,1]heptane-2-yl methanesulfonate, bicyclo[2,2,1]heptane-2-yl benzenesulfonate, bicyclo[2,2,1]heptane-2-yl 4-methylbenzenesulfonate, bis(bicyclo[2,2,1]heptane-2-yl)methanedisulfonate, bis(bicyclo[2,2,1]heptane-2-yl)ethane-1,2-disulfonate, (viii) cyclopentane-1,2-diyl dimethanesulfonate, cyclopentane-1,2-diyl bis(benzenesulfonate) and cyclopentane-1,2-diyl bis(4-methylbenzenesulfonate).

The sulfonic ester compound represented by Formula (IV) has optical isomers in a certain case. An R form and an S form can be present as the optical isomers, and both of them provide the effects of the present invention in the invention II. Also, the optical isomers described above can be used as well in a mixture of an optional ratio, and the effects of the present invention are provided in both of a case in which one of the optical isomers is present in excess (optically active material) and a case in which the optical isomers are present in the same amount (racemic body). Further, when diastereomers can be present, the diastereomers are not necessarily identical in chemical or electrochemical properties thereof, and therefore the degrees of the effects of the present invention are different in a certain case depending on an abundance ratio of the diastereomers, but when any of the optical isomers is used alone or in a mixture of a plurality thereof, the effects of the present invention are provided as well.

In the nonaqueous electrolytic solution of the invention II, a content of the sulfonic ester compound represented by Formula (IV) which is contained in the nonaqueous electrolytic solution is preferably 0.001 to 5% by mass in the nonaqueous electrolytic solution. If the above content is 5% by mass or less, the coating film is less likely to be formed in excess on the electrode and worsened in low-temperature properties. On the other hand, if it is 0.001% by mass or more, the coating film is formed sufficiently well and enhanced in an effect of improving a high-temperature storage property. The above content is preferably 0.01% by mass or more, more preferably 0.05% by mass or more and further preferably 0.1% by mass or more in the nonaqueous electrolytic solution, and an upper limit thereof is preferably 5% by mass or less, more preferably 3% by mass or less and further preferably 1% by mass or less.

In the nonaqueous electrolytic solution of the invention II, the electrochemical characteristics in a broad temperature range are improved by adding the sulfonic ester compound represented by Formula (IV), and a specific effect of synergistically improving the electrochemical characteristics in a broad temperature range is exerted by combining a nonaqueous solvent, an electrolyte salt and other additives which are described below. A reason therefor is not clear, but it is considered to be due to that a mixed coating film of a high ionic conductivity containing the constitutional elements of the above nonaqueous solvent, electrolyte salt and other additives is formed.

<Invention III>

The nonaqueous electrolytic solution of the invention III-1 in the present invention is prepared by dissolving an electrolyte salt in a nonaqueous solvent, which comprises the sulfonic ester compound represented by the following Formula (V) in an amount of 0.001 to 5% by mass of the nonaqueous electrolytic solution:

[Formula 13]

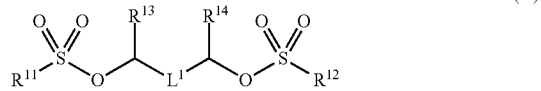

(V)

(wherein $R^{11}$ and $R^{12}$ each represent independently an alkyl group having 1 to 6 carbon atoms or an aryl group having 6 to 12 carbon atoms; $R^{13}$ and $R^{14}$ each represent independently an alkyl group having 1 to 6 carbon atoms; $L^1$ represents an alkylene group having 1 to 6 carbon atoms in which at least one hydrogen atom may be substituted with —$OSO_2R^{15}$ ($R^{15}$ has the same meaning as that of $R^{11}$ or $R^{12}$), a divalent linkage group having 2 to 6 carbon atoms and containing at least one ether bond or a single bond; and at least one hydrogen atom on the carbon atom of the alkyl group having 1 to 6 carbon atoms and the aryl group having 6 to 12 carbon atoms each described above may be substituted with a halogen atom).

The nonaqueous electrolytic solution of the invention III-2 in the present invention is prepared by dissolving an electrolyte salt in a nonaqueous solvent, which comprises the sulfonic ester compound represented by Formula (V) described above in an amount of 0.001 to 5% by mass of the nonaqueous electrolytic solution, and further comprises the sulfonic ester compound represented by the following Formula (VI) in an amount of 0.001 to 5% by mass:

[Formula 14]

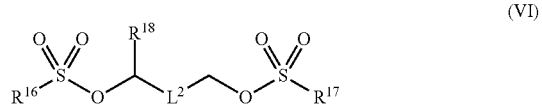

(VI)

(wherein $R^{16}$ and $R^{17}$ each represent independently an alkyl group having 1 to 6 carbon atoms or an aryl group having 6 to 12 carbon atoms; $R^{18}$ represents a hydrogen atom or an alkyl group having 1 to 6 carbon atoms; $L^2$ represents an alkylene group having 1 to 6 carbon atoms in which at least one hydrogen atom may be substituted with —$OSO_2R^{19}$ ($R^{19}$ has the same meaning as that of $R^{16}$ or $R^{17}$), a divalent linkage group having 2 to 6 carbon atoms and containing at least one ether bond or a single bond; and at least one hydrogen atom on the carbon atom of the alkyl group having 1 to 6 carbon atoms and the aryl group having 6 to 12 carbon atoms each described above may be substituted with a halogen atom).

A reason why the nonaqueous electrolytic solution of the invention III can improve the electrochemical characteristics in a broad temperature range to a large extent is not necessarily clear, but it is estimated as follows.

The sulfonic ester compound represented by Formula (V) which is contained in the nonaqueous electrolytic solution of the invention III has methine groups ($RSO_3$—CHR'—) to which two sulfonyloxy groups are bonded respectively. An acidity of a methine proton on carbon to which an electron-withdrawing sulfonyloxy group is bonded is considered to be lower than that of a methylene proton ($RSO_3$—$CH_2$—) due to an electron-donating effect of R'. Accordingly, it is considered that in the sulfonic ester compound represented by Formula (V), the methine groups which are present in two points are slowly reacted on the negative electrode in initial charging, so that a coating film having a high strength is formed without too much minutely depositing. It has been found that because of the above reason, a specific effect of notably improving the electrochemical characteristics in a broad temperature range from low temperature to high temperature is brought about.

$R^{11}$ and $R^{12}$ in Formula (V) are a linear or branched alkyl group having 1 to 6 carbon atoms, a linear or branched halogenated alkyl group having 1 to 6 carbon atoms in which at least one hydrogen atom is substituted with a halogen atom or an aryl group having 6 to 12 carbon atoms in which a hydrogen atom may be substituted with a halogen atom.

$R^{11}$ and $R^{12}$ are preferably a linear or branched alkyl group having 1 to 6 carbon atoms or an aryl group having 6 to 12 carbon atoms in which a hydrogen atom may be substituted with a halogen atom, more preferably a linear or branched alkyl group having 13 to 3 carbon atoms or an aryl group having 6 to 10 carbon atoms in which a hydrogen atom may be substituted with a halogen atom and particularly preferably a linear alkyl group having 1 or 2 carbon atoms or an aryl group having 6 to 8 carbon atoms.

The suitable examples of $R^{11}$ and $R^{12}$ include a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group, a phenyl group, a 2-methylphenyl group, a 3-methylphenyl group, a 4-methylphenyl group, a 4-tert-butylphenyl group, a 2,4,6-trimethylphenyl group, a 4-fluorophenyl group, a 4-chlorophenyl group, a 4-trifluoromethylphenyl group and the like. A methyl group, an ethyl group, a phenyl group and a 4-methylphenyl group are more preferred, and a methyl group and a 4-methylphenyl group are further preferred.

$R^{13}$ and $R^{14}$ in Formula (V) each represent independently a linear or branched alkyl group having 1 to 6 carbon atoms or a linear or branched halogenated alkyl group having 1 to 6 carbon atoms in which at least one hydrogen atom is substituted with a halogen atom.

$R^{13}$ and $R^{14}$ are preferably a linear or branched alkyl group having 1 to 4 carbon atoms, more preferably a linear alkyl group having 1 or 2 carbon atoms.

The suitable examples of $R^{13}$ and $R^{14}$ include a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group and the like. A methyl group, an ethyl group, a n-propyl group, a n-butyl group and an iso-propyl group are more preferred, and a methyl group and an ethyl group are further preferred.

$R^{13}$ and $R^{14}$ are preferably substituents which are different from each other. A case in which $R^{13}$ is a methyl group and in which $R^{14}$ is a linear or branched alkyl group having 2 to 6 carbon atoms is more preferred, and a case in which $R^{13}$ is a methyl group and in which $R^{14}$ is a linear or branched alkyl group having 2 to 4 carbon atoms is further preferred. A case in which $R^{11}$ and $R^{12}$ are a linear or branched alkyl group having 1 to 6 carbon atoms and in which $R^{13}$ and $R^{14}$ are different from each other and are a linear or branched alkyl group having 1 to 4 carbon atoms is a novel substance.

$L^1$ in Formula (V) represents an linear or branched alkylene group having 1 to 6 carbon atoms in which at least one hydrogen atom may be substituted with —$OSO_2R^{15}$ ($R^{15}$ has the same meaning as that of $R^{11}$ or $R^{12}$), a divalent linkage group having 2 to 6 carbon atoms and containing at least one ether bond or a single bond (that is, —$CHR^{13}$— is combined directly with —$CHR^{14}$—).

$L^1$ is preferably a linear or branched alkylene group having 1 to 6 carbon atoms in which at least one hydrogen atom may be substituted with —$OSO_2R^{15}$ or a single bond (that is, —$CHR^{13}$— is combined directly with —$CHR^{14}$—), more preferably a linear or branched alkylene group having 1 to 6 carbon atoms or a single bond, further preferably a methylene group, an ethylene group or a single bond and particularly preferably a methylene group or a single bond.

In particular, when $L^1$ is a single bond, that is, when Formula (V) is represented by the following Formula (V-2), the low-temperature properties after stored at high temperature, particularly the discharge property at −30° C. or lower are improved still more, and the electrochemical characteristics in a broad temperature range can be improved to a large extent, so that it is preferred. In this regard, all of $R^{11}$ to $R^{14}$ represent a methyl group or an ethyl group.

[Formula 15]

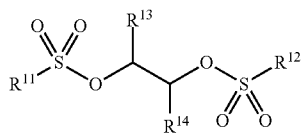

(V-2)

The specific examples of the compound represented by Formula (V) described above suitably include butane-2,3-diyl dimethanesulfonate, butane-2,3-diyl diethanesulfonate, butane-2,3-diyl bis(propane-1-sulfonate), butane-2,3-diyl bis(butane-1-sulfonate), butane-2,3-diyl bis(pentane-1-sulfonate), butane-2,3-diyl bis(hexane-1-sulfonate), butane-2,3-diyl bistrifluoromethanesulfonate, butane-2,3-diyl bis(2,2,2-trifluoroethanesulfonate), butane-2,3-diyl bis(propane-2-sulfonate), butane-2,3-diyl bis(butane-2-sulfonate), butane-2,3-diyl bis(2-methylpropane-2-sulfonate), butane-2,3-diyl bis(2-methylbutane-2-sulfonate), butane-2,3-diyl dibenzenesulfonate, butane-2,3-diyl bis(2-methylbenzenesulfonate), butane-2,3-diyl bis(3-methylbenzenesulfonate), butane-2,3-diyl bis(4-methylbenzenesulfonate), butane-2,3-diyl bis(4-tert-butylbenzenesulfonate), butane-2,3-diyl bis(2,4,6-trimethylbenzenesulfonate), butane-2,3-diyl bis(4-fluorobenzenesulfonate), butane-2,3-diyl bis(4-chlorobenzenesulfonate), butane-2,3-diyl bis(4-trifluoromethylbenzenesulfonate), pentane-2,3-diyl dimethanesulfonate, pentane-2,3-diyl diethanesulfonate, pentane-2,3-diyl bis(propane-1-sulfonate), pentane-2,3-diyl dibutane-1-sulfonate, pentane-2,3-diyl bis(pentane-1-sulfonate), pentane-2,3-diyl bis(hexane-1-sulfonate), pentane-2,3-diyl bistrifluoromethanesulfonate, pentane-2,3-diyl bis(2,2,2-trifluoroethanesulfonate), pentane-2,3-diyl bis(propane-2-sulfonate), pentane-2,3-diyl bis(butane-2-sulfonate), pentane-2,3-diyl bis(2-methylpropane-2-sulfonate), pentane-2,3-diyl bis(2-methylbutane-2-sulfonate), pentane-2,3-diyl dibenzenesulfonate, pentane-2,3-diyl bis(2-methylbenzenesulfonate), pentane-2,3-diyl bis(3-methylbenzenesulfonate), pentane-2,3-diyl bis(4-methylbenzenesulfonate), pentane-2,3-diyl bis(4-tert-butylbenzenesulfonate), pentane-2,3-diyl bis(2,4,6-trimethylbenzenesulfonate), pentane-2,3-diyl bis(4-fluorobenzenesulfonate), pentane-2,3-diyl bis(4-chlorobenzenesulfonate), pentane-2,3-diyl bis(4-trifluoromethylbenzenesulfonate), hexane-2,3-diyl dimethanesulfonate, hexane-2,3-diyl diethanesulfonate, hexane-2,3-diyl bistrifluoromethanesulfonate, hexane-2,3-diyl dibenzenesulfonate, hexane-2,3-diyl bis(4-methylbenzenesulfonate), hexane-3,4-diyl dimethanesulfonate, hexane-3,4-diyl diethanesulfonate, hexane-3,4-diyl bistrifluoromethanesulfonate, hexane-3,4-diyl dibenzenesulfonate, hexane-3,4-diyl bis(4-methylbenzenesulfonate), heptane-2,3-diyl dimethanesulfonate, heptane-2,3-diyl diethanesulfonate, heptane-2,3-diyl bistrifluoromethanesulfonate, heptane-2,3-diyl dibenzenesulfonate, heptane-2,3-diyl bis(4-methylbenzenesulfonate), octane-2,3-diyl dimethanesulfonate, octane-2,3-diyl diethanesulfonate, octane-2,3-diyl bistrifluoromethanesulfonate, octane-2,3-diyl dibenzenesulfonate, octane-2,3-diyl bis(4-methylbenzenesulfonate), octane-4,5-diyl dimethanesulfonate, octane-4,5-diyl diethanesulfonate, octane-4,5-diyl bistrifluoromethanesulfonate, octane-4,5-diyl dibenzenesulfonate, octane-4,5-diyl bis(4-methylbenzenesulfonate), nonane-2,3-diyl dimethanesulfonate, nonane-2,3-diyl diethanesulfonate, nonane-2,3-diyl bistrifluoromethanesulfonate, nonane-2,3-diyl dibenzenesulfonate, nonane-2,3-diyl bis(4-methylbenzenesulfonate), 1,4-difluorobutane-2,3-diyl dimethanesulfonate, 1,4-difluorobutane-2,3-diyl diethanesulfonate, 1,4-difluorobutane-2,3-diyl bistrifluoromethanesulfonate, 1,4-difluorobutane-2,3-diyl dibenzenesulfonate, 1,4-difluorobutane-2,3-diyl bis(4-methylbenzenesulfonate), 1,1,1,4,4,4-hexafluorobutane-2,3-diyl dimethanesulfonate, 1,1,1,4,4,4-hexafluorobutane-2,3-diyl diethanesulfonate, 1,1,1,4,4,4-hexafluorobutane-2,3-diyl bistrifluoromethanesulfonate, 1,1,1,4,4,4-hexafluorobutane-2,3-diyl dibenzenesulfonate, 1,1,1,4,4,4-hexafluorobutane-2,3-diyl bis(4-methylbenzenesulfonate), 4-methylpentane-2,3-diyl dimethanesulfonate, 4-methylpentane-2,3-diyl diethanesulfonate, 4-methylpentane-2,3-diyl bistrifluoromethanesulfonate, 4-methylpentane-2,3-diyl dibenzenesulfonate, 4-methylpentane-2,3-diyl bis(4-methylbenzenesulfonate), 4-methylhexane-2,3-diyl dimethanesulfonate, 4-methylhexane-2,3-diyl diethanesulfonate, 4-methylhexane-2,3-diyl bistrifluoromethanesulfonate, 4-methylhexane-2,3-diyl dibenzenesulfonate, 4-methylhexane-2,3-diyl bis(4-methylbenzenesulfonate), 4,4-dimethylpentane-2,3-diyl dimethanesulfonate, 4,4-dimethylpentane-2,3-diyl diethanesulfonate, 4,4-dimethylpentane-2,3-diyl bistrifluoromethanesulfonate, 4,4-dimethylpentane-2,3-diyl dibenzenesulfonate, 4,4-dimethylpentane-2,3-diyl bis(4-methylbenzenesulfonate), 4,4-dimethylhexane-2,3-diyl dimethanesulfonate, 4,4-dimethylhexane-2,3-diyl diethanesulfonate, 4,4-dimethylhexane-2,3-diyl bistrifluoromethanesulfonate, 4,4-dimethylhexane-2,3-diyl dibenzenesulfonate, 4,4-dimethylhexane-2,3-diyl bis(4-methylbenzenesulfonate), pentane-2,4-diyl dimethanesulfonate, pentane-2,4-diyl diethanesulfonate, pentane-2,4-diyl bis(propane-1-sulfonate), pentane-2,4-diyl bis(butane-1-sulfonate), pentane-2,4-diyl bis(pentane-1-sulfonate), pentane-2,4-diyl bis(hexane-1-sulfonate), pentane-2,4-diyl bistrifluoromethanesulfonate, pentane-2,4-diyl bis(2,2,2-trifluoroethanesulfonate), pentane-2,4-diyl dipropane-2-sulfonate, pentane-2,4-diyl dibutane-2-sulfonate, pentane-2,4-diyl bis(2-methylpropane-2-sulfonate), pentane-2,4-diyl bis(2-methylbutane-2-sulfonate), pentane-2,4-diyl dibenzenesulfonate, pentane-2,4-diyl bis(2-methylbenzenesulfonate), pentane-2,4-diyl bis(3-methylbenzenesulfonate), pentane-2,4-diyl bis(4-methylbenzenesulfonate), pentane-2,4-diyl bis(4-tert-butylbenzenesulfonate), pentane-2,4-diyl bis(2,4,6-trimethylbenzenesulfonate), pentane-2,4-diyl bis(4-fluorobenzenesulfonate), pentane-2,4-diyl bis(4-chlorobenzenesulfonate), pentane-2,4-diyl bis(4-trifluoromethylbenzenesulfonate), hexane-2,5-diyl dimethanesulfonate, hexane-2,5-diyl diethanesulfonate, hexane-2,5-diyl bistrifluoromethanesulfonate, hexane-2,5-diyl dibenzenesulfonate, hexane-2,5-diyl bis(4-methylbenzenesulfonate), heptane-2,6-diyl dimethanesulfonate, heptane-2,6-diyl diethanesulfonate, heptane-2,6-diyl bistrifluoromethanesulfonate, heptane-2,6-diyl dibenzenesulfonate, heptane-2,6-diyl bis(4-methylbenzenesulfonate), octane-2,7-diyl dimethanesulfonate, octane-2,7-diyl diethanesulfonate, octane-2,7-diyl bistrifluoromethanesulfonate, octane-2,7-diyl dibenzenesulfonate, octane-2,7-diyl bis(4-methylbenzenesulfonate), nonane-2,8-diyl dimethanesulfonate, nonane-2,8-diyl diethanesulfonate, nonane-2,8-diyl bistrifluoromethanesulfonate, nonane-2,8-diyl dibenzenesulfonate, nonane-2,8-diyl bis(4-methylbenzenesulfonate), decane-2,9-diyl dimethanesulfonate, decane-2,9-diyl diethanesulfonate, decane-2,9-diyl bistrifluoromethanesulfonate, decane-2,9-diyl dibenzenesulfonate, decane-2,9-diyl bis(4-methylbenzenesulfonate), 3-methylpentane-2,4-diyl dimethanesulfonate, 3-methylpentane-2,4-diyl diethanesulfonate, 3-methylpentane-2,4-diyl bistrifluoromethanesulfonate, 3-methylpentane-2,4-diyl dibenzenesulfonate, 3-methylpentane-2,4-diyl bis(4-methylbenzenesulfonate), pentane-2,3,4-triyl trimethanesulfonate, pentane-2,3,4-triyl triethanesulfonate, pentane-2,3,4-triyl tris(trifluoromethanesulfonate), pentane-2,3,4-triyl tribenzenesulfonate, pentane-2,3,4-triyl tris(4-methylbenzenesulfonate), 1,1'-oxybis(propane-2,1-diyl)dimethanesulfonate, 1,1'-oxybis(propane-2,1-diyl)diethanesulfonate, 1,1'-oxybis(propane-2,1-diyl)bistrifluoromethanesulfonate, 1,1'-oxybis(propane-2,1-diyl)dibenzenesulfonate and 1,1'-oxybis(propane-2,1-diyl)bis(4-methylbenzenesulfonate).

Among them, more preferred are butane-2,3-diyl dimethanesulfonate, butane-2,3-diyl diethanesulfonate, butane-2,3-diyl bistrifluoromethanesulfonate, butane-2,3-diyl bis(2,2,2-trifluoroethanesulfonate), butane-2,3-diyl dibenzenesulfonate, butane-2,3-diyl bis(4-methylbenzenesulfonate), pentane-2,3-diyl dimethanesulfonate, pentane-2,3-diyl diethanesulfonate, pentane-2,3-diyl bistrifluoromethanesulfonate, pentane-2,3-diyl bis(2,2,2-trifluoroethanesulfonate), pentane-2,3-diyl dibenzenesulfonate, pentane-2,3-diyl bis(4-methylbenzenesulfonate), hexane-2,3-diyl dimethanesulfonate, hexane-2,3-diyl diethanesulfonate, hexane-2,3-diyl bistrifluoromethanesulfonate, hexane-2,3-diyl bis(2,2,2-trifluoroethanesulfonate), hexane-2,3-diyl dibenzenesulfonate, hexane-2,3-diyl bis(4-methylbenzenesulfonate), pentane-2,4-diyl dimethanesulfonate, pentane-2,4-diyl diethanesulfonate, pentane-2,4-diyl bistrifluoromethanesulfonate, pentane-2,4-diyl bis(2,2,2-trifluoroethanesulfonate), pentane-2,4-diyl dibenzenesulfonate and pentane-2,4-diyl bis(4-methylbenzenesulfonate), and further preferred are butane-2,3-diyl dimethanesulfonate, butane-2,3-diyl bis(4-methylbenzenesulfonate), pentane-2,3-diyl dimethanesulfonate, pentane-2,3-diyl bis(4-methylbenzenesulfonate), hexane-2,3-diyl dimethanesulfonate, hexane-2,3-diyl bis(4-methylbenzenesulfonate), pentane-2,4-diyl dimethanesulfonate and pentane-2,4-diyl bis(4-methylbenzenesulfonate). Butane-2,3-diyl dimethanesulfonate, pentane-2,3-diyl dimethanesulfonate and pentane-2,4-diyl dimethanesulfonate are particularly preferred.

Diastereomers can be present in the sulfonic ester compound represented by Formula (V). The diastereomers are not necessarily identical in chemical or electrochemical characteristics, and therefore the degrees of the effects of the present invention are different in a certain case depending on an abundance ratio of the diastereomers, but when any of the optical isomers is used alone or in a mixture of a plurality thereof, the effects of the present invention are provided as well.

When the diastereomers are present (when both of carbon to which the substituent $R^{13}$ is bonded and carbon to which the substituent $R^{14}$ is bonded are asymmetric carbons), four combinations of (R,S), (S,R), (R,R) and (S,S) are present as combinations of the respective configurations of carbon to which the substituent $R^{13}$ is bonded and carbon to which the substituent $R^{14}$ is bonded. Hereinafter, (R,S) and (S,R) shall be referred to as Anti forms, and (R,R) and (S,S) shall be referred to as Syn forms. When the substituents $R^1$ and $R^2$ and the substituents $R^3$ and $R^4$ are the same respectively, (R,S) and (S,R) represent all the same structure. The Anti form and the Syn form have relation of diastereomers to each other, and therefore they are different a little in electrochemical characteristics. The Anti form and the Syn form are different in a reduction potential, and the Anti form has higher electrochemical characteristics in a broad temperature range and therefore is more preferred. If both of the Anti form and the Syn form are contained, the effect described above is improved still more, and therefore it is preferred. A mixing ratio (Anti form:Syn form) (mass ratio) of the Anti form and the Syn form is preferably 5:95 to 99:1, more preferably 51:49 to 95:5 and further preferably 55:45 to 90:10.

In the nonaqueous electrolytic solution of the invention III-1, a content of the sulfonic ester compound represented by Formula (V) contained in the nonaqueous electrolytic solution is preferably 0.001 to 5% by mass in the nonaqueous electrolytic solution. If the above content is 5% by mass or less, the coating film is less likely to be formed in excess on the electrode and worsened in low-temperature properties. On the other hand, if it is 0.001% by mass or more, the coating film is formed sufficiently well and enhanced in an effect of improving a high-temperature storage property. The above content is preferably 0.01% by mass or more, more preferably 0.05% by mass or more and further preferably 0.1% by mass or more in the nonaqueous electrolytic solution, and an upper limit thereof is preferably 5% by mass or less, more preferably 3% by mass or less and further preferably 1% by mass or less.

The nonaqueous electrolytic solution of the invention III-2 improves the electrochemical characteristics in a further broader temperature range by further adding the sulfonic ester compound represented by the following Formula (VI) in which two sulfonate groups are connected with an alkylene chain having one straight chain or branched chain in addition to the sulfonic ester compound represented by Formula (V), and therefore it is preferred:

[Formula 16]

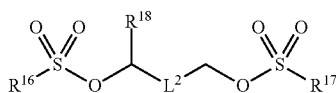

(VI)

In Formula (VI), $R^{16}$ and $R^{17}$ each represent independently a linear or branched alkyl group having 1 to 6 carbon atoms, a linear or branched halogenated alkyl group having 1 to 6 carbon atoms in which at least one hydrogen atom is substituted with a halogen atom or an aryl group having 6 to 12 carbon atoms in which a hydrogen atom may be substituted with a halogen atom.

$R^{16}$ and $R^{17}$ in Formula (VI) each have the same meanings as those of $R^{11}$ and $R^{12}$ described above, and the preferred substituents thereof are the same as those of $R^{11}$ and $R^{12}$.

$R^{18}$ in Formula (VI) represents a hydrogen atom, a linear or branched alkyl group having 1 to 6 carbon atoms or a linear or branched halogenated alkyl group having 1 to 6 carbon atoms in which at least one hydrogen atom is substituted with a halogen atom, and it is preferably a hydrogen atom or a linear or branched alkyl group having 1 to 4 carbon atoms, more preferably a hydrogen atom or a linear alkyl group having 1 or 2 carbon atoms.

The suitable examples of $R^{18}$ include a hydrogen atom, a methyl group, an ethyl group, a n-propyl group, a n-butyl group, a n-pentyl group, a n-hexyl group, a fluoromethyl group, a trifluoromethyl group, a 2,2,2-trifluoroethyl group, an iso-propyl group, a sec-butyl group, a tert-butyl group, a tert-amyl group and the like. Among them, a hydrogen atom, a methyl group, an ethyl group, a n-propyl group, a n-butyl group and an iso-propyl group are more preferred, and a hydrogen atom, a methyl group and an ethyl group are particularly preferred.

$L^2$ in Formula (VI) represents a linear or branched alkylene group having 1 to 6 carbon atoms in which at least one hydrogen atom may be substituted with $-OSO_2R^{19}$ ($R^{19}$ is the same as $R^{16}$ or $R^{17}$), a divalent linkage group having 2 to 6 carbon atoms and containing at least one ether bond or a single bond (that is, $-CHR^{18}-$ is combined directly with $-CH_2-$).

$L^2$ in Formula (VI) described above has the same meaning as that of L.

A reason why the effect described above is obtained in the invention III-2 is not necessarily clear, but it is estimated as follows.

The sulfonic ester compound represented by Formula (VI) which is contained in the nonaqueous electrolytic solution of the invention III-2 has a methylene proton ($RSO_3-CH_2-$) having a higher acidity than that of a methine proton present in the sulfonic ester compound represented by Formula (V) on carbon to which at least one sulfonyloxy group is bonded. Accordingly, it is considered to be due to that combination thereof with the compound represented by Formula (V) proceeds on the negative electrode in initial charging, wherein reaction of a methylene group of the sulfonic ester compound represented by Formula (VI) functions as a trigger and that formed is a coating film which is more stable in storage at high temperature than a coating film prepared by using only the compound represented by Formula (V). When $R^{18}$ in Formula (VI) is a hydrogen atom (when two methylene groups to which sulfonyloxy groups are bonded are present), combination thereof with the compound represented by Formula (V) is more liable to proceed, and therefore it is more preferred.

A melting point of the sulfonic ester compound represented by Formula (VI) is preferably 100° C. or lower, more preferably 50° C. or lower and further preferably 40° C. or lower. When the sulfonic ester compound represented by Formula (VI) has a melting point falling in the ranges described above, the low-temperature properties after stored at high temperature are improved still more, and therefore it is preferred.

A reason why the effect described above is obtained is not necessarily clear, and it is considered to be due to that the sulfonic ester compound represented by Formula (VI) which has a lower melting point has a higher solubility in a non-aqueous solvent and that migration of lithium ions at low temperature becomes smoother.

For example, a melting point of the sulfonic ester compound in a case in which both of $R^{16}$ and $R^{17}$ are a methyl group and in which $L^2$ is a single bond or a linear alkylene chain having 1 to 5 carbon atoms in Formula (VI) is 44 to 45° C. in a case in which $L^2$ is a single bond (the principal chain has 2 carbon atoms), 41 to 42° C. in a case in which it is a methylene group (the principal chain has 3 carbon atoms), 117 to 118° C. in a case in which it is an ethylene group (the principal chain has 4 carbon atoms), 35 to 36° C. in a case in which it is a trimethylene group (the principal chain has 5 carbon atoms), 58 to 59° C. in a case in which it is a tetramethylene group (the principal chain has 6 carbon atoms) and 53° C. in a case in which it is a pentamethylene group (the principal chain has 7 carbon atoms).

The suitable examples of —$CHR^{18}$-$L^2$-$CH_2$— in Formula (VI) include linear alkylene groups, such as an ethylene group, a trimethylene group, a tetramethylene group, a pentamethylene group, a hexamethylene group and the like and branched alkylene groups, such as a propane-1,2-diyl group, a butane-1,2-diyl group, a butane-1,3-diyl group, a pentane-1,4-diyl group, a hexane-1,5-diyl group, a 2-methylpropane-1,3-diyl group, a 2,2-dimethylpropane-1,3-diyl group and the like.

Among the above groups, linear alkylene groups, such as an ethylene group, a trimethylene group, a pentamethylene group and the like and branched alkylene groups, such as a propane-1,2-diyl group and the like are more preferred, and linear alkylene groups, such as a trimethylene group, a pentamethylene group and the like are particularly preferred.

When they are the substituents described above, the electrochemical characteristics in a further broader temperature range are improved, and therefore they are preferred.

The specific examples of the sulfonic ester compound represented by Formula (VI) include ethane-1,2-diyl dimethanesulfonate, ethane-1,2-diyl diethanesulfonate, ethane-1,2-diyl bistrifluoromethanesulfonate, ethane-1,2-diyl dibenzenesulfonate, ethane-1,2-diyl bis(4-methylbenzenesulfonate), propane-1,3-diyl dimethanesulfonate, propane-1,3-diyl diethanesulfonate, propane-1,3-diyl bistrifluoromethanesulfonate, propane-1,3-diyl dibenzenesulfonate, propane-1,3-diyl bis(4-methylbenzenesulfonate), butane-1,2-diyl dimethanesulfonate, butane-1,2-diyl diethanesulfonate, butane-1,2-diyl bistrifluoromethanesulfonate, butane-1,2-diyl dibenzenesulfonate, butane-1,2-diyl bis(4-methylbenzenesulfonate), butane-1,4-diyl dimethanesulfonate, butane-1,4-diyl diethanesulfonate, butane-1,4-diyl bistrifluoromethanesulfonate, butane-1,4-diyl dibenzenesulfonate, butane-1,4-diyl bis(4-methylbenzenesulfonate), pentane-1,5-diyl dimethanesulfonate, pentane-1,5-diyl diethanesulfonate, pentane-1,5-diyl bistrifluoromethanesulfonate, pentane-1,5-diyl dibenzenesulfonate, pentane-1,5-diyl bis(4-methylbenzenesulfonate), hexane-1,6-diyl dimethanesulfonate, hexane-1,6-diyl diethanesulfonate, hexane-1,6-diyl bistrifluoromethanesulfonate, hexane-1,6-diyl dibenzenesulfonate, hexane-1,6-diyl bis(4-methylbenzenesulfonate), propane-1,2-diyl dimethanesulfonate, propane-1,2-diyl diethanesulfonate, propane-1,2-diyl bistrifluoromethanesulfonate, propane-1,2-diyl dibenzenesulfonate, propane-1,2-diyl bis(4-methylbenzenesulfonate), butane-1,3-diyl dimethanesulfonate, butane-1,3-diyl diethanesulfonate, butane-1,3-diyl bistrifluoromethanesulfonate, butane-1,3-diyl dibenzenesulfonate, butane-1,3-diyl bis(4-methylbenzenesulfonate), pentane-1,4-diyl dimethanesulfonate, pentane-1,4-diyl diethanesulfonate, pentane-1,4-diyl bistrifluoromethanesulfonate, pentane-1,4-diyl dibenzenesulfonate, pentane-1,4-diyl bis(4-methylbenzenesulfonate), hexane-1,5-diyl dimethanesulfonate, hexane-1,5-diyl diethanesulfonate, hexane-1,5-diyl bistrifluoromethanesulfonate, hexane-1,5-diyl dibenzenesulfonate, hexane-1,5-diyl bis(4-methylbenzenesulfonate), 2-methylpropane-1,3-diyl dimethanesulfonate, 2-methylpropane-1,3-diyl diethanesulfonate, 2-methylpropane-1,3-diyl bistrifluoromethanesulfonate, 2-methylpropane-1,3-diyl dibenzenesulfonate, 2-methylpropane-1,3-diyl bis(4-methylbenzenesulfonate), 2,2-dimethylpropane-1,3-diyl dimethanesulfonate, 2,2-dimethylpropane-1,3-diyl diethanesulfonate, 2,2-dimethylpropane-1,3-diyl bistrifluoromethanesulfonate, 2,2-dimethylpropane-1,3-diyl dibenzenesulfonate, 2,2-dimethylpropane-1,3-diyl bis(4-methylbenzenesulfonate), propane-1,2,3-triyl trimethanesulfonate, propane-1,2,3-triyl triethanesulfonate, propane-1,2,3-triyl tris(bistrifluoromethanesulfonate), propane-1,2,3-triyl tribenzenesulfonate, propane-1,2,3-triyl tris(4-methylbenzenesulfonate), butane-1,2,4-triyl trimethanesulfonate, butane-1,2,4-triyl triethanesulfonate, butane-1,2,4-triyl tris(bistrifluoromethanesulfonate), butane-1,2,4-triyl tribenzenesulfonate, butane-1,2,4-triyl tris(4-methylbenzenesulfonate), 2,2'-oxybis(ethane-2,1-diyl)dimethanesulfonate, 2,2'-oxybis(ethane-2,1-diyl)diethanesulfonate, 2,2'-oxybis(ethane-2,1-diyl)bistrifluoromethanesulfonate, 2,2'-oxybis(ethane-2,1-diyl)dibenzenesulfonate, 2,2'-oxybis(ethane-2,1-diyl)bis(4-methylbenzenesulfonate), 1-(2-(methanesulfonyloxy)ethoxy)propane-2-yl methanesulfonate, 1-(2-(ethanesulfonyloxy)ethoxy)propane-2-yl ethanesulfonate, 1-(2-(trifluoromethanesulfonyloxy)ethoxy) propane-2-yl trifluoromethanesulfonate, 1-(2-(benzenesulfonyloxy)ethoxy)propane-2-yl benzenesulfonate, 1-(2-(4-methylbenzenesulfonyloxy)ethoxy)propane-2-yl 4-methylbenzenesulfonate and the like.

Among them, preferred are ethane-1,2-diyl dimethanesulfonate, ethane-1,2-diyl bis(4-methylbenzenesulfonate), propane-1,3-diyl dimethanesulfonate, propane-1,3-diyl bis(4-methylbenzenesulfonate), pentane-1,5-diyl dimethanesulfonate, pentane-1,5-diyl bis(4-methylbenzenesulfonate), propane-1,2-diyl dimethanesulfonate, and propane-1,2-diyl bis(4-methylbenzenesulfonate), and further preferred are ethane-1,2-diyl dimethanesulfonate, propane-1,3-diyl dimethanesulfonate, pentane-1,5-diyl dimethanesulfonate and propane-1,2-diyl dimethanesulfonate. Propane-1,3-diyl dimethanesulfonate and pentane-1,5-diyl dimethanesulfonate are particularly preferred.

The sulfonic ester compound represented by Formula (VI) has optical isomers in a certain case. An R form and an S form can be present as the optical isomers, and both of them provide the effects of the present invention in the invention III-2. Also, the optical isomers described above can be used as well in a mixture of an optional ratio, and the effects of the present invention can be provided in both of a case in which one of the optical isomers is present in excess (optically active material) and a case in which the optical isomers are present in the same amount (racemic body). Further, when diastereomers are present, the diastereomers are not necessarily identical in chemical or electrochemical properties, and therefore the degrees of the effects of the present invention are different in a certain case depending on an abundance ratio of the diastereomers, but when any of the optical isomers is used alone or in a mixture of a plurality thereof, the effects of the present invention are provided as well.

In the nonaqueous electrolytic solution of the invention III-2, a content of the sulfonic ester compound represented by Formula (VI) is preferably 0.001 to 5% by mass in the nonaqueous electrolytic solution. If the above content is 5% by mass or less, the coating film is less likely to be formed in excess on the electrode and worsened in low-temperature properties. On the other hand, if it is 0.001% by mass or more, the coating film is formed sufficiently well and enhanced in an effect of improving a high-temperature storage property. The above content is preferably 0.01% by mass or more, more preferably 0.05% by mass or more and further preferably 0.1% by mass or more in the nonaqueous electrolytic solution, and an upper limit thereof is preferably 5% by mass or less, more preferably 3% by mass or less and further preferably 1% by mass or less.

When the sulfonic ester compound represented by Formula (V) is used in combination with the sulfonic ester compound represented by Formula (VI), they shall not specifically be restricted, and a mass ratio of (the sulfonic ester compound represented by Formula (V): the sulfonic ester compound represented by Formula (VI)) is preferably 49:51 to 1:99, more preferably 40:60 to 10:90 from the viewpoint of improving the electrochemical characteristics in a broad temperature range.

In the nonaqueous electrolytic solution of the invention III, the electrochemical characteristics in a broad temperature range are improved by adding the sulfonic ester compound represented by Formula (V) described above, and a specific effect of synergistically improving the electrochemical characteristics in a broad temperature range is exerted by combining a nonaqueous solvent, an electrolyte salt and other additives which are described below. A reason therefor is not clear, but it is considered to be due to that a mixed coating film of a high ionic conductivity containing the constitutional elements of the above nonaqueous solvent, electrolyte salt and other additives is formed.

Invention IV:

The nonaqueous electrolytic solution of the invention IV in the present invention is prepared by dissolving an electrolyte salt in a nonaqueous solvent, which comprises the compound represented by the following Formula (VII) in an amount of 0.001 to 5% by mass of the nonaqueous electrolytic solution:

[Formula 17]

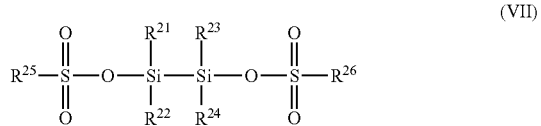

(VII)

(wherein $R^{21}$ to $R^{26}$ may be the same or different and represent an alkyl group having 1 to 6 carbon atoms or an aryl group having 6 to 12 carbon atoms; and at least one hydrogen atom on the carbon atom of the alkyl group having 1 to 6 carbon atoms and the aryl group having 6 to 12 carbon atoms each described above may be substituted with a halogen atom).

$R^{21}$ to $R^{24}$ in Formula (VII) may be the same or different and represent an alkyl group having 1 to 6 carbon atoms, a halogenated alkyl group having 1 to 6 carbon atoms in which at least one hydrogen atom is substituted with a halogen atom or an aryl group having 6 to 12 carbon atoms in which a hydrogen atom may be substituted with a halogen atom, and it is more preferably a linear or branched alkyl group having 1 to 4 carbon atoms or an aryl group having 6 to 8 carbon atoms, further preferably a linear alkyl group having 1 to 2 carbon atoms or a branched alkyl group having 3 to 4 carbon atoms.

$R^{25}$ and $R^{26}$ may be the same or different and represent an alkyl group having 1 to 6 carbon atoms, a halogenated alkyl group having 1 to 6 carbon atoms in which at least one hydrogen atom is substituted with a halogen atom or an aryl group having 6 to 12 carbon atoms in which a hydrogen atom may be substituted with a halogen atom, and they are more preferably a linear alkyl group having 1 to 4 carbon atoms or a branched alkyl group having 3 to 4 carbon atoms, a linear halogenated alkyl group having 1 to 4 carbon atoms in which at least one hydrogen atom is substituted with a halogen atom or an aryl group having 6 to 8 carbon atoms, further preferably a linear alkyl group having 1 to 2 carbon atoms, a linear halogenated alkyl group having 1 to 2 carbon atoms in which at least one hydrogen atom is substituted with a halogen atom or an aryl group having 6 to 7 carbon atoms.

The specific examples of $R^{21}$ to $R^{24}$ described above suitably include linear alkyl groups, such as a methyl group, an ethyl group, a n-propyl group, a n-butyl group, a n-pentyl group, a n-hexyl group and the like, branched alkyl groups, such as an iso-propyl group, a sec-butyl group, a tert-butyl group, a tert-amyl group and the like, alkyl groups in which a part of hydrogen atoms is substituted with a halogen atom, such as a fluoromethyl group, a trifluoromethyl group, a 2,2,2-trifluoroethyl group and the like and aryl groups, such as a phenyl group, a 2-methylphenyl group, a 3-methylphenyl group, a 4-methylphenyl group, a 4-tert-butylphenyl group, a 2,4,6-trimethylphenyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 2,4,6-trifluorophenyl group, a pentafluorophenyl group, a 4-trifluoromethylphenyl group and the like. Among them, a methyl group, an ethyl group, a n-propyl group, a n-butyl group, a tert-butyl group and a tert-amyl group are preferred, and a methyl group, an ethyl group and a tert-butyl group are further preferred.

The specific examples of $R^{25}$ and $R^{26}$ described above suitably include linear alkyl groups, such as a methyl group, an ethyl group, a n-propyl group, a n-butyl group, a n-pentyl group, a n-hexyl group and the like, branched alkyl groups, such as an iso-propyl group, a sec-butyl group, a tert-butyl group, a tert-amyl group and the like, alkyl groups in which a part of hydrogen atoms is substituted with a halogen atom, such as a fluoromethyl group, a trifluoromethyl group, a 2,2,2-trifluoroethyl group and the like and aryl groups, such as a phenyl group, a 2-methylphenyl group, a 3-methylphenyl group, a 4-methylphenyl group, a 4-tert-butylphenyl group, a 2,4,6-trimethylphenyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 2,4,6-trifluorophenyl group, a pentafluorophenyl group, a 4-trifluoromethylphenyl group and the like. Among them, a methyl group, an ethyl group, a n-propyl group, a n-butyl group, a tert-butyl group, a 4-methylphenyl group, a trifluoromethyl group and a 2,2,2-trifluoroethyl group are preferred, and a methyl group and a 4-methylphenyl group are further preferred.

The sulfonate compound having a silicon atom represented by Formula (VII) suitably include, to be specific, 1,1,2,2-tetramethyldisilane-1,2-diyl dimethanesulfonate, 1,1,2,2-tetraethyldisilane-1,2-diyl dimethanesulfonate, 1,1,2,2-tetrapropyldisilane-1,2-diyl dimethanesulfonate, 1,1,2,2-tetra(iso-propyl)disilane-1,2-diyl dimethanesulfonate, 1,1,2,2-tetrabutyldisilane-1,2-diyl dimethanesulfonate, 1,1,2,2-tetra(tert-butyl)disilane-1,2-diyl dimethanesulfonate, 1,1,2,2-tetra(tert-amyl)disilane-1,2-diyl dimethanesulfonate, 1,1,2,2-tetra(trifluoromethyl)disilane-1,2-diyl dimethanesulfonate, 1,1,2,2-tetraphenyldisilane-1,2-diyl dimethanesulfonate, 1,1,2,2-tetra(4-fluorophenyl)disilane-1,2-diyl dimethanesulfonate, 1,2-dimethyl-1,2-diphenyldisilane-1,2-diyl dimethanesulfonate, 1,1,2,2-tetramethyldisilane-1,2-diyl diethanesulfonate, 1,1,2,2-tetramethyldisilane-1,2-diyl bis(propane-1-sulfonate), 1,1,2,2-tetramethyldisilane-1,2-diyl bis(butane-1-sulfonate), 1,1,2,2-tetramethyldisilane-1,2-diyl bis(2-methylpropane-2-sulfonate), 1,1,2,2-tetramethyldisilane-1,2-diyl dibenzenesulfonate, 1,1,2,2-tetramethyldisilane-1,2-diyl bis(4-methylbenzenesulfonate), 1,1,2,2-tetramethyldisilane-1,2-diyl bis(trifluoromethanesulfonate), 1,1,2,2-tetramethyldisilane-1,2-diyl bis(2,2,2-trifluoroethanesulfonate), 1,1,2,2-tetraethyldisilane-1,2-diyl bis(4-methylbenzenesulfonate), 1,1,2,2-tetrapropyldisilane-1,2-diyl bis(4-methylbenzenesulfonate), 1,1,2,2-tetra(tert-butyl)disilane-1,2-diyl bis(4-methylbenzenesulfonate) and 1,1,2,2-tetraphenyldisilane-1,2-diyl bis(4-methylbenzenesulfonate).

Among them, more preferred are 1,1,2,2-tetramethyldisilane-1,2-diyl dimethanesulfonate, 1,1,2,2-tetraethyldisilane-1,2-diyl dimethanesulfonate, 1,1,2,2-tetrapropyldisilane-1,2-diyl dimethanesulfonate, 1,1,2,2-tetra(iso-propyl)disilane-1,2-diyl dimethanesulfonate, 1,1,2,2-tetrabutyldisilane-1,2-diyl dimethanesulfonate, 1,1,2,2-tetra(tert-butyl)disilane-1,2-diyl dimethanesulfonate, 1,1,2,2-tetra(tert-amyl)disilane-1,2-diyl dimethanesulfonate, 1,1,2,2-tetra(4-fluorophenyl)disilane-1,2-diyl dimethanesulfonate, 1,1,2,2-tetramethyldisilane-1,2-diyl diethanesulfonate, 1,1,2,2-tetramethyldisilane-1,2-diyl bis(propane-1-sulfonate), 1,1,2,2-tetramethyldisilane-1,2-diyl bis(butane-1-sulfonate), 1,1,2,2-tetramethyldisilane-1,2-diyl bis(2-methylpropane-2-sulfonate), 1,1,2,2-tetramethyldisilane-1,2-diyl bis(4-methylbenzenesulfonate), 1,1,2,2-tetraethyldisilane-1,2-diyl bis(4-methylbenzenesulfonate), 1,1,2,2-tetrapropyldisilane-1,2-diyl bis(4-methylbenzenesulfonate), 1,1,2,2-tetra(tert-butyl)disilane-1,2-diyl bis(4-methylbenzenesulfonate), 1,1,2,2-tetraphenyldisilane-1,2-diyl bis(4-methylbenzenesulfonate), 1,1,2,2-tetramethyldisilane-1,2-diyl bis(trifluoromethyl)sulfonate and 1,1,2,2-tetramethyldisilane-1,2-diyl bis(2,2,2-trifluoroethanesulfonate), and further preferred are 1,1,2,2-tetramethyldisilane-1,2-diyl dimethanesulfonate, 1,1,2,2-tetraethyldisilane-1,2-diyl dimethanesulfonate and 1,1,2,2-tetramethyldisilane-1,2-diyl bis(4-methylbenzenesulfonate).

When the substituents fall in the ranges described above, the electrochemical characteristics in a broad temperature range can be improved to a large extent, and therefore they are preferred.

In the nonaqueous electrolytic solution of the invention IV, a content of the sulfonate compound having a silicon atom represented by Formula (VII) which is contained in the nonaqueous electrolytic solution is preferably 0.001 to 5% by mass in the nonaqueous electrolytic solution. If the above content is 5% by mass or less, the coating film is less likely to be formed in excess on the electrode and worsened in low-temperature properties. On the other hand, if it is 0.001% by mass or more, the coating film is formed sufficiently well and enhanced in an effect of improving a high-temperature storage property. The above content is preferably 0.008% by mass or more, more preferably 0.02% by mass or more in the nonaqueous electrolytic solution. Also, an upper limit thereof is preferably 3% by mass or less, more preferably 1% by mass or less.

In the nonaqueous electrolytic solution of the invention IV, the specific effect that the electrochemical characteristics in a broad temperature range are synergistically improved is exerted by combining the sulfonate compound having a silicon atom represented by Formula (VII) with a nonaqueous solvent, an electrolyte salt and other additives which are described below.

Nonaqueous Solvent:

The nonaqueous solvent used for the nonaqueous electrolytic solution of the present invention includes cyclic carbonates, linear esters, lactones, ethers, amides, phosphoric esters, sulfones, nitriles, S=O bond-containing compounds and the like.

The cyclic carbonates suitably include ethylene carbonate (EC), propylene carbonate (PC), 1,2-butylene carbonate, 2,3-butylene carbonate, 4-fluoro-1,3-dioxolane-2-one (FEC), trans- or cis-4,5-difluoro-1,3-dioxolane-2-one (hereinafter both are generally referred to as "DFEC"), vinylene carbonate (VC), vinyl ethylene carbonate (VEC) and the like.

When at least one of cyclic carbonates having a carbon-carbon double bond or a fluorine atom among the above compounds is used, the cycle property in a broad temperature range is improved still more, and therefore it is preferred. Both of the cyclic carbonate having a carbon-carbon double bond and the cyclic carbonate having a fluorine atom are particularly preferably contained. The cyclic carbonate having a carbon-carbon double bond is more preferably VC and VEC, and the cyclic carbonate having a fluorine atom is more preferably FEC and DFEC.

Assuming that a content of the cyclic carbonate having a carbon-carbon double bond is preferably 0.001% by volume or more, more preferably 0.03% by volume or more and further preferably 0.2% by volume or more based on a whole volume of the nonaqueous solvent and that an upper limit thereof is preferably 10% by volume or less, more preferably 6% by volume or less and further preferably 4% by volume or less, a coating film in which it is combined mutually with the sulfonic ester compound represented by Formula (I), (II), (III), (IV), (V), (VI) or (VII) described above is formed on the electrode, and therefore the electrochemical characteristics in a further broader temperature range are improved, so that it is preferred. Hereinafter, "Formula (I)" is used as a concept including Formulas (II) to (VII) unless otherwise described.

Also, a content of the cyclic carbonate having a carbon-carbon double bond in the nonaqueous electrolytic solution is preferably 0.001 to 10% by mass, more preferably 0.03% by mass or more and further preferably 0.2% by mass or more based on a whole volume of the nonaqueous solvent, and an upper limit thereof is preferably 10% by mass or less, more preferably 6% by mass or less and further preferably 4% by mass or less.

Assuming that a content of the cyclic carbonate having a fluorine atom is preferably 0.01% by volume or more, more preferably 0.03% by volume or more and further preferably 0.3% by volume or more based on a whole volume of the nonaqueous solvent and that an upper limit thereof is preferably 35% by volume or less, more preferably 25% by volume or less and further preferably 15% by volume or less, a coating film in which it is combined mutually with the sulfonic ester compound represented by Formula (I) is formed on the electrode, and therefore the electrochemical characteristics in a further broader temperature range are improved, so that it is preferred.

Also, a content of the cyclic carbonate having a fluorine atom in the nonaqueous electrolytic solution is 0.01 to 35% by mass, preferably 0.01% by mass or more, more preferably 0.03% by mass or more and further preferably 0.3% by mass or more, and an upper limit thereof is preferably 35% by mass or less, more preferably 30% by mass or less, more preferably 25% by mass or less and further preferably 15% by mass or less.

When the nonaqueous solvent contains both of the cyclic carbonate having a carbon-carbon double bond and the cyclic carbonate having a fluorine atom, a volume ratio of a content of the cyclic carbonate having a carbon-carbon double bond to that of the cyclic carbonate having a fluorine atom is preferably 0.005 or more, more preferably 0.01 or more, and an upper limit thereof is preferably 10 or less, more preferably 5 or less and further preferably 2 or less. When the composition ratio stays in the levels described above, the electrochemical characteristics in a further broader temperature range are improved, and therefore it is preferred. Also, if the nonaqueous solvent contains ethylene carbonate and/or propylene carbonate, the coating film formed on the electrode is reduced in a resistance, and therefore it is preferred. A content of ethylene carbonate and/or propylene carbonate is preferably 3% by volume or more, more preferably 5% by volume or more and further preferably 7% by volume or more based on a whole volume of the nonaqueous solvent, and an upper limit thereof is preferably 45% by volume or less, more preferably 35% by volume or less and further preferably 25% by volume or less.

The above cyclic carbonates may be used alone, and when they are used in combination of two or more kinds thereof, the electrochemical characteristics in a broad temperature range are further improved, so that it is preferred. They are used particularly preferably in combination of three or more kinds thereof. The suitable combinations of the above cyclic carbonates are preferably EC and PC; EC and VC; PC and VC; VC and FEC; EC and FEC; PC and FEC; FEC and DFEC; EC and DFEC; PC and DFEC; VC and DFEC; VEC and DFEC; EC and PC and VC; EC and PC and FEC; EC and VC and FEC; EC and VC and VEC; PC and VC and FEC; EC and VC and DFEC; PC and VC and DFEC; EC and PC and VC and FEC; EC and PC and VC and DFEC and the like. Among the combinations described above, the combinations of EC and VC, EC and FEC, PC and FEC and the like are preferred as the combinations of two kinds, and the combinations of EC, PC and VC, EC, PC and FEC, EC, VC and FEC, PC, VC and FEC, EC, PC, VC and FEC and the like are preferred as the combinations of three or more kinds.

A content of the cyclic carbonates shall not specifically be restricted, and they are used in a range of preferably 10 to 40% by volume based on a whole volume of the nonaqueous solvent. If the content is 10% by volume or more, the nonaqueous electrolytic solution is less likely to be lowered in a conductivity and worsened the electrochemical characteristics in a broad temperature range, and if it is 40% by volume or less, the nonaqueous electrolytic solution is less likely to be increased too much in a viscosity and worsened the electrochemical characteristics in a broad temperature range. Accordingly, the content falls preferably in the ranges described above.

The linear esters suitably include asymmetric linear carbonates, such as methyl ethyl carbonate (MEC), methyl propyl carbonate (MPC), methyl isopropyl carbonate (MIPC), methyl butyl carbonate, ethyl propyl carbonate and the like, symmetric linear carbonates, such as dimethyl carbonate (DMC), diethyl carbonate (DEC), dipropyl carbonate, dibutyl carbonate and the like and linear carboxylic esters, such as methyl propionate, ethyl propionate, methyl acetate, ethyl acetate and the like.

A content of the linear esters shall not specifically be restricted, and they are used in a range of preferably 60 to 90% by volume based on a whole volume of the nonaqueous solvent. If the above content is 60% by volume or more, the nonaqueous electrolytic solution is not increased too much in a viscosity, and if it is 90% by volume or less, the nonaqueous electrolyte solution is less likely to be lowered in an electrical conductivity and worsened the electrochemical characteristics in a broad temperature range, so that the content falls preferably in the ranges described above.

Among the linear esters described above, preferred are the linear esters having a methyl group selected from dimethyl carbonate (DMC), methyl ethyl carbonate (MEC), methyl propyl carbonate (MPC), methyl isopropyl carbonate (MIPC), methyl butyl carbonate, methyl propionate, methyl acetate and ethyl acetate, and the linear carbonates having a methyl group are particularly preferred.

Also, when the linear carbonates are used, two or more kinds thereof are preferably used, and both of the symmetric linear carbonates and the asymmetric linear carbonates are more preferably contained. A content of the symmetric linear carbonates is further preferably larger than that of the asymmetric linear carbonates.

A proportion of a volume of the symmetric linear carbonates based on the linear carbonates is 50% by volume or more, more preferably 55% by volume or more. An upper limit thereof is more preferably 95% by volume or less, further preferably 85% by volume or less. If dimethyl carbonate (DMC) and diethyl carbonate (DEC) are contained in the symmetric linear carbonate, it is particularly preferred. A content of diethyl carbonate (DEC) in the nonaqueous solvent is preferably 1% by volume or more, more preferably 2% by volume or more, and an upper limit thereof is preferably 10% by volume or less, more preferably 6% by volume or less.

The asymmetric linear carbonates having a methyl group are more preferred, and methyl ethyl carbonate (MEC) is particularly preferred.

In the case described above, the electrochemical characteristics in a further broader temperature range are improved, and therefore it is preferred.

A proportion of the cyclic carbonates to the linear esters is preferably 10:90 to 45:55, more preferably 15:85 to 40:60 and particularly preferably 20:80 to 35:65 in terms of the cyclic carbonates:the linear esters (volume ratio) from the viewpoint of improving the electrochemical characteristics in a further broader temperature range.

In the invention IV, if the benzene compound (second additive) in which an aliphatic hydrocarbon group having 1 to 6 carbon atoms is bonded to a benzene ring via a tertiary carbon atom or a quaternary carbon atom is further contained in the nonaqueous electrolytic solution, the electrochemical characteristics in a further broader temperature range are improved, and therefore it is preferred. A reason therefor is not necessarily clear, but it is considered to be due to that the benzene ring is adsorbed on the negative electrode and that a branched alkyl group is present on the benzene ring, so that a film derived from the sulfonate compound having a silicon atom represented by Formula (VII) is improved in a heat resistance without too much minutely depositing.

A content of the benzene compound in which an aliphatic hydrocarbon group having 1 to 6 carbon atoms is bonded to a benzene ring via a tertiary carbon atom or a quaternary carbon atom and which is contained in the nonaqueous electrolytic solution is suitably 0.1 to 10% by mass. It is preferably a mass of 1 to 50 times based on a mass of the sulfonate compound having a silicon atom represented by Formula (VII). If the above content is 50 times or less based on a mass of the sulfonate compound containing a silicon atom represented by Formula (VII), the benzene compound is less likely to be adsorbed too much on the negative electrode to worsen the low-temperature properties, and if it is even or more, an effect of adsorbing to the negative electrode is sufficiently obtained. Accordingly, the content is preferably even or more, more preferably 4 times or more and further preferably 10 times or more. An upper limit thereof is preferably 50 times or less, more preferably 40 times or less and further preferably 30 times or less.

The benzene compound in which an aliphatic hydrocarbon group having 1 to 6 carbon atoms is bonded to a benzene ring via a tertiary carbon atom or a quaternary carbon atom suitably includes cyclohexylbenzene, fluorocyclohexylbenzene (1-fluoro-2-cyclohexylbenzene, 1-fluoro-3-cyclohexylbenzene, 1-fluoro-4-cyclohexylbenzene), tert-butylbenzene, 1,3-di-tert-butylbenzene, tert-amylbenzene and 1-fluoro-4-tert-butylbenzene. Cyclohexylbenzene, tert-butylbenzene and tert-amylbenzene are more preferred, and tert-butylbenzene and tert-amylbenzene are further preferred.

Other nonaqueous solvents used in the present invention suitably include tertiary carboxylic esters, such as methyl pivalate, butyl pivalate, hexyl pivalate, octyl pivalate and the like, oxalic esters, such as dimethyl oxalate, ethyl methyl oxalate, diethyl oxalate and the like, cyclic ethers, such as tetrahydrofuran, 2-methyltetrahydrofuran, 1,3-dioxolane, 1,3-dioxane, 1,4-dioxane and the like, linear ethers, such as 1,2-dimethoxyethane, 1,2-diethoxyethane, 1,2-dibutoxyethane and the like, amides, such as dimethylformamide and the like, phosphoric esters, such as trimethyl phosphate, tributyl phosphate, trioctyl phosphate and the like, sulfones, such as sulfolane and the like, lactones, such as γ-butyrolactone, γ-valerolactone, α-angelicalactone and the like, nitriles, such as acetonitrile, propionitrile, succinonitrile, glutaronitrile, adiponitrile, pimelonitrile and the like, cyclic sulfites, such as ethylene sulfite, hexahydrobenzo[1,3,2]dioxathiolane-2-oxide (also referred to as 1,2-cyclohexanediol cyclic sulfite), 5-vinylhexahydro-1,3,2-benzodioxathiol-2-oxide and the like, sulfonic esters having a cyclic structure or an unsaturated group, such as 1,3-propanesultone, 1,3-butanesultone, 1,4-butanesultone, 2-propinyl methanesulfonate, butane-1,4-diyl dimethanesulfonate, pentane-1,5-diyl dimethanesulfonate, propane-1,2-diyl dimethanesulfonate, butane-2,3-diyl dimethanesulfonate, methylene methanedisulfonate and the like, S=O bond-containing compounds selected from vinyl sulfones, such as divinyl sulfone, 1,2-bis(vinylsulfonyl)ethane, bis(2-vinylsulfonylethyl)ether and the like, linear carboxylic anhydrides, such as acetic anhydride, propionic anhydride and the like, cyclic acid anhydrides, such as succinic anhydride, maleic anhydride, glutaric anhydride, itaconic anhydride, 3-sulfo-propionic anhydride and the like, cyclic phosphazenes, such as methoxypentafluorocyclotriphosphazene, ethoxypentafluorocyclotriphosphazene, phenoxypentafluorocyclotriphosphazene, ethoxyheptafluorocyclotetraphosphazene and the like, benzene compounds having a branched alkyl group, such as cyclohexylbenzene, fluorocyclohexylbenzene (1-fluoro-2-cyclohexylbenzene, 1-fluoro-3-cyclohexylbenzene, 1-fluoro-4-cyclohexylbenzene), tert-butylbenzene, tert-amylbenzene, 1-fluoro-4-tert-butylbenzene and the like, benzene compounds in which an aromatic ring is bonded to a benzene ring, such as biphenyl, terphenyl (o-, m- and p-forms) and the like and other aromatic compounds, such as diphenyl ether, fluorobenzene, difluorobenzene (o-, m- and p-forms), anisole, 2,4-difluoroanisole, partial hydrides of terphenyl (1,2-dicyclohexylbenzne, 2-phenylbicyclohexyl, 1,2-diphenylcyclohexane, o-cyclohexylbiphenyl) and the like.

Among the compounds described above, the nitriles and/or the aromatic compounds are preferably contained since the electrochemical characteristics in a further broader temperature range are improved. Among the nitriles, dinitriles are preferred, and above all, nitriles in which two cyano groups are connected by a aliphatic hydrocarbon group having 2 to 6 carbon atoms are more preferred. Succinonitrile, glutaronitrile, adiponitrile and pimelonitrile are further preferred, and adiponitrile and pimelonitrile are particularly preferred.

Also, among the aromatic compounds, preferred are the benzene compounds in which an aromatic ring is bonded to a benzene ring or in which an aliphatic hydrocarbon group having 1 to 6 carbon atoms is bonded to a benzene ring via a tertiary carbon atom or a quaternary carbon atom, and more preferred are the benzene compounds in which an aliphatic hydrocarbon group having 1 to 6 carbon atoms is bonded to a benzene ring via a tertiary carbon atom or a quaternary carbon atom. Among them, biphenyl, cyclohexylbenzene, tert-butylbenzene and tert-amylbenzene are further preferred, and tert-butylbenzene and tert-amylbenzene are particularly preferred.

A content of the nitriles and/or the aromatic compounds is preferably 0.001 to 5% by mass in the nonaqueous electrolytic solution. If the above content is 5% by mass or less, the coating film is less likely to be formed in excess on the electrode and worsened in low-temperature properties. On the other hand, if it is 0.001% by mass or more, the coating film is formed sufficiently well and enhanced in an effect of improving a high-temperature storage property. The above content is preferably 0.005% by mass or more, more preferably 0.01% by mass or more and further preferably 0.03% by mass or more in the nonaqueous electrolytic solution, and an upper limit thereof is preferably 3% by mass or less, more preferably 1% by mass or less and further preferably 0.4% by mass or less.

Also, the S=O bond-containing compounds having a cyclic structure or an unsaturated group selected from the cyclic sulfites, the sulfonic esters having a cyclic structure or an unsaturated group and vinyl sulfones are preferably contained since the electrochemical characteristics in a further broader temperature range are improved. Among them, preferred are 1,3-propanesultone, ethylene sulfite, hexahydrobenzo[1,3,2]dioxathiolane-2-oxide, 5-vinyl-hexahydro-1,3,2-benzodioxathiol-2-oxide, 4-(methylsulfonylmethyl)-1,3,2-dioxathiolane-2-oxide, divinyl sulfone and bis(2-vinylsulfonylethyl)ether, and further preferred are hexahydrobenzo[1,3,2]dioxathiolane-2-oxide, 5-vinyl-hexahydro-1,3,2-benzodioxathiol-2-oxide, 4-(methylsulfonylmethyl)-1,3,2-dioxathiolane-2-oxide and bis(2-vinylsulfonylethyl)ether. Particularly preferred are hexahydrobenzo[1,3,2]dioxathiolane-2-oxide, 5-vinyl-hexahydro-1,3,2-benzodioxathiol-2-oxide and 4-(methylsulfonylmethyl)-1,3,2-dioxathiolane-2-oxide which are cyclic sulfites having a branched structure. A content of the S=O group-containing compound having a cyclic structure or an unsaturated group is preferably 0.001 to 5% by mass in the nonaqueous electrolytic solution. If the above content is 5% by mass or less, the coating film is less likely to be formed in excess on the electrode and worsened in low-temperature properties. On the other hand, if it is 0.001% by mass or more, the coating film is formed sufficiently well and enhanced in an effect of improving a high-temperature storage property. The above content is preferably 0.005% by mass or more, more preferably 0.01% by mass or more and further preferably 0.03% by mass or more in the nonaqueous electrolytic solution, and an upper limit thereof is preferably 3% by mass or less, more preferably 1% by mass or less and further preferably 0.4% by mass or less.

The nonaqueous solvents described above are used usually in a mixture in order to achieve the relevant physical properties. A combination thereof suitably includes, for example, a combination of the cyclic carbonates and the linear esters, such as the linear carbonates and the like, a combination of the cyclic carbonates, the linear esters and the lactones, a combination of the cyclic carbonates, the linear esters and the ethers, a combination of the cyclic carbonates, the linear esters and the nitriles and the like.

Also, 0.01 to 0.5% by mass of carbon dioxide is preferably contained in the nonaqueous electrolytic solution since the electrochemical characteristics in a broad temperature range are improved still more.

Electrolyte Salt:

The electrolyte salt used in the present invention suitably includes the following lithium salts and onium salts.

Lithium Salts:

The lithium salts suitably include inorganic lithium salts, such as $LiPF_6$, $LiPO_2F_2$, $LiBF_4$, $LiClO_4$, $LiN(SO_2F)_2$ and the like, lithium salts containing a linear alkyl fluoride group, such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$ and the like, lithium salts containing a cyclic alkylene fluoride chain, such as $(CF_2)_2(SO_2)_2NLi$, $(CF_2)_3(SO_2)_2NLi$ and the like and lithium salts with an oxalate complex as an anion therein, such as lithium bis[oxalate-O,O']borate, lithium difluoro[oxalate-O,O']borate and the like. Among them, at least one selected from $LiPF_6$, $LiBF_4$, $LiN(SO_2CF_3)_2$ and $LiN(SO_2C_2F_5)_2$ is preferred, and at least one selected from $LiPF_6$, $LiBF_4$ and $LiN(SO_2CF_3)_2$ is more preferred.

Onium Salt:

The onium salts suitably include various salts obtained by combining onium cations and anions each shown below.

The specific examples of the onium cations suitably include tetramethylammonium cations, ethyltrimethylammonium cations, diethyldimethylammonium cations, triethylmethylammonium cations, tetraethylammonium cations, N,N-dimethylpyrrolidinium cations, N-ethyl-N-methylpyrrolidinium cations, N,N-diethylpyrrolidinium cations, spiro (N,N')-bipyrrolidinium cations, N,N'-dimethylimidazolinium cations, N-ethyl-N'-methylimidazolinium cations, N,N'-diethylimidazolinium cations, N,N'-dimethylimidazolium cations, N-ethyl-N'-methylimidazolium cations, N,N'-diethylimidazolium cations and the like.

The specific examples of the anions suitably include $PF_6$ anions, $BF_4$ anions, $ClO_4$ anions, $AsF_6$ anions, $CF_3SO_3$ anions, $N(CF_3SO_2)_2$ anions, $N(C_2F_5SO_2)_2$ anions, $N(SO_2F)_2$ anions and the like.

The above electrolyte salts can be used alone or in combination of two or more kinds thereof.

A concentration of the above electrolyte salts which are used by dissolving is usually preferably 0.3 M or more, more preferably 0.7 M or more and further preferably 1.1 M or more based on the nonaqueous solvent described above. Also, an upper limit thereof is preferably 2.5 M or less, more preferably 2.0 M or less and further preferably 1.5 M or less.

Production of Nonaqueous Electrolytic Solution:

The nonaqueous electrolytic solution of the present invention can be obtained, for example, by mixing the nonaqueous solvents described above and dissolving the electrolyte salt described above and the sulfonic ester compound represented by Formula (I) to the mixture.

In the above case, the nonaqueous solvent used and the compounds added to the nonaqueous electrolytic solution are preferably purified in advance in a range in which the productivity is not notably reduced, and those which are reduced in impurities to the utmost are preferably used.

The nonaqueous electrolytic solution of the present invention can be used for the following first to fourth electrochemical elements, and not only the liquid products but also the gelatinized products can be used as the nonaqueous electrolyte. Further, the nonaqueous electrolytic solution of the present invention can be used as well for a solid polymer electrolyte. Among them, it is used preferably for the first electrochemical element in which a lithium salt is used for an electrolyte salt (that is, for a lithium battery) or the fourth electrochemical element (that is, for a lithium ion capacitor), and it is used further preferably for a lithium battery, most suitably for a lithium secondary battery.

First Electrochemical Element (Lithium Battery):

The lithium battery of the present invention is a general term for a lithium primary battery and a lithium secondary battery. Also, in the present specification, the term of a lithium secondary battery is used as a concept including as well a so-called lithium ion secondary battery. The lithium battery of the present invention comprises a positive electrode, a negative electrode and the foregoing nonaqueous electrolytic solution prepared by dissolving the electrolyte salt in the nonaqueous solvent. The constitutive components, such as the positive electrode, the negative electrode and the like other than the nonaqueous electrolytic solution can be used without specific restrictions.

For example, complex metal oxides with lithium which contain at least one selected from cobalt, manganese and nickel are used as a positive electrode active material for a lithium secondary battery. The above positive electrode active materials can be used alone or in combination of two or more kinds thereof.

The above lithium complex metal oxides include, for example, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, $LiCo_{0.98}Mg_{0.02}O_2$ and the like. Also, they may be used in combination of $LiCoO_2$ and $LiMn_2O_4$, $LiCoO_2$ and $LiNiO_2$, and $LiMn_2O_4$ and $LiNiO_2$.

In order to enhance the safety in overcharging and the cycle property and make it possible to use the battery at a charging electrical potential of 4.3 V or more, a part of the lithium complex metal oxide may be substituted with other elements. For example, a part of cobalt, manganese and nickel can be substituted with at least one element of Sn, Mg, Fe, Ti, Al, Zr, Cr, V, Ga, Zn, Cu, Bi, Mo, La and the like, and a part of O can be substituted with S and F, or the lithium complex metal oxide can be coated with a compound containing the above other elements.

Among them, preferred are the lithium complex metal oxides which can be used at a charging electrical potential of 4.3 V or more based on Li in the positive electrode in a fully charged state, such as $LiCoO_2$, $LiMn_2O_4$ and $LiNiO_2$, and more preferred are the lithium complex metal oxides which can be used at 4.4 V or more, such as solid solutions with $LiCo_{1-x}M_x O_2$ (provided that M is at least one element selected from Sn, Mg, Fe, Ti, Al, Zr, Cr, V, Ga, Zn and Cu, 0.001≤x≤0.05), $LiCo_{1/3}Ni_{1/3} Mn_{1/3}O_2$, $LiNi_{1/2}Mn_{3/2}O_4$, $Li_2MnO_3$ and $LiM_2$ (M is transition metal, such as Co, Ni, Mn, Fe and the like). When the lithium complex metal oxides which are operated at a higher charged voltage are used, particularly the electrochemical characteristics in a broad temperature range are liable to be reduced due to reaction with the electrolytic solution in charging, but in the lithium secondary battery according to the present invention, the above electrochemical characteristics can be inhibited from being reduced.

Particularly in a case of the positive electrode containing Mn, the battery tends to be liable to be increased in a resistance as Mn ions are eluted from the positive electrode, and therefore the electrochemical characteristics in a broad temperature range tend to be liable to be reduced, but in the lithium secondary battery according to the present invention, the above electrochemical characteristics can be inhibited from being reduced, and therefore it is preferred.

Further, a lithium-containing olivine-type phosphate can also be used as the positive electrode active material. In particular, a lithium-containing olivine-type phosphate containing at least one selected from iron, cobalt, nickel and manganese is preferred. The specific examples thereof include $LiFePO_4$, $LiCoPO_4$, $LiNiPO_4$, $LiMnPO_4$ and the like.

A part of the above lithium-containing olivine-type phosphates may be substituted with other elements, and a part of iron, cobalt, nickel and manganese can be substituted with at least one element selected from Co, Mn, Ni, Mg, Al, B, Ti, V, Nb, Cu, Zn, Mo, Ca, Sr, W, Zr and the like or can be coated with a compound containing any of the above other elements or with a carbon material. Among them, $LiFePO_4$ or $LiMnPO_4$ is preferred.

Also, the above lithium-containing olivine-type phosphate can be used as well, for example, in a mixture with the positive electrode active material described above.

Also, the positive electrode for the lithium primary battery includes oxides or chalcogen compounds of one or more metal elements, such as $CuO$, $Cu_2O$, $Ag_2O$, $Ag_2CrO_4$, $CuS$, $CuSO_4$, $TiO_2$, $TiS_2$, $SiO_2$, $SnO$, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, $FeO$, $Fe_3O_4$, $Ni_2O_3$, $NiO$, $CoO_3$, $CoO$ and the like, sulfur compounds, such as $SO_2$, $SOCl_2$ and the like, carbon fluorides (graphite fluoride) represented by Formula $(CF_x)_n$ and the like. Among them, $MnO_2$, $V_2O_5$ and graphite fluorides are preferred.

An electroconductive agent for the positive electrode shall not specifically be restricted as long as it is an electron conductive material which does not bring about chemical change to the electrolytic solution. It includes, for example, graphites, such as natural graphites (flaky graphites and the like), artificial graphites and the like and carbon blacks, such as acetylene blacks, Ketjen blacks, channel blacks, furnace blacks, lamp blacks, thermal blacks and the like. Also, graphites and carbon blacks may be used in a suitable mixture. An addition amount of the electroconductive agent to the positive electrode mixture is preferably 1 to 10% by mass, particularly preferably 2 to 5% by mass.

The positive electrode can be produced by mixing the positive electrode active material described above with the electroconductive agent, such as acetylene blacks, carbon blacks and the like and a binder, such as polytetrafluoroethylene (PTFE), polyvinylidene fluoride (PVDF), copolymers (SBR) of styrene and butadiene, copolymers (NBR) of acrylonitrile and butadiene, carboxymethyl cellulose (CMC), ethylene/propylene/diene terpolymers and the like, adding a high-boiling point solvent, such as 1-methyl-2-pyrrolidone and the like to the mixture and kneading it to prepare a positive electrode mixture, then coating the above positive electrode mixture on a collector, such as an aluminum foil, a stainless-made lath plate and the like, drying and subjecting it to pressure molding and then subjecting it to heating treatment at a temperature of 50 to 250° C. for about 2 hours under vacuum.

A density of parts excluding the collector of the positive electrode is usually 1.5 g/cm$^3$ or more, and in order to enhance further a capacity of the battery, it is preferably 2 g/cm$^3$ or more, more preferably 3 g/cm$^3$ or more and further preferably 3.6 g/cm$^3$ or more. An upper limit thereof is preferably 4 g/cm$^3$ or less.

As the negative electrode active material for the lithium secondary battery, lithium metal, lithium alloys, carbon materials which can absorb and release lithium (graphitizable carbons, non-graphitizable carbons in which a lattice (002) spacing ($d_{002}$) is 0.37 nm or more, graphites in which a lattice (002) spacing ($d_{002}$) is 0.34 nm or less), tin (simple substance), tin compounds, silicon (simple substance), silicon compounds, lithium titanate compounds, such as $Li_4Ti_5O_{12}$ and the like can be used alone or in combination of two or more kinds thereof.

Among them, high-crystalline carbon materials, such as artificial graphites, natural graphites and the like are further preferably used in terms of an ability of absorbing and releasing lithium, and carbon materials having a graphite-type crystal structure in which a lattice (002) spacing ($d_{002}$) is 0.340 nm (nanometer) or less, especially 0.335 to 0.337 nm are particularly preferably used.

A ratio ($I(110)/I(004)$) of a peak intensity $I(110)$ of a (110) plane and a peak intensity $I(004)$ of a (004) plane in the graphite crystal which are obtained from X ray diffractiometry of the negative electrode sheet subjected to pressure molding so that a density of parts excluding the collector of the negative electrode is 1.5 g/cm$^3$ or more is controlled to 0.01 or more by using artificial graphite particles having a bulky structure in which plural flattened graphite fine particles are put together or combined non-parallel to each other, or graphite particles obtained by exerting repeatedly a mechanical action, such as a compressive force, a friction force, a shearing force and the like on flaky natural graphite particles to subject them to spheroidizing treatment, whereby the electrochemical characteristics in a further broader temperature range are improved, and therefore it is preferred. The ratio is more preferably 0.05 or more, further preferably 0.1 or more. Also, the negative electrode sheet is treated too much in a certain case and reduced in a crystallinity to reduce a discharge capacity of the battery, and therefore an upper limit thereof is preferably 0.5 or less, more preferably 0.3 or less.

Also, a high-crystalline carbon material (core material) is coated preferably with a lower crystalline carbon material than the above carbon material (core material) since the electrochemical characteristics in a broad temperature range are improved. A crystallinity of the carbon material for coating can be confirmed by TEM.

When a high-crystalline carbon material is used, it tends to be reacted with a nonaqueous electrolytic solution in charging to reduce the electrochemical characteristics at low temperature or high temperature due to an increase in the interfacial resistance, but in the lithium secondary battery according to the present invention, the electrochemical characteristics in a broad temperature range are improved.

Also, the metal compounds which can absorb and release lithium as the negative electrode active material include compounds containing at least one metal element, such as Si, Ge, Sn, Pb, P, Sb, Bi, Al, Ga, In, Ti, Mn, Fe, Co, Ni, Cu, Zn, Ag, Mg, Sr, Ba and the like. The above metal compounds may be used in any forms of simple substances, alloys, oxides, nitrides, sulfides, borides, alloys with lithium and the like, and any of the simple substances, the alloys, the oxides and the alloys with lithium is preferred since the capacity can be raised. Among them, the metal compounds containing at least one element selected from Si, Ge and Sn are preferred, and the metal compounds containing at least one element selected from Si and Sn are particularly preferred since the battery can be increased in a capacity.

The negative electrode can be produced by using the same electroconductive agent, binder and high-boiling point solvent as used in preparing the positive electrode, kneading them to prepare a negative electrode mixture, then coating the above negative electrode mixture on a copper foil and the like in a collector, drying and subjecting it to pressure molding and then subjecting it to heating treatment at a temperature of 50 to 250° C. for about 2 hours under vacuum.

A density of parts excluding the collector of the negative electrode is usually 1.1 g/cm$^3$ or more, and in order to enhance further a capacity of the battery, it is preferably 1.5 g/cm$^3$ or more, particularly preferably 1.7 g/cm$^3$ or more. An upper limit thereof is preferably 2 g/cm$^3$ or less.

Also, the negative electrode active material for the lithium primary battery includes lithium metal or lithium alloys.

A structure of the lithium battery shall not specifically be restricted, and a coin-type battery, a cylinder-type battery, a square-shaped battery, a laminate-type battery which have a single-layered or multi-layered separator can be applied.

The separator for batteries shall not specifically be restricted, and single-layer or laminate fine porous films of polyolefins, such as polypropylene, polyethylene and the like, woven fabrics, unwoven fabrics and the like can be used.

The lithium secondary battery in the present invention is excellent as well in electrochemical characteristics in a broad temperature range when a final charging voltage is 4.2 V or more, especially 4.3 V or more, and it has good characteristics as well in 4.4 V or more. The final discharging voltage can be usually 2.8 V or more, further 2.5 V or more, and in the lithium secondary battery in the present invention, it can be 2.0 V or more. A current value thereof shall not specifically be restricted, and it is used in a range of usually 0.1 to 30 C. Also, the lithium secondary battery in the present invention can be charged and discharged at −40 to 100° C., preferably −10 to 80° C.

In the present invention, methods in which a safety valve is provided in a battery cap and in which a cutout is formed on members, such as a battery can, a gasket and the like can be employed as a measure for a rise in an internal pressure of the lithium battery. Also, a current cutting-off mechanism which detects an internal pressure of the battery to cut-off a current can be provided in a battery cap as a safety measure for preventing overcharging.

Second Electrochemical Element (Electric Double Layer Capacitor):

It is an electrochemical element which stores energy by making use of an electric double layer capacitance in the interface between an electrolytic solution and an electrode therein. One example of the present invention is an electric double layer capacitor. A most typical electrode active material used for the above electrochemical element is activated carbon. The double layer capacitance is increased approximately in proportion to the surface area.

Third Electrochemical Element:

It is an electrochemical element which stores energy by making use of doping/dedoping reaction of an electrode therein. An electrode active material used for the above electrochemical element includes metal oxides, such as ruthenium oxide, iridium oxide, tungsten oxide, molybdenum oxide, copper oxide and the like and n conjugate polymers, such as polyacenes, polythiophene derivatives and the like. Capacitors produced by using the above electrode active materials can store energy generated by doping/dedoping reaction of an electrode.

Fourth Electrochemical Element (Lithium Ion Capacitor):

It is an electrochemical element which stores energy by making use of intercalation of lithium ions into carbon materials, such as graphite and the like which is the negative electrode. It is called a lithium ion capacitor (LIC). The positive electrode includes, for example, electrodes produced by making use of an electric double layer between an activated carbon electrode and an electrolytic solution therein, or electrodes produced by making use of doping/dedoping reaction of it conjugate polymer electrodes therein. At least a lithium salt, such as LiPF$_6$ and the like is contained in the electrolytic solution.

The sulfonic ester compound represented by Formula (I) or (II) can be synthesized by the following method, but it shall not be restricted to the present method.

A method described in, for example, Journal of the Chemical Society, Perkin Transactions 2 No. 8, page 1201 to 1208, 1991 in which alcohol is reacted with sulfonyl halide in a solvent under the presence of a base can be applied as a synthetic method for the sulfonic ester compound.

EXAMPLES

Examples of electrolytic solutions prepared by using the sulfonic ester compounds of the present invention are shown below, but the present invention shall not be restricted to these examples.

The low-temperature properties after charged and stored at high temperature and the low-temperature cycle property were evaluated by the following methods.

Evaluation of Low-Temperature Properties after Charged and Stored at High Temperature:

Initial Discharge Capacity:

A coin-type battery produced by the method described above was used and charged at a constant current of 1 C and a constant voltage up to a final voltage of 4.2 V for 3 hours in a thermostatic chamber of 25° C., and a temperature of the thermostatic chamber was lowered to 0° C. The battery was discharged up to a final voltage of 2.75 V at a constant current of 1 C to determine an initial discharge capacity at 0° C.

Charging and Storing Test at High Temperature:

Next, the above coin-type battery was charged at a constant current of 1 C and a constant voltage up to a final voltage of 4.2 V for 3 hours in a thermostatic chamber of 85° C., and it was stored for 3 days in a state of maintaining at 4.2 V. Then, the battery was put in the thermostatic chamber of 25° C. and once discharged at a constant current of 1 C up to a final voltage of 2.75 V.

Discharge Capacity after Charged and Stored at High Temperature:

Further, after that, the discharge capacity at 0° C. after charged and stored at high temperature was determined in the same manner as in measuring the initial discharge capacity.

Low-Temperature Properties after Charged and Stored at High Temperature:

The low-temperature properties after charged and stored at high temperature were determined from the following retention rate of the 0° C. discharge capacity:

0° C. discharge capacity retention rate (%) after charged and stored at high temperature= (discharge capacity at 0° C. after charged and stored at high temperature)/(initial discharge capacity at 0° C.)×100

Evaluation of Low-Temperature Cycle Property:

A coin-type battery produced by the method described above was used and charged at a constant current of 1 C and a constant voltage up to a final voltage of 4.2 V for 3 hours in a thermostatic chamber of 25° C., and then it was discharged at a constant current of 1 C up to a final voltage of 2.75 V to thereby carry out precycle. Next, the battery was charged at a constant current of 1 C and a constant voltage up to a final voltage of 4.2 V for 3 hours in the thermostatic chamber of 0° C., and then it was discharged at a constant current of 1 C up to a final voltage of 2.75 V. This was repeated until it reached 50 cycles. Then, the discharge capacity retention rate (%) at 0° C. after 50 cycles was determined according to the following equation:

discharge capacity retention rate (%) at 0° C. after 50 cycles=(discharge capacity in 50th cycle at 0° C.)/(discharge capacity in 1st cycle at 0° C.)×100

Examples I-1 to I-21 (Invention I) and Comparative Examples I-1 to I-3

Production of Lithium Ion Secondary Battery

LiCoO$_2$: 94% by mass and acetylene black (electroconductive agent): 3% by mass were mixed, and the mixture was added to a solution prepared by dissolving in advance polyvinylidene fluoride (binder): 3% by mass in 1-methyl-2-pyrrolidone and mixed to prepare a positive electrode mixture paste. This positive electrode mixture paste was coated on one surface of an aluminum foil (collector), dried and subjected to pressure treatment, and it was cut into a predetermined size to produce a positive electrode sheet. A density of parts excluding the collector of the positive electrode was 3.6 g/cm$^3$.

Further, 95% by mass of artificial graphite ($d_{002}$=0.335 nm, negative electrode active material) coated with amorphous carbon was added to a solution prepared by dissolving in advance 5% by mass of polyvinylidene fluoride (binder) in 1-methyl-2-pyrrolidone and mixed to prepare a negative electrode mixture paste. This negative electrode mixture paste was coated on one surface of a copper foil (collector), dried and subjected to pressure treatment, and it was cut into a predetermined size to produce a negative electrode sheet. A density of parts excluding the collector of the negative electrode was 1.5 g/cm$^3$. Further, X ray diffraction measurement was carried out by using the above electrode sheet to result in finding that a ratio (I (110)/I (004)) of a peak intensity I (110) of a (110) plane and a peak intensity I (004) of a (004) plane in the graphite crystal was 0.1. Then, the positive electrode sheet, a fine porous polyethylene film-made separator and the negative electrode sheet were laminated thereon in this order, and nonaqueous electrolytic solutions having compositions described in Table I-1 and Table I-2 were added thereto to produce 2032 coin-type batteries.

The producing conditions and the evaluation results of the batteries are shown in Table I-1 and Table I-2.

TABLE I-1

| | Composition of electrolyte salt composition of nonaqueous electrolytic solution (volume ratio of solvent) | Sulfonic ester compound | Addition amount *1 | Other additives (1) | Addition amount *1 | Other additives (2) | Addition amount *1 | 0° C. discharge capacity retention rate (%) after high temperature charge and storage |
|---|---|---|---|---|---|---|---|---|
| Example I-1 | 1M LiPF$_6$ EC/DMC/MEC (30/40/30) | 3-methylbutane-2-yl 4-methylbenzene-sulfonate | 0.01 | none | — | none | — | 74 |
| Example I-2 | 1M LiPF$_6$ EC/DMC/MEC (30/40/30) | 3-methylbutane-2-yl 4-methylbenzene-sulfonate | 1 | none | — | none | — | 78 |
| Example I-3 | 1M LiPF$_6$ EC/DMC/MEC (30/40/30) | 3-methylbutane-2-yl 4-methylbenzene-sulfonate | 3 | none | — | none | — | 76 |
| Example I-4 | 1M LiPF$_6$ EC/DMC/MEC (30/40/30) | 3-methylbutane-2-yl methanesulfonate | 1 | none | — | none | — | 76 |
| Example I-5 | 1M LiPF$_6$ EC/DMC/MEC (30/40/30) | butane-2-yl methanesulfonate | 1 | none | — | none | — | 71 |
| Example I-6 | 1M LiPF$_6$ EC/DMC/MEC (30/40/30) | 4-methylpentane-2-yl methanesulfonate | 1 | none | — | none | — | 73 |
| Example I-7 | 1M LiPF$_6$ EC/DMC/MEC (30/40/30) | 1-cylopropylethyl methanesulfonate | 1 | none | — | none | — | 75 |
| Example I-8 | 1M LiPF$_6$ EC/DMC/MEC (30/40/30) | bis(3-methylbutane-2-yl) methanedisulfonate | 1 | none | — | none | — | 80 |
| Example I-9 | 1M LiPF$_6$ EC/DMC/MEC (30/40/30) | bis(3-methylbutane-2-yl) ethane-1,2-disulfonate | 1 | none | — | none | — | 79 |
| Example I-10 | 1M LiPF$_6$ EC/EFC/VC/DMC/MEC (18/10/2/40/30) | 3-methylbutane-2-yl 4-methylbenzene-sulfonate | 1 | none | — | none | — | 81 |
| Example I-11 | 1M LiPF$_6$ EC/DMC/MEC (30/40/30) | 3-methylbutane-2-yl methanesulfonate | 1 | *2 | 2 | none | — | 80 |
| Example I-12 | 1M LiPF$_6$ EC/DMC/MEC (30/40/30) | 3-methylbutane-2-yl methanesulfonate | 1 | none | — | *3 | 1 | 81 |

TABLE I-1-continued

| | Composition of electrolyte salt composition of nonaqueous electrolytic solution (volume ratio of solvent) | Sulfonic ester compound | Addition amount *1 | Other additives (1) | Addition amount *1 | Other additives (2) | Addition amount *1 | 0° C. discharge capacity retention rate (%) after high temperature charge and storage |
|---|---|---|---|---|---|---|---|---|
| Comparative Example I-1 | 1M LiPF$_6$ EC/DMC/MEC (30/40/30) | none | — | none | — | none | — | 60 |
| Comparative Example I-2 | 1M LiPF$_6$ EC/DMC/MEC (30/40/30) | methyl methanesulfonate | 1 | none | — | none | — | 63 |
| Comparative Example I-3 | 1M LiPF$_6$ EC/DMC/MEC (30/40/30) | propane-2-yl methanesulfonate | 1 | none | — | none | — | 65 |

*1: content (wt %) in nonaqueous electrolytic solution
*2: t-amylbenzene,
*3: 4-(methylsulfonylmethyl)-1,3,2-dioxathiolane-2-oxide

TABLE I-2

| | Composition of electrolyte salt composition of nonaqueous electrolytic solution (volume ratio of solvent) | Sulfonic ester compound | Addition amount *1 | Other additives (1) | Addition amount *1 | Other additives (2) | Addition amount *1 | 0° C. discharge capacity retention rate (%) after high temperature charge and storage |
|---|---|---|---|---|---|---|---|---|
| Example I-13 | 1M LiPF$_6$ EC/DMC/MEC (30/40/30) | propane-2-yl 4-methylbenzene-sulfonate | 1 | *2 | 2 | none | — | 71 |
| Example I-14 | 1M LiPF$_6$ EC/DMC/MEC (30/40/30) | propane-2-yl methanesulfonate | 1 | *2 | 2 | none | — | 70 |
| Example I-15 | 1M LiPF$_6$ EC/DMC/MEC (30/40/30) | bis(propane-2-yl) methanedisulfonate | 1 | *2 | 2 | none | — | 74 |
| Example I-16 | 1M LiPF$_6$ EC/DMC/MEC (30/40/30) | propane-2-yl 4-methylbenzene-sulfonate | 1 | none | — | *3 | 1 | 73 |
| Example I-17 | 1M LiPF$_6$ EC/DMC/MEC (30/40/30) | propane-2-yl methanesulfonate | 1 | none | — | *3 | 1 | 71 |
| Example I-18 | 1M LiPF$_6$ EC/DMC/MEC (30/40/30) | bis(propane-2-yl) methanedisulfonate | 1 | none | — | *3 | 1 | 75 |
| Example I-19 | 1M LiPF$_6$ EC/DMC/MEC (30/40/30) | propane-2-yl 4-methylbenzene-sulfonate | 1 | *2 | 0.5 | *3 | 0.5 | 74 |
| Example I-20 | 1M LiPF$_6$ EC/DMC/MEC (30/40/30) | propane-2-yl methanesulfonate | 1 | *2 | 0.5 | *3 | 0.5 | 73 |
| Example I-21 | 1M LiPF$_6$ EC/DMC/MEC (30/40/30) | bis(propane-2-yl) methanedisulfonate | 1 | *2 | 0.5 | *3 | 0.5 | 77 |
| Comparative Example I-3 | 1M LiPF$_6$ EC/DMC/MEC (30/40/30) | 3-methylbutane-2-yl methanesulfonate | 1 | none | — | none | — | 65 |

*1: content (wt %) in nonaqueous electrolytic solution
*2: t-amylbenzene,
*3: 4-(methylsulfonylmethyl)-1,3,2-dioxathiolane-2-oxide Examples I-22 and I-23 (Invention I) and Comparative Examples I-4

Silicon (simple substance) (negative electrode active material) was used in place of the negative electrode active material used in Example I-2 and Comparative Example I-1 to produce a negative electrode sheet. Silicon (simple substance): 80% by mass and acetylene black (electroconductive agent): 15% by mass were mixed, and the mixture was added to a solution prepared by dissolving in advance polyvinylidene fluoride (binder): 5% by mass in 1-methyl-2-pyrrolidone and mixed to prepare a negative electrode mixture paste. Coin-type batteries were produced in the same manners as in Example I-2 and Comparative Example I-1 to evaluate the batteries, except that the above negative electrode mixture paste was coated on a copper foil (collector), dried and subjected to pressure treatment and that it was cut into a predetermined size to produce a negative electrode sheet. The results thereof are shown in Table I-3.

TABLE I-3

| | Composition of electrolyte salt composition of nonaqueous electrolytic solution (volume ratio of solvent) | Sulfonic ester compound | Addition amount *1 | Other additives (1) | Addition amount *1 | Other additives (2) | Addition amount *1 | 0° C. discharge capacity retention rate (%) after high temperature charge and storage |
|---|---|---|---|---|---|---|---|---|
| Example I-22 | 1M LiPF$_6$ EC/DMC/MEC (30/40/30) | 3-methylbutane-2-yl methanesulfonate | 1 | none | — | none | — | 62 |
| Example I-23 | 1M LiPF$_6$ EC/DMC/MEC (30/40/30) | 3-methylbutane-2-yl methanesulfonate | 1 | *2 | 0.5 | *3 | 0.5 | 70 |
| Comparative Example I-4 | 1M LiPF$_6$ EC/DMC/MEC (30/40/30) | none | — | none | — | none | — | 52 |

*1: content (wt %) in nonaqueous electrolytic solution
*2: t-amylbenzene,
*3: 4-(methylsulfonylmethyl)-1,3,2-dioxathiolane-2-oxide

Examples I-24 and I-25 (Invention I) and Comparative Examples I-5

LiFePO$_4$ (positive electrode active material) coated with amorphous carbon was used in place of the positive electrode active material used in Examples I-2 and Comparative Example I-1 to produce a positive electrode sheet. LiFePO$_4$ coated with amorphous carbon: 90% by mass and acetylene black (electroconductive agent): 5% by mass were mixed, and the mixture was added to a solution prepared by dissolving in advance polyvinylidene fluoride (binder): 5% by mass in 1-methyl-2-pyrrolidone and mixed to prepare a positive electrode mixture paste. Coin-type batteries were produced in the same manners as in Examples I-2 and Comparative Example I-1 to evaluate the batteries, except that the above positive electrode mixture paste was coated on an aluminum foil (collector), dried and subjected to pressure treatment, followed by punching it to a prescribed size to produce a positive electrode sheet and that controlled were a final charging voltage to 3.6 V and a final discharging voltage to 2.0 V in evaluating the batteries. The results thereof are shown in Table I-3.

added and Comparative Examples 2 in which methyl methanesulfonate having no methine proton on a carbon atom having a sulfonyloxy group bonded thereto was added. It became clear from the above matters that the effects of the present invention were effects peculiar to the sulfonic ester compounds having a methine proton on a carbon atom to which a sulfonyloxy group was bonded.

All of the lithium secondary batteries produced in Examples I-13 to I-21 containing as the other additives, the benzene compound in which a hydrocarbon group having 1 to 6 carbon atoms was bonded to a benzene ring via a tertiary carbon atom or a quaternary carbon atom and/or the S=O group-containing compound having a cyclic structure or an unsaturated group were improved in low-temperature properties after charged and stored at high temperature as compared with the lithium secondary battery produced in Comparative Examples I-3 in which the other additives were not contained.

Also, from comparisons of Examples I-22 and I-23 with Comparative Example I-4, and Examples I-24 and I-25 with

TABLE I-4

| | Composition of electrolyte salt composition of nonaqueous electrolytic solution (volume ratio of solvent) | Sulfonic ester compound | Addition amount *1 | Other additives (1) | Addition amount *1 | Other additives (2) | Addition amount *1 | 0° C. discharge capacity retention rate (%) after high temperature charge and storage |
|---|---|---|---|---|---|---|---|---|
| Example I-24 | 1M LiPF$_6$ EC/DMC/MEC (30/40/30) | 3-methylbutane-2-yl methanesulfonate | 1 | none | — | none | — | 74 |
| Example I-25 | 1M LiPF$_6$ EC/DMC/MEC (30/40/30) | 3-methylbutane-2-yl methanesulfonate | 1 | *2 | 0.5 | *3 | 0.5 | 82 |
| Comparative Example I-5 | 1M LiPF$_6$ EC/DMC/MEC (30/40/30) | none | — | none | — | none | — | 66 |

*1: content (wt %) in nonaqueous electrolytic solution
*2: t-amylbenzene,
*3: 4-(methylsulfonylmethyl)-1,3,2-dioxathiolane-2-oxide All of the lithium secondary batteries produced in Examples I-1 to I-10 were notably improved in low-temperature properties after charged and stored at high temperature as compared with the lithium secondary batteries produced in Comparative Examples 1 in which the additives were not Comparative Example I-5, the same effect is observed as well in a case in which Si was used for the negative electrode and a case in which lithium-containing olivine-type iron phosphate was used for the positive electrode. Accordingly, it is apparent that the effects of the present invention are not effects depending on the specific positive electrode and negative electrode.

Further, the nonaqueous electrolytic solutions of the invention I described above have as well an effect of improving discharging properties in a broad temperature range in the lithium primary batteries.

Examples II-1 to II-12 (Invention II) and Comparative Examples II-1 to II-2

Production of Lithium Ion Secondary Battery $LiCoO_2$: 94% by mass and acetylene black (electroconductive agent): 3% by mass were mixed, and the mixture was added to a solution prepared by dissolving in advance polyvinylidene fluoride (binder): 3% by mass in 1-methyl-2-pyrrolidone and mixed to prepare a positive electrode mixture paste. This positive electrode mixture paste was coated on one surface of an aluminum foil (collector), dried and subjected to pressure treatment, and it was cut into a predetermined size to produce a positive electrode sheet. A density of parts excluding the collector of the positive electrode was 3.6 $g/cm^3$. Further, 95% by mass of artificial graphite ($d_{002}$=0.335 nm, negative electrode active material) coated with amorphous carbon was added to a solution prepared by dissolving in advance 5% by mass of polyvinylidene fluoride (binder) in 1-methyl-2-pyrrolidone and mixed to prepare a negative electrode mixture paste. This negative electrode mixture paste was coated on one surface of a copper foil (collector), dried and subjected to pressure treatment, and it was cut into a predetermined size to produce a negative electrode sheet. A density of parts excluding the collector of the negative electrode was 1.5 $g/cm^3$. Further, X ray diffraction measurement was carried out by using the above electrode sheet to result in finding that a ratio (I (110)/I (004)) of a peak intensity I (110) of a (110) plane and a peak intensity I (004) of a (004) plane in the graphite crystal was 0.1. Then, the positive electrode sheet, a fine porous polyethylene film-made separator and the negative electrode sheet were laminated thereon in this order, and nonaqueous electrolytic solutions having compositions described in Table II-1 and Table II-2 were added thereto to produce 2032 coin-type batteries.

The producing conditions and the evaluation results of the batteries are shown in Table II-1 and Table II-2.

In Table II-1 to Table II-4, the compound numbers and the structures of the sulfonic ester compounds represented by Formula (IV) which were used in the examples and the comparative examples are shown below. Ms in the following formulas represents a methanesulfonyl group, and Tos represents a 4-methylbenzenesulfonyl group (also referred to as a p-toluenesulfonyl group).

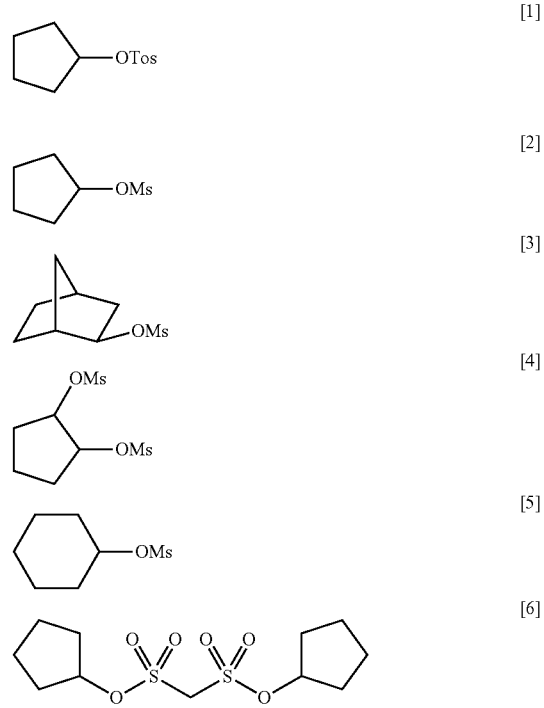

TABLE II-1

| | Composition of electrolyte salt composition of nonaqueous electrolytic solution (volume ratio of solvent) | Sulfonic ester compound (I) | Addition amount *1 | 0° C. discharge capacity retention rate (%) after high temperature charge and storage |
|---|---|---|---|---|
| Example II-1 | 1.2M $LiPF_6$ EC/DMC/MEC (30/50/20) | cyclopentyl 4-methylbenzene-sulfonate [1] | 0.01 | 74 |
| Example II-2 | 1.2M $LiPF_6$ EC/DMC/MEC (30/50/20) | cyclopentyl 4-methylbenzene-sulfonate [1] | 1 | 80 |
| Example II-3 | 1.2M $LiPF_6$ EC/DMC/MEC (30/50/20) | cyclopentyl 4-methylbenzene-sulfonate [1] | 3 | 78 |
| Example I-4 | 1.2M $LiPF_6$ EC/DMC/MEC (30/50/20) | cyclopentyl methane-sulfonate [2] | 1 | 77 |
| Example II-5 | 1.2M $LiPF_6$ EC/DMC/MEC (30/50/20) | bicyclo[2,2,1]heptane-2-yl methane-sulfonate [3] | 1 | 78 |
| Example II-6 | 1.2M $LiPF_6$ EC/DMC/MEC (30/50/20) | cyclopentane-1,2-diyl dimethane-sulfonate [4] | 1 | 75 |
| Example I-7 | 1.2M $LiPF_6$ EC/DMC/MEC (30/50/20) | cyclohexyl methane-sulfonate [5] | 1 | 73 |

TABLE II-1-continued

| | Composition of electrolyte salt composition of nonaqueous electrolytic solution (volume ratio of solvent) | Sulfonic ester compound (I) | Addition amount *1 | 0° C. discharge capacity retention rate (%) after high temperature charge and storage |
|---|---|---|---|---|
| Example II-8 | 1.2M LiPF$_6$ EC/DMC/MEC (30/50/20) | dicyclopentane methane-disulfonate [6] | 1 | 82 |
| Example II-9 | 1.2M LiPF$_6$ EC/FEC/ VC/DMC/MEC (18/10/2/50/20) | cyclopentyl 4-methylbenzene-sulfonate [1] | 1 | 82 |
| Comparative Example II-1 | 1.2M LiPF$_6$ EC/DMC/MEC (30/50/20) | none | — | 62 |
| Comparative Example II-2 | 1.2M LiPF$_6$ EC/DMC/MEC (30/50/20) | methyl methane-sulfonate [6] | — | 66 |

*1: content (wt %) in nonaqueous electrolytic solution

TABLE II-2

| | Composition of electrolyte salt composition of nonaqueous electrolytic solution (volume ratio of solvent) | Sulfonic ester compound | Addition amount *1 | Other additives | 0° C. discharge capacity retention rate (%) after high temperature charge and storage |
|---|---|---|---|---|---|
| Example II-10 | 1.2M LiPF$_6$ EC/DMC/MEC (30/50/20) | cyclopentyl methane-sulfonate [2] | 1 | t-amyl-benzene | 81 |
| Example II-11 | 1.2M LiPF$_6$ EC/DMC/MEC (30/50/20) | cyclopentyl methane-sulfonate [2] | 1 | biphenyl | 80 |
| Example II-12 | 1.2M LiPF$_6$ EC/DMC/MEC (30/50/20) | cyclopentyl methane-sulfonate [2] | 1 | adipo-nitrile | 82 |

*1: content (wt %) in nonaqueous electrolytic solution

Example II-13 (Invention II) and Comparative Example II-3

Silicon (simple substance) (negative electrode active material) was used in place of the negative electrode active material used in Example II-2 and Comparative Example II-1 to produce a negative electrode sheet. Silicon (simple substance): 80% by mass and acetylene black (electroconductive agent): 15% by mass were mixed, and the mixture was added to a solution prepared by dissolving in advance polyvinylidene fluoride (binder): 5% by mass in 1-methyl-2-pyrrolidone and mixed to prepare a negative electrode mixture paste. Coin-type batteries were produced in the same manners as in Example II-2 and Comparative Example II-1 to evaluate the batteries, except that the above negative electrode mixture paste was coated on a copper foil (collector), dried and subjected to pressure treatment and that it was punched to a prescribed size to produce a negative electrode sheet. The results thereof are shown in Table II-3.

TABLE II-3

| | Composition of electrolyte salt composition of nonaqueous electrolytic solution | Sulfonic ester compound (I) | Addition amount *1 | 0° C. discharge capacity retention rate (%) after high temperature charge and storage |
|---|---|---|---|---|
| Example II-13 | 1.2M LiPF$_6$ EC/DMC/MEC (30/50/20) | cyclopentyl 4-methylbenzene-sulfonate [1] | 1 | 70 |
| Comparative Example II-3 | 1.2M LiPF$_6$ EC/DMC/MEC (30/50/20) | none | — | 54 |

*1: content (wt %) in nonaqueous electrolytic solution

Example II-14 (Invention II) and Comparative
Example II-4

LiFePO$_4$ (positive electrode active material) coated with amorphous carbon was used in place of the positive electrode active material used in Examples 2 and Comparative Example 1 to produce a positive electrode sheet. LiFePO$_4$ coated with amorphous carbon: 90% by mass and acetylene black (electroconductive agent): 5% by mass were mixed, and the mixture was added to a solution prepared by dissolving in advance polyvinylidene fluoride (binder): 5% by mass in 1-methyl-2-pyrrolidone and mixed to prepare a positive electrode mixture paste. Coin-type batteries were produced in the same manners as in Example II-2 and Comparative Example II-1 to evaluate the batteries, except that the above positive electrode mixture paste was coated on an aluminum foil (collector), dried and subjected to pressure treatment, followed by punching it to a predetermined size to produce a positive electrode sheet and that controlled were a final charging voltage to 3.6 V and a final discharging voltage to 2.0 V in evaluating the batteries. The results thereof are shown in Table II-4.

TABLE II-4

| | Composition of electrolyte salt composition of nonaqueous electrolytic solution | Sulfonic ester compound (I) | Addition amount *1 | 0° C. discharge capacity retention rate (%) after high temperature charge and storage |
|---|---|---|---|---|
| Example II-14 | 1.2M LiPF$_6$ EC/DMC/MEC (30/50/20) | cyclopentyl 4-methylbenzene-sulfonate [1] | 1 | 81 |
| Comparative Example II-4 | 1.2M LiPF$_6$ EC/DMC/MEC (30/50/20) | none | — | 67 |

*1: content (wt %) in nonaqueous electrolytic solution

All of the lithium secondary batteries produced in Examples II-1 to II-9 were notably improved in low-temperature properties after charged and stored at high temperature as compared with the lithium secondary batteries produced in Comparative Example 1 in which the additives were not added and Comparative Example II-2 in which methyl methanesulfonate having no methine proton on a carbon atom having a sulfonyloxy group bonded thereto was added. It became clear from the above matters that the effects of the present invention were effects peculiar to the sulfonic ester compounds having a methine proton on a carbon atom of a cycloalkyl group to which a sulfonyloxy group was bonded.

All of the lithium secondary batteries produced in Examples II-10 to II-12 containing nitrile and the aromatic compounds as the other additives were notably improved in low-temperature properties after charged and stored at high temperature as compared with the lithium secondary battery produced in Example II-4 in which the other additives were not contained. Cyclopentyl methanesulfonate was used as the sulfonic ester compound in the examples, and when the other sulfonic ester compounds represented by Formula (I) were used, the same effect is provided as well.

Also, from comparisons of Example II-13 with Comparative Example II-3 and Example II-14 with Comparative Example II-4, the same effect is observed as well in a case in which Si was used for the negative electrode and a case in which lithium-containing olivine-type iron phosphate was used for the positive electrode. Accordingly, it is apparent that the effects of the present invention are not effects depending on the specific positive electrode and negative electrode.

Further, the nonaqueous electrolytic solutions of the invention II described above have as well an effect of improving discharging properties in a broad temperature range in the lithium primary batteries.

Next, the synthetic examples of the sulfonic ester compounds of the invention III and the examples of electrolytic solutions prepared by using the same shall be shown.

Alcohol compounds which are raw materials of the sulfonic ester compound represented by Formula (V) can be available as commercial products, and they can be synthesized as well by existing conventional methods. Methods described in Tetrahedron Asymmetry, Vol. 4, No. 5, page 925 to 930, 1993 can be applied as the synthetic examples.

Methods described in, for example, Journal of the Chemical Society, Perkin Transactions 2, No. 8, page 1201 to 1208, 1991 in which alcohols are reacted with sulfonyl halide in a solvent under the presence of a base can be applied as a synthetic method for the sulfonic ester compounds.

Synthetic Example III-1

Synthesis of pentane-2,3-diyl dimethanesulfonate

Pentane-2,3-diol 1.04 g (10.0 mole) and triethylamine 2.23 g (22.0 mole) were dissolved in 40 mL of methylene chloride, and methanesulfonyl chloride 2.52 g (22.0 mole) was dropwise added thereto in a range of 0 to 5° C. and stirred at 0° C. for 30 minutes. After the raw materials were confirmed to be exhausted by gas chromatography analysis, the organic layer was washed with 20 ml of water and then 20 ml of a saturated salt solution. The organic layer was dried with anhydrous magnesium sulfate and concentrated under reduced pressure. The residue was refined by column chromatography (Wako Gel C-200, hexane/ethyl acetate=2/1 eluted) to obtain 2.24 g of pentane-2,3-diyl dimethanesulfonate (pale orange liquid; novel compound) which was the targeted product (yield: 86%).
$^1$H-NMR of pentane-2,3-diyl dimethanesulfonate thus obtained was measured to confirm a structure thereof.
$^1$H-NMR (300 MHz, CDCl$_3$): δ=4.95 to 4.78 (m, 1H), 4.73 to 4.57 (m, 1H), 3.11 to 3.07 (m, 6H), 1.96 to 1.65 (m, 2H), 1.43 to 1.37 (m, 3H), 1.03 to 0.98 (m, 3H)

Examples III-1 to III-13 (Invention III) and
Comparative Examples III-1 and III-2

Production of Lithium ion Secondary Battery

LiNi$_{1/3}$Mn$_{1/3}$Co$_{1/3}$O$_2$ 94% by mass and acetylene black (electroconductive agent) 3% by mass were mixed, and the mixture was added to a solution prepared by dissolving in advance polyvinylidene fluoride (binder) 3% by mass in 1-methyl-2-pyrrolidone and mixed to prepare a positive electrode mixture paste. This positive electrode mixture paste was coated on one surface of an aluminum foil (collector), dried and subjected to pressure treatment, and it was cut into a predetermined size to produce a positive electrode sheet. A density of parts excluding the collector of the positive electrode was 3.6 g/cm$^3$.

Further, 95% by mass of artificial graphite ($d_{002}$=0.335 nm, negative electrode active material) coated with amorphous carbon was added to a solution prepared by dissolving in advance 5% by mass of polyvinylidene fluoride (binder) in 1-methyl-2-pyrrolidone and mixed to prepare a negative electrode mixture paste. This negative electrode mixture paste was coated on one surface of a copper foil (collector), dried and subjected to pressure treatment, and it was punched into a predetermined size to produce a negative electrode sheet. A density of parts excluding the collector of the negative electrode was 1.5 g/cm$^3$. Further, X ray diffraction measurement was carried out by using the above electrode sheet to result in finding that a ratio (I (110)/I (004)) of a peak intensity I (110) of a (110) plane and a peak intensity I (004) of a (004) plane in the graphite crystal was 0.1. Then, the positive electrode sheet, a fine porous polyethylene film-made separator and the negative electrode sheet were laminated thereon in this order, and nonaqueous electrolytic solutions having compositions described in Table III-1 were added thereto to produce 2032 coin-type batteries.

The producing conditions and the evaluation results of the batteries are shown in Table III-1.

The details of the compounds represented by Formula (V) or (VI) which were used in the examples and the comparative examples are shown below. Ms in the following formulas represents a methanesulfonyl group, and Tos represents a 4-methylbenzenesulfonyl group (also referred to as a p-toluenesulfonyl group).

[Formula 19]

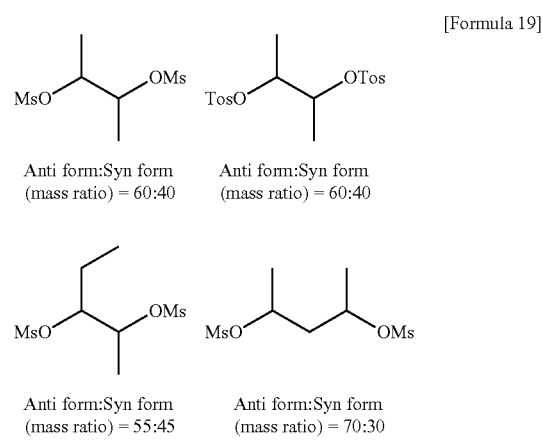

Anti form:Syn form (mass ratio) = 60:40
Anti form:Syn form (mass ratio) = 60:40
Anti form:Syn form (mass ratio) = 55:45
Anti form:Syn form (mass ratio) = 70:30

TABLE III-1

| | Composition of electrolyte salt composition of nonaqueous electrolytic solution (volume ratio of solvent) | Disulfonic ester compound (I) | Addition amount *1 | Disulfonic ester compound (II) | Addition amount *1 | 0° C. discharge capacity retention rate (%) after high temperature charge and storage |
|---|---|---|---|---|---|---|
| Example III-1 | 1.2M LiPF$_6$ EC/DMC/MEC (30/50/20) + 0.4 wt % CO$_2$ | MsO–⋯–OMs | 0.01 | none | — | 77 |
| Example III-2 | 1.2M LiPF$_6$ EC/DMC/MEC (30/50/20) + 0.4 wt % CO$_2$ | MsO–⋯–OMs | 1 | none | — | 82 |
| Example III-3 | 1.2M LiPF$_6$ EC/DMC/MEC (30/50/20) + 0.4 wt % CO$_2$ | MsO–⋯–OMs | 3 | none | — | 79 |
| Example III-4 | 1.2M LiPF$_6$ EC/DMC/MEC (30/50/20) + 0.4 wt % CO$_2$ | TosO–⋯–OTos | 1 | none | — | 81 |
| Example III-5 | 1.2M LiPF$_6$ EC/DMC/MEC (30/50/20) + 0.4 wt % CO$_2$ | MsO–⋯–OMs | 1 | none | — | 85 |

TABLE III-1-continued

| | Composition of electrolyte salt composition of nonaqueous electrolytic solution (volume ratio of solvent) | Disulfonic ester compound (I) | Addition amount *1 | Disulfonic ester compound (II) | Addition amount *1 | 0° C. discharge capacity retention rate (%) after high temperature charge and storage |
|---|---|---|---|---|---|---|
| Example III-6 | 1.2M LiPF$_6$ EC/DMC/MEC (30/50/20) + 0.4 wt % CO$_2$ | MsO–CH$_2$–CH(CH$_3$)–CH$_2$–OMs (2-methyl-1,3-propanediyl dimesylate) | 1 | none | — | 83 |
| Example III-7 | 1.2M LiPF$_6$ EC/DMC/MEC (30/50/20) + 0.4 wt % CO$_2$ | MsO–CH(CH$_3$)–CH(CH$_3$)–OMs (2,3-butanediyl dimesylate) | 1 | MsO–CH(CH$_3$)–CH(CH$_3$)–OMs | 2 | 84 |
| Example III-8 | 1.2M LiPF$_6$ EC/DMC/MEC (30/50/20) + 0.4 wt % CO$_2$ | MsO–CH(CH$_3$)–CH(CH$_3$)–OMs | 1 | MsO–(CH$_2$)$_5$–OMs (1,5-pentanediyl dimesylate) | 2 | 87 |
| Example III-9 | 1.2M LiPF$_6$ EC/FEC/VC/DMC/MEC (18/10/2/50/20) | MsO–CH(CH$_3$)–CH(CH$_3$)–OMs | 1 | none | — | 85 |
| Example III-10 | 1.2M LiPF$_6$ EC/DMC/MEC (30/50/20) + 1 wt % t-amylbenzene + 0.4 wt % CO$_2$ | MsO–CH(CH$_3$)–CH(CH$_3$)–OMs | 1 | none | — | 85 |
| Example III-11 | 1.2M LiPF$_6$ EC/DMC/MEC (30/50/20) + 0.05 wt % biphenyl + 0.4 wt % CO$_2$ | MsO–CH(CH$_3$)–CH(CH$_3$)–OMs | 1 | none | — | 84 |
| Example III-12 | 1.2M LiPF$_6$ EC/DMC/MEC (30/50/20) + 0.5 wt % adiponitrile + 0.4 wt % CO$_2$ | MsO–CH(CH$_3$)–CH(CH$_3$)–OMs | 1 | none | — | 86 |
| Example III-13 | 1.2M LiPF$_6$ EC/DMC/MEC (30/50/20) + 0.5 wt % 1,3-propane-sultone + 0.4 wt % CO$_2$ | MsO–CH(CH$_3$)–CH(CH$_3$)–OMs | 1 | none | — | 87 |
| Comparative Example III-1 | 1.2M LiPF$_6$ EC/DMC/MEC (30/50/20) + 0.4 wt % CO$_2$ | none | — | none | — | 67 |
| Comparative Example III-2 | 1.2M LiPF$_6$ EC/DMC/MEC (30/50/20) + 0.4 wt % CO$_2$ | none | — | MsO–CH(CH$_3$)–CH(CH$_3$)–OMs | 3 | 70 |

*1: content (wt %) in nonaqueous electrolytic solution

Example III-14 (Invention III) and Comparative Example III-3

Silicon (simple substance) (negative electrode active material) was used in place of the negative electrode active material used in Examples III-2 and Comparative Example III-1 to produce a negative electrode sheet. Silicon (simple substance) 80% by mass and acetylene black (electroconductive agent) 15% by mass were mixed, and the mixture was added to a solution prepared by dissolving in advance polyvinylidene fluoride (binder) 5% by mass in 1-methyl-2-pyrrolidone and mixed to prepare a negative electrode mixture paste. Coin-type batteries were produced in the same manners as in Example III-2 and Comparative Example III-1 to evaluate the batteries, except that the above negative electrode mixture paste was coated on a copper foil (collector), dried and subjected to pressure treatment and that it was cut into a predetermined size to produce a negative electrode sheet. The results thereof are shown in Table III-2.

advance polyvinylidene fluoride (binder) 5% by mass in 1-methyl-2-pyrrolidone and mixed to prepare a positive electrode mixture paste. Coin-type batteries were produced in the same manners as in Example III-2 and Comparative Example III-1 to evaluate the batteries, except that the above positive electrode mixture paste was coated on an aluminum foil (collector), dried and subjected to pressure treatment, followed by

TABLE III-2

| | Composition of electrolyte salt composition of nonaqueous electrolytic solution | Disulfonic ester compound (I) | Addition amount *1 | Disulfonic ester compound (II) | Addition amount *1 | 0° C. discharge capacity retention rate (%) after high temperature charge and storage |
|---|---|---|---|---|---|---|
| Example III-14 | 1.2M $LiPF_6$ EC/DMC/MEC (30/50/20) + 0.4 wt % $CO_2$ | MsO—⟨structure⟩—OMs | 1 | none | — | 71 |
| Comparative Example III-3 | 1.2M $LiPF_6$ EC/DMC/MEC (30/50/20) + 0.4 wt % $CO_2$ | none | — | none | — | 56 |

*1: content (wt %) in nonaqueous electrolytic solution

Example III-15 (Invention III) and Comparative Example III-4

$LiFePO_4$ (positive electrode active material) coated with amorphous carbon was used in place of the positive electrode active material used in Example III-2 and Comparative Example 1 to produce a positive electrode sheet. $LiFePO_4$ coated with amorphous carbon 90% by mass and acetylene black (electroconductive agent) 5% by mass were mixed, and the mixture was added to a solution prepared by dissolving in punching it into a predetermined size to produce a positive electrode sheet and that controlled were a final charging voltage to 3.6 V and a final discharging voltage to 2.0 V in evaluating the batteries. The results thereof are shown in Table III-3.

TABLE III-3

| | Composition of electrolyte salt composition of nonaqueous electrolytic solution | Disulfonic ester compound (I) | Addition amount *1 | Disulfonic ester compound (II) | Addition amount *1 | 0° C. discharge capacity retention rate (%) after high temperature charge and storage |
|---|---|---|---|---|---|---|
| Example III-15 | 1.2M $LiPF_6$ EC/DMC/MEC (30/50/20) + 0.4 wt % $CO_2$ | MsO—⟨structure⟩—OMs | 1 | none | — | 85 |
| Comparative Example III-4 | 1.2M $LiPF_6$ EC/DMC/MEC (30/50/20) + 0.4 wt % $CO_2$ | none | — | none | — | 71 |

*1: content (wt %) in nonaqueous electrolytic solution

Examples III-16 to III-20 (Invention III) and Comparative Example III-5

$LiMn_2O_4$ (positive electrode active material) was used in place of the positive electrode active material used in Example III-2 and Comparative Example III-1 to produce a positive electrode sheet. $LiMn_2O_4$ 88% by mass and acetylene black (electroconductive agent) 6% by mass were mixed, and the mixture was added to a solution prepared by dissolving in advance polyvinylidene fluoride (binder) 6% by mass in 1-methyl-2-pyrrolidone and mixed to prepare a positive electrode mixture paste. Coin-type batteries were produced in the same manners as in Example III-2 and Comparative Example III-1 to evaluate the batteries, except that the above positive electrode mixture paste was coated on an aluminum foil (collector), dried and subjected to pressure treatment, that it was cut into a predetermined size to produce a positive electrode sheet, that a mass ratio of an Anti form and a Syn form of butane-2,3-diyl dimethanesulfonate added to the nonaqueous electrode solution was changed as shown in Table III-4 and that both the initial discharge capacity and the low-temperature properties after charged and stored at high temperature in evaluating the batteries were measured at −30° C. to determine the −30° C. discharge capacity retention rate (%) after charged and stored at high temperature according to the following equation. The results thereof are shown in Table III-4.

−30° C. discharge capacity retention rate (%) after charged and stored at high temperature=(discharge capacity at −30° C. after charged and stored at high temperature)/(initial discharge capacity at −30° C.)×100 used to synthesize them, whereby the Anti form and the Syn form of butane-2,3-diyl dimethanesulfonate each having a content of 100% were synthesized respectively, and they were used in a mixture having a mass ratio shown in Table III-4.

Also, the nonaqueous electrolytic solutions prepared in proportions shown in Table III-4 were analyzed by HPLC to result in enabling to confirm that the Anti form and the Syn form were present in the same compositions as in the addition ratios.

All of the lithium secondary batteries produced in Examples III-1 to III-13 were notably improved in low-temperature properties after charged and stored at high temperature as compared with the lithium secondary batteries produced in Comparative Example III-1 in which the additives were not added and Comparative Examples III-2 in which 1,2-propanediol dimethanesulfonate having a methine proton only on a carbon atom having one sulfonyloxy group bonded thereto was added. It became clear from the above matters that the effects of the invention III were effects peculiar to the sulfonic ester compounds having a methine proton on carbon atoms to which two sulfonyloxy groups were bonded respectively.

TABLE III-4

| | Composition of electrolyte salt composition of nonaqueous electrolytic solution | Disulfonic ester compound (I) addition amount (mass %)) | Anti form: Syn form (mass ratio) | −30° C. discharge capacity retention rate (%) after high temperature charge and storage |
|---|---|---|---|---|
| Example III-16 | 1.2M $LiPF_6$ EC/DMC/MEC (30/35/35) | 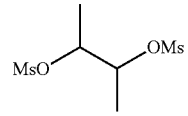 | 100:0 | 69 |
| Example III-17 | 1.2M $LiPF_6$ EC/DMC/MEC (30/35/35) | 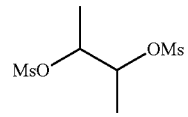 | 95:5 | 74 |
| Example III-18 | 1.2M $LiPF_6$ EC/DMC/MEC 30/35/35) | 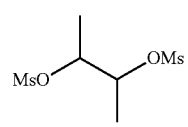 | 60:40 | 75 |
| Example III-19 | 1.2M $LiPF_6$ EC/DMC/MEC (30/35/35) | 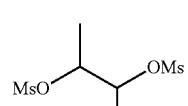 | 5:95 | 71 |
| Example III-20 | 1.2M $LiPF_6$ EC/DMC/MEC (30/35/35) | 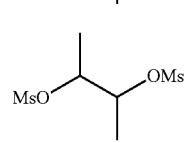 | 0:100 | 67 |
| Comparative Example III-5 | 1.2M $LiPF_6$ EC/DMC/MEC (30/35/35) | none | — | 49 |

In respect to a mass ratio of the Anti form and the Syn form of butane-2,3-diyl dimethanesulfonate added to the nonaqueous electrode solution described above, the corresponding diol raw materials of the Anti form and the Syn form were Also, from comparisons of Example III-14 with Comparative Example III-3 and Example III-15 with Comparative Example III-4, the same effect is observed as well in a case in which Si was used for the negative electrode and a case in which lithium-containing olivine-type iron phosphate was used for the positive electrode. Accordingly, it is apparent that the effects of the invention III are not effects depending on the specific positive electrode and negative electrode.

Also, it became clear from Examples III-16 to III-20 that the Anti form of the compound represented by Formula (V) was preferred a little to the Syn form thereof and that a mixture of the Anti form and the Syn form was preferred since the effect is improved still more.

Further, the nonaqueous electrolytic solutions of the invention III have as well an effect of improving discharging properties in a broad temperature range in the lithium primary batteries.

Next, the examples of electrolytic solutions prepared by using the sulfonate compounds of the invention IV having a silicon atom shall be shown.

Examples IV-1 to IV-4 (Invention IV) and
Comparative Examples IV-1 to IV-3

Production of Lithium Ion Secondary Battery $LiCoO_2$: 94% by mass and acetylene black (electroconductive agent): 3% by mass were mixed, and the mixture was added to a solution prepared by dissolving in advance polyvinylidene fluoride (binder): 3% by mass in 1-methyl-2-pyrrolidone and mixed to prepare a positive electrode mixture paste. This positive electrode mixture paste was coated on one surface of an aluminum foil (collector), dried and subjected to pressure treatment, and it was cut into a predetermined size to produce a positive electrode sheet. A density of parts excluding the collector of the positive electrode was 3.6 g/cm³. Further, 95% by mass of artificial graphite ($d_{002}$=0.335 nm, negative electrode active material) was added to a solution prepared by dissolving in advance 5% by mass of polyvinylidene fluoride (binder) in 1-methyl-2-pyrrolidone and mixed to prepare a negative electrode mixture paste. This negative electrode mixture paste was coated on one surface of a copper foil (collector), dried and subjected to pressure treatment, and it was cut into a predetermined size to produce a negative electrode sheet. A density of parts excluding the collector of the negative electrode was 1.5 g/cm³. Further, X ray diffraction measurement was carried out by using the above electrode sheet to result in finding that a ratio (I (110)/I (004)) of a peak intensity I (110) of a (110) plane and a peak intensity I (004) of a (004) plane in the graphite crystal was 0.1. Then, the positive electrode sheet, a fine porous polyethylene film-made separator and the negative electrode sheet were laminated thereon in this order, and nonaqueous electrolytic solutions having compositions described in Table IV-1 were added thereto to produce 2032 coin-type batteries.

The producing conditions and the battery characteristics are shown in Table IV-1.

TABLE IV-1

| | Composition of electrolyte salt composition of nonaqueous electrolytic solution (volume ratio of solvent) | Sulfonate compound having a silicon atom | Addition amount *1 | 0° C. discharge capacity retention rate (%) after high temperature charge and storage at 85° C. |
|---|---|---|---|---|
| Example IV-1 | 1.1M $LiPF_6$ EC/FEC/DMC/MEC (25/5/50/20) | CH₃-S(=O)₂-O-Si(CH₃)₂-Si(CH₃)₂-O-S(=O)₂-CH₃ | 0.01 | 79 |
| Example IV-2 | 1.1M $LiPF_6$ EC/FEC/DMC/MEC (25/5/50/20) | CH₃-S(=O)₂-O-Si(CH₃)₂-Si(CH₃)₂-O-S(=O)₂-CH₃ | 0.08 | 85 |
| Example IV-3 | 1.1M $LiPF_6$ EC/FEC/DMC/MEC (25/5/50/20) | CH₃-S(=O)₂-O-Si(CH₃)₂-Si(CH₃)₂-O-S(=O)₂-CH₃ | 2 | 71 |
| Example IV-4 | 1.1M $LiPF_6$ EC/FEC/DMC/MEC (25/5/50/20) | (4-CH₃-C₆H₄)-S(=O)₂-O-Si(CH₃)₂-Si(CH₃)₂-O-S(=O)₂-(C₆H₄-4-CH₃) | 0.08 | 87 |

TABLE IV-1-continued

| | Composition of electrolyte salt composition of nonaqueous electrolytic solution (volume ratio of solvent) | Sulfonate compound having a silicon atom | Addition amount *1 | 0° C. discharge capacity retention rate (%) after high temperature charge and storage at 85° C. |
|---|---|---|---|---|
| Comparative Example IV-1 | 1.1M LiPF$_6$ EC/FEC/DMC/MEC (15/15/50/20) | none | 0.08 | 62 |
| Comparative Example IV-2 | 1.1M LiPF$_6$ EC/FEC/DMC/MEC (15/15/50/20) | [bis(3,5-difluorophenyl)disilane structure] | 0.08 | 66 |
| Comparative Example IV-3 | 1.1M LiPF$_6$ EC/FEC/DMC/MEC (15/15/50/20) | [methanesulfonate silyl structure] | 0.08 | 64 |

*1: content (wt %) in nonaqueous electrolytic solution

Example IV-5 (Invention IV) and Comparative Example IV-4

Silicon (simple substance) (negative electrode active material) was used in place of the negative electrode active material used in Example IV-2 and Comparative Example IV-1 to produce a negative electrode sheet. Silicon (simple substance): 80% by mass and acetylene black (electroconductive agent): 15% by mass were mixed, and the mixture was added to a solution prepared by dissolving in advance polyvinylidene fluoride (binder): 5% by mass in 1-methyl-2-pyrrolidone and mixed to prepare a negative electrode mixture paste. Coin-type batteries were produced in the same manners as in Example IV-2 and Comparative Example IV-1 to evaluate the batteries, except that the above negative electrode mixture paste was coated on a copper foil (collector), dried and subjected to pressure treatment and that it was cut into a predetermined size to produce a negative electrode sheet. The results thereof are shown in Table IV-2.

Example IV-6 (Invention IV) and Comparative Example IV-5

LiFePO$_4$ (positive electrode active material) coated with amorphous carbon was used in place of the positive electrode active material used in Example IV-2 and Comparative Example IV-1 to produce a positive electrode sheet. LiFePO$_4$ coated with amorphous carbon: 90% by mass and acetylene black (electroconductive agent): 5% by mass were mixed, and the mixture was added to a solution prepared by dissolving in advance polyvinylidene fluoride (binder): 5% by mass in 1-methyl-2-pyrrolidone and mixed to prepare a positive electrode mixture paste. Coin-type batteries were produced in the same manners as in Example IV-2 and Comparative Example IV-1 to evaluate the batteries, except that the above positive electrode mixture paste was coated on an aluminum foil (collector), dried and subjected to pressure treatment, followed by punching it into a predetermined size to produce a positive electrode sheet and that controlled were a final charging voltage to 3.6 V and a final discharging voltage to 2.0 V in evaluating the batteries. The results thereof are shown in Table IV-3.

Table IV-2

| | Composition of electrolyte salt composition of nonaqueous electrolytic solution (volume ratio of solvent) | Sulfonate compound having a silicon atom | Addition amount *1 | 0° C. discharge capacity retention rate (%) after high temperature charge and storage at 85° C. |
|---|---|---|---|---|
| Example IV-5 | 1.1M LiPF$_6$ EC/FEC/DMC/MEC (15/15/50/20) | [bis-sulfonate disilane structure] | 0.08 | 63 |
| Comparative Example IV-4 | 1.1M LiPF$_6$ EC/FEC/DMC/MEC (15/15/50/20) | none | 0.08 | 52 |

*1: content (wt %) in nonaqueous electrolytic solution

Table IV-3

| | Composition of electrolyte salt composition of nonaqueous electrolytic solution (volume ratio of solvent) | Sulfonate compound having a silicon atom | Addition amount *1 | 0° C. discharge capacity retention rate (%) after high temperature charge and storage at 85° C. |
|---|---|---|---|---|
| Example IV-6 | 1.1M LiPF$_6$ EC/FEC/DMC/MEC (15/15/50/20) | 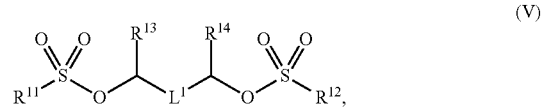 | 0.08 | 79 |
| Comparative Example IV-5 | 1.1M LiPF$_6$ EC/FEC/DMC/MEC (15/15/50/20) | none | 0.08 | 62 |

*1: content (wt %) in nonaqueous electrolytic solution

All of the lithium secondary batteries produced in Examples IV-1 to IV-4 were notably improved in electrochemical characteristics in a broad temperature range as compared with the lithium secondary batteries produced in Comparative Example IV-1 in which the sulfonate compound having a silicon atom was not added, Comparative Example IV-2 in which used was the nonaqueous electrolytic solution containing 1,2-bis(3,5-difluorophenyl)-1,1,2,2-tetramethyl disilane described in the patent document 5 and Comparative Example IV-3 in which used was the nonaqueous electrolytic solution containing trimethylsilyl methanesulfonate described in the patent document 6. It became clear from the above matters that the effects of the invention IV were effects peculiar to a case in which 0.001 to 5% by mass of the specific sulfonate compound of the present invention having a silicon atom was contained in the nonaqueous electrolytic solution prepared by dissolving the electrolyte salt in the nonaqueous solvent.

Also, from comparisons of Example IV-5 with Comparative Example IV-4 and Example IV-6 with Comparative Example IV-5, the same effect is observed as well in a case in which silicon (simple substance) Si was used for the negative electrode and a case in which lithium-containing olivine-type iron phosphate was used for the positive electrode. Accordingly, it is apparent that the effects of the invention IV are not effects depending on the specific positive electrode and negative electrode.

Further, the nonaqueous electrolytic solutions of the invention IV have as well an effect of improving discharging properties in a broad temperature range in the lithium primary batteries.

INDUSTRIAL APPLICABILITY

Use of the nonaqueous electrolytic solutions of the present invention makes it possible to obtain electrochemical elements which are excellent in electrochemical characteristics in a broad temperature range. In particular, when they are used as nonaqueous electrolytic solutions for electrochemical elements loaded in hybrid electric vehicles, plug-in hybrid electric vehicles, battery electric vehicles and the like, electrochemical elements which are less liable to be reduced in electrochemical characteristics in a broad temperature range can be obtained.

The invention claimed is:

1. A nonaqueous electrolytic solution, comprising:
a nonaqueous solvent having an electrolyte salt dissolved therein; and
a sulfonic ester compound of Formula (V):

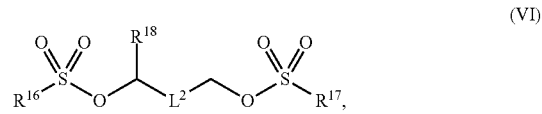

(V)

where $R^{11}$ and $R^{12}$ are each independently an alkyl group having 1 to 6 carbon atoms or an aryl group having 6 to 12 carbon atoms,
$R^{13}$ and $R^{14}$ are each independently an alkyl group having 1 to 6 carbon atoms,
$L^1$ is an alkylene group having 1 to 6 carbon atoms in which any hydrogen atom is optionally substituted with —OSO$_2$R$^{15}$, $L^1$ is a divalent linkage group having 2 to 6 carbon atoms and comprising an ether bond, or $L^1$ is a single bond,
$R^{15}$ is an alkyl group having 1 to 6 carbon atoms or an aryl group having 6 to 12 carbon atoms, and
any hydrogen atom on a carbon atom of an alkyl group having 1 to 6 carbon atoms or an aryl group having 6 to 12 carbon atoms in the sulfonic ester compound is optionally substituted with a halogen atom,
wherein the sulfonic ester compound of Formula (V) is included in an amount of from 0.001 to 5% by mass of the nonaqueous electrolytic solution.

2. The nonaqueous electrolytic solution claim 1, further comprising:
a sulfonic ester compound of Formula (VI):

(VI)

where $R^{16}$ and $R^{17}$ are each independently an alkyl group having 1 to 6 carbon atoms or an aryl group having 6 to 12 carbon atoms,
$R^{18}$ is a hydrogen atom or an alkyl group having 1 to 6 carbon atoms,
$L^2$ is an alkylene group having 1 to 6 carbon atoms in which any hydrogen atom is optionally substituted with —OSO$_2$R$^{19}$, $L^2$ is a divalent linkage group having 2 to 6 carbon atoms and comprising an ether bond, or $L^2$ is a single bond, and any hydrogen atom on a carbon atom of an alkyl group having 1 to 6 carbon atoms or an aryl group having 6 to 12 carbon atoms in the sulfonic ester compound of Formula (VI) is optionally substituted with a halogen atom, wherein the sulfonic ester compound of Formula (VI) is included in an amount of from 0.001 to 5% by mass of the nonaqueous electrolytic solution.

3. The nonaqueous electrolytic solution of claim 2, wherein $R^{18}$ is a hydrogen atom or a linear or branched alkyl group having 1 to 4 carbon atoms.

4. The nonaqueous electrolytic solution of claim 2, wherein the sulfonic ester compound of formula (VI) is selected from the group consisting of ethane-1,2-diyl dimethanesulfonate, propane-1,3-diyl dimethanesulfonate, pentane-1,5-diyl dimethanesulfonate, and propane-1,2-diyl dimethanesulfonate.

5. The nonaqueous electrolytic solution of claim 1, further comprising:
from 0.001 to 5% by mass of at least one of
a benzene compound comprising a hydrocarbon group having 1 to 6 carbon atoms bonded to a benzene ring via a tertiary carbon atom or a quaternary carbon atom, and
an S=O group-comprising compound comprising a cyclic structure or an unsaturated group.

6. The nonaqueous electrolytic solution of claim 1, wherein $R^{11}$ and $R^{12}$ are each independently a methyl group, an ethyl group, a phenyl group, or a 4-methylphenyl group.

7. The nonaqueous electrolytic solution of claim 1, wherein $L^1$ is a methylene group, an ethylene group, or a single bond.

8. The nonaqueous electrolytic solution of claim 1, wherein $L^1$ is a single bond.

9. The nonaqueous electrolytic solution of claim 1, wherein the sulfonic ester compound of Formula (V) is included in an amount of from 0.01 to 3% by mass of the nonaqueous electrolytic solution.

10. The nonaqueous electrolytic solution of claim 1, wherein the sulfonic ester compound of Formula (V) is at least one selected from the group consisting of butane-2,3-diyl dimethanesulfonate, butane-2,3-diyl bis(4-methylbenzenesulfonate), pentane-2,3-diyl dimethanesulfonate, pentane-2,3-diyl bis(4-methylbenzenesulfonate), hexane-2,3-diyl dimethanesulfonate, hexane-2,3-diyl bis(4-methylbenzenesulfonate), pentane-2,4-diyl dimethanesulfonate, and pentane-2,4-diyl bis(4-methylbenzenesulfonate).

11. The nonaqueous electrolytic solution of claim 1, wherein the nonaqueous solvent is at least one selected from the group consisting of a cyclic carbonate, a linear ester, a lactone, an ether, an amide, a phosphoric ester, a sulfone, a nitrile, and a compound comprising a S=O bond.

12. The nonaqueous electrolytic solution of claim 1, wherein the nonaqueous solvent comprises at least one of
a first cyclic carbonate comprising a carbon-carbon double bond in an amount of from 0.001 to 5% by volume based on a volume of the nonaqueous solvent, and
a second cyclic carbonate comprising a fluorine atom in an amount of from 0.01 to 35% by volume based on a volume of the nonaqueous solvent.

13. An electrochemical element, comprising:
a positive electrode;
a negative electrode; and
the nonaqueous electrolytic solution of claim 1.

14. The electrochemical element of claim 13, wherein the positive electrode comprises
a complex metal oxide comprising lithium and at least one of cobalt, manganese, and nickel, or
an olivine-type phosphate comprising lithium and at least one of iron, cobalt, nickel, and manganese.

15. The electrochemical element of claim 14, wherein the negative electrode comprises at least one selected from the group consisting of a lithium metal, a lithium alloy, a carbon material capable of absorbing and releasing lithium, tin, a tin compound, silicon, a silicon compound, and a lithium titanate compound.

16. The electrochemical element of claim 13, wherein the negative electrode comprises at least one selected from the group consisting of a lithium metal, a lithium alloy, a carbon material capable of absorbing and releasing lithium, tin, a tin compound, silicon, a silicon compound, and a lithium titanate compound.

17. The electrochemical element of claim 16, wherein the carbon material capable of absorbing and releasing lithium is at least one of a graphitizable carbon, a non-graphitizable carbon having a lattice (002) spacing of 0.37 nm or more, and a graphite having a lattice (002) spacing of 0.34 nm or less.

* * * * *